United States Patent
Nakamura et al.

(10) Patent No.: US 11,149,179 B2
(45) Date of Patent: Oct. 19, 2021

(54) LATENT HEAT STORAGE MATERIAL COMPOSITION

(71) Applicant: TOHO GAS CO., LTD., Nagoya (JP)

(72) Inventors: Kohei Nakamura, Nagoya (JP); Takashi Ina, Nagoya (JP)

(73) Assignee: TOHO GAS CO., LTD., Nagoya (JP)

( * ) Notice: Subject to any disclaimer, the term of this patent is extended or adjusted under 35 U.S.C. 154(b) by 48 days.

(21) Appl. No.: 16/480,985

(22) PCT Filed: Feb. 2, 2018

(86) PCT No.: PCT/JP2018/003674
§ 371 (c)(1),
(2) Date: Jul. 25, 2019

(87) PCT Pub. No.: WO2018/147199
PCT Pub. Date: Aug. 16, 2018

(65) Prior Publication Data
US 2020/0002588 A1 Jan. 2, 2020

(30) Foreign Application Priority Data

Feb. 8, 2017 (JP) .............................. JP2017-021668
Jan. 18, 2018 (JP) .............................. JP2018-006792

(51) Int. Cl.
*C09K 5/06* (2006.01)
(52) U.S. Cl.
CPC .................................. *C09K 5/063* (2013.01)
(58) Field of Classification Search
CPC .. C09K 5/02; C09K 5/06; C09K 5/063; F28D 20/02; Y02E 60/14
See application file for complete search history.

(56) References Cited

U.S. PATENT DOCUMENTS

| 5,453,213 A * | 9/1995 | Kakiuchi | C09K 5/063 165/10 |
| 6,757,486 B2 * | 6/2004 | Hirano | F24H 7/002 392/344 |

(Continued)

FOREIGN PATENT DOCUMENTS

| CN | 110382658 A | 10/2019 |
| EP | 3 575 375 A1 | 12/2019 |

(Continued)

OTHER PUBLICATIONS

English machine translation of Kishimoto et al. (JP 2007-321029 A). (Year: 2007).*

(Continued)

*Primary Examiner* — Matthew R Diaz
(74) *Attorney, Agent, or Firm* — Oliff PLC

(57) ABSTRACT

In a latent heat storage material composition prepared by mixture of a latent heat storage material with an additive that adjusts the physical properties of the latent heat storage material, the latent heat storage material includes an inorganic salt hydrate containing nw ($2 \leq nw$) molecules of hydration water. The additive is a melting point modifier for adjusting the melting point of the latent heat storage material and is a substance belonging to a sugar alcohol, and is a substance having the physical property of producing negative dissolution heat upon dissolution in hydration water contained in the latent heat storage material. In a whole amount of the latent heat storage material composition, the substance belonging to a sugar alcohol has a concentration that satisfies formulae (1) and (2) per 1 mole of water of hydration of the latent heat storage material. Formula (2): $0.01 \leq xs \leq 1$.

12 Claims, 36 Drawing Sheets

(56) References Cited

U.S. PATENT DOCUMENTS

| | | | |
|---|---|---|---|
| 2012/0148845 A1 | 6/2012 | Kouyama et al. | |
| 2016/0090520 A1* | 3/2016 | Suzuki | F28D 20/0034 |
| | | | 165/10 |
| 2016/0209124 A1* | 7/2016 | Da Silvaa | F28D 7/082 |
| 2019/0040293 A1* | 2/2019 | Anders | C09K 5/063 |
| 2020/0239756 A1 | 7/2020 | Nakamura et al. | |

FOREIGN PATENT DOCUMENTS

| | | | | |
|---|---|---|---|---|
| JP | 58117273 | A | * | 7/1983 |
| JP | S59-075977 | A | | 4/1984 |
| JP | H03-041185 | A | | 2/1991 |
| JP | 08218063 | A | * | 8/1996 |
| JP | 2000-282017 | A | | 10/2000 |
| JP | 2000-282018 | A | | 10/2000 |
| JP | 2001-214158 | A | | 8/2001 |
| JP | 2001-227887 | A | | 8/2001 |
| JP | 2001227887 | A | * | 10/2001 |
| JP | 2003-232595 | A | | 8/2003 |
| JP | 2007-254697 | A | | 10/2007 |
| JP | 2007321029 | A | * | 12/2007 |
| JP | 2009-096826 | A | | 5/2009 |
| JP | 2009-108167 | A | | 5/2009 |
| JP | 2011-153206 | A | | 8/2011 |
| JP | 4830572 | B2 | | 12/2011 |
| JP | 2012-140600 | A | | 7/2012 |
| JP | 2015-140363 | A | | 8/2015 |
| JP | 2015140363 | A | * | 8/2015 |
| JP | 2015-218212 | A | | 12/2015 |
| JP | 2017-052866 | A | | 3/2017 |
| JP | 2017052866 | A | * | 3/2017 |

OTHER PUBLICATIONS

English machine translation of Satake et al. (JP 08-218063 A) (Year: 1996).*

English machine translation of Tadenuma et al. (JP 58-117273 A) (Year: 1983).*

Hollis et al. ("Interstellar antifreeze: ethylene glycol," The Astrophysical Journal, 571:L59-L62, 2002) (Year: 2002).*

Kubota et al., "Studies on Phase Change Characteristics of Binary Mixtures of Erythritol and MgCI2—6H2 O," Journal of Chemical Engineering of Japan, vol. 40, No. 1, 2007, pp. 80-84.

Liu et al., "Several Phase Change Energy Storage Materials," Fundamentals of Materials Science, East China Polytechnic University Press, 1st Ed., Sep. 2016, pp. 381-382.

Sep. 3, 2020 Office Action issued in Chinese Patent Application No. 201880005552.8.

Jan. 27, 2020 Search Report issued in European Patent Application No. 18751606.7.

Nov. 7, 2017 Office Action issued in Japanese Patent Application No. 2017-021668.

Jul. 31, 2018 Office Action issued in Japanese Patent Application No. 2018-006792.

May 15, 2018 Search Report issued in International Patent Application No. PCT/JP2018/003674.

Aug. 13, 2019 International Preliminary Report on Patentability issued in International Patent Application No. PCT/JP2018/003674.

Feb. 20, 2021 Office Action issued in Chinese Application 201880005552.8.

* cited by examiner

FIG. 4

| | Presence/Absence of erythritol | Content ratio [wt%] | | Melting peak [°C] | Amount of heat storage [kJ/kg] |
|---|---|---|---|---|---|
| | | Sodium hydroxymethane sulfinate dihydrate | Erythritol | | |
| Comparative Example 1 (Experiment 2) | Absent | 100 | 0 | 66.3/65.4 | 175 |
| Example 1 (Experiment 1) | Present | 50 | 50 | 51.7 | 147 |

FIG. 7

| | Presence/Absence of erythritol | Content ratio [wt%] | | Melting peak [°C] | Amount of heat storage [kJ/kg] |
|---|---|---|---|---|---|
| | | Sodium acetate trihydrate | Erythritol | | |
| Comparative Example 2 (Experiment 6) | Absent | 100 | 0 | 60.3 | 276 |
| Experiment 3 | Present | 30 | 70 | 41.8 | 155 |
| Example 2 Experiment 4 | Present | 50 | 50 | 40.5 | 235 |
| Experiment 5 | Present | 70 | 30 | 40.4 | 265 |

FIG. 12

| | Presence/Absence of erythritol | Content ratio [wt%] | | Melting peak [°C] | Amount of heat storage [kJ/kg] |
|---|---|---|---|---|---|
| | | Sodium diphosphate decahydrate | Erythritol | | |
| Comparative Example 3 (Experiment 10) | Absent | 100 | 0 | 82.7 | 241 |
| Example 3 — Experiment 7 | Present | 50 | 50 | 69.6 | 267 |
| Experiment 8 | | 70 | 30 | 68.5 | 241 |
| Experiment 9 | | 90 | 10 | 67.5/75.9 | 240 |

FIG. 17

| | Presence/Absence of ammonium sulfate | Content ratio [wt%] | | | Melting peak [°C] | Amount of heat storage [kJ/kg] |
|---|---|---|---|---|---|---|
| | | Ammonia alum dodecahydrate | Mannitol | Ammonium sulfate | | |
| Comparative Example 4 (Experiment 12) | Absent | 100 | 0 | 0 | 96.2 | 284 |
| Example 4 (Experiment 11) | Present | 73.6 | 8.0 | 18.4 | 81.7 | 247 |

FIG. 20

| | | Presence/Absence of ammonium sulfate | Content ratio [wt%] | | | Melting peak [°C] | Amount of heat storage [kJ/kg] |
|---|---|---|---|---|---|---|---|
| | | | Aluminum sulfate | Erythritol | Ammonium sulfate | | |
| Comparative Example 5 | Experiment 17 | Absent | 100 | 0 | 0 | 105.6 | 192 |
| Example 5 | Experiment 13 | Absent | 50 | 50 | 0 | 89.2 | 200 |
| | Experiment 14 | Absent | 70 | 30 | 0 | 89.0 | 183 |
| | Experiment 15 | Present | 45 | 45 | 10 | 73.3 | 247 |
| | Experiment 16 | Present | 63 | 27 | 10 | 75.2/73.2 | 222 |

LATENT HEAT STORAGE MATERIAL COMPOSITION

CROSS-REFERENCE TO RELATED APPLICATIONS

This is a US national phase application based on the PCT International Patent Application No. PCT/JP2018/003674 filed on Feb. 2, 2018, and claiming the priority of Japanese Patent Applications Nos. 2017-021668 filed on Feb. 8, 2017 and 2018-006792 filed on Jan. 18, 2018, the entire contents of which are herewith incorporated by reference.

TECHNICAL FIELD

The present invention relates to a latent heat storage material composition in which a latent heat storage material capable of storing or releasing heat utilizing the phenomenon of latent heat absorption and release in association with its phase change is mixed with an additive capable of adjusting a property of the latent heat storage material.

BACKGROUND ART

A latent heat storage material (or a phase change material (PCM)) has a property to store heat utilizing the phenomenon of latent heat absorption and release in association with its phase change. Waste heat that should be disposed ordinarily can be stored in the latent heat storage material and the stored heat can be released as required. In this manner, energy can be utilized effectively without waste. As one type of the latent heat storage material, ammonia alum dodecahydrate ($AlNH_4(SO_4)_2 \cdot 12H_2O$) (also referred to as "ammonia alum", hereinafter) is widely known.

With respect to properties, ammonia alum has a melting point of 93.5° C. and has a solid form at ambient temperature. In the case where the latent heat storage material comprises ammonia alum alone, when the temperature of waste heat is lower than the melting point of ammonia alum (i.e., 93.5° C.), ammonia alum is not melted even when ammonia alum is heated by the waste heat, and therefore cannot recover and store the waste heat. In order to solve this problem, a melting point modifier is generally added to a latent heat storage material for the purpose of adjusting the melting point of the latent heat storage material to a temperature corresponding to waste heat, as disclosed in Patent Literature 1.

Patent Literature 1 relates to a latent heat storage material comprising a eutectic salt containing ammonia alum ($AlNH_4(SO_4)_2 \cdot 12H_2O$) and ammonium chloride ($NH_4Cl$). According to Patent Literature 1, the melting point of ammonia alum can be adjusted to about 90 to 75° C. by adding ammonium chloride in an amount of 5 to 15 wt % to ammonia alum. With respect to the properties of the latent heat storage material in Patent Literature 1, the eutectic point of the latent heat storage material is a temperature of 75 to 78° C. and the amount of its latent heat storage is about 320 to 350 kJ/L when, for example, the available temperature difference from the eutectic point, i.e., $\Delta T$, is 30° C. (45 to 75° C.).

CITATIONS LIST

Patent Literature

Patent Literature 1: Japanese Patent No. 4830572

SUMMARY OF INVENTION

Technical Problems

The latent heat storage material of Patent Literature 1 is a eutectic salt composed of ammonia alum and ammonium chloride. As shown in FIG. 1 in Patent Literature 1, even when ammonium chloride is added in an amount of more than 15% by weight to ammonia alum, the melting point of the latent heat storage material of Patent Literature 1 cannot be lowered to a temperature lower than the eutectic point (75 to 78° C.). Therefore, when the temperature of waste heat is lower than the eutectic point, the latent heat storage material cannot be melted and the latent heat storage material of Patent Literature 1 cannot recover and store the waste heat.

Particularly in the field of industry in recent years, much attention has been focused on the development of a technique for recovering waste heat generated during the operation of a heat supply source such as a fuel cell system and an automotive engine and utilizing heat energy stored in a heat storage material aggressively. The waste heat to be generated in the heat supply source is heat having a temperature falling within the range from around 60° C. to around 80° C., such as heat generated from a so-called "low-temperature-range heat source" having a lower temperature than waste heat from a high-temperature range heat source such as an engine for a gas engine system used in cogeneration and a boiler. In Patent Literature 1, when it is intended to store waste heat generated from a low-temperature-range heat source in a heat storage material, the melting point of the latent heat storage material is higher than the temperature range of the waste heat generated from the low-temperature-range heat source and the latent heat storage material cannot be melted, and therefore it is impossible to store the waste heat.

The present invention is made for the purpose of solving the above-mentioned problems, and the object of the present invention is to provide a latent heat storage material composition in which an additive is added to a latent heat storage material to dramatically adjust the melting point of the latent heat storage material and a larger amount of heat storage can be achieved even when the additive is added.

Solutions to Problems

A latent heat storage material composition according to one embodiment of the present invention, which is made for solving the above-mentioned problems, is a latent heat storage material composition prepared by mixture of a latent heat storage material capable of storing or releasing heat and an additive capable of adjusting a property of the latent heat storage material, wherein the latent heat storage material comprises at least one inorganic salt hydrate containing $n_w$ ($2 \leq n_w$) molecules of hydration water, the additive is a melting point modifier configured to adjust a melting point of the latent heat storage material, the melting point modifier being a substance having a property to generate negative dissolution heat upon dissolution in the latent heat storage material, the melting point modifier contains at least a substance belonging to a sugar alcohol as a first additive, a melt of the latent heat storage material composition is a mixture of the latent heat storage material with the melting point modifier which is produced as the result of the dissolution of the sugar alcohol contained in the melting point modifier in the hydration water contained in the latent heat storage material, and the substance belonging to a sugar alcohol has a concentration that satisfies formulae (1) and (2) per 1 mol of the hydration water in the latent heat storage material in a whole amount of the latent heat storage material composition:

$$x_s = (m_s/M_s)/\Sigma_{k=1}^{N}(n_{wk} \times m_{ak}/M_{ak}) \quad \text{Formula (1)}$$

$$0.01 \leq x_s \leq 1 \quad \text{Formula (2)}$$

wherein:
- $x_s$: the number of moles of the "substance belonging to a sugar alcohol" per 1 mol of hydration water [mol/mol];
- $m_s$: the mass of the "substance belonging to a sugar alcohol" contained in the latent heat storage material composition [g];
- $M_s$: the molecular weight of the "substance belonging to a sugar alcohol" [g/mol];
- N: the total number of the latent heat storage materials constituting a latent heat storage material composition;
- $n_{wk}$: the hydration number of the latent heat storage material (k=1, 2, . . . , N);
- $m_{ak}$: the mass of the latent heat storage material contained in the latent heat storage material composition [g] (k=1, 2, . . . , N); and
- $M_{ak}$: the molecular weight of the latent heat storage material [g/mol] (k=1, 2, . . . , N).

According to this embodiment, hydration water of the latent heat storage material is present in a sufficient amount relative to the amount of the first additive (melting point modifier) that is a substance belonging to a sugar alcohol. Therefore, negative dissolution heat generated upon the dissolution of the melting point modifier in the hydration water of the latent heat storage material contributes to the increase in the amount of heat storage of the latent heat storage material composition according to this embodiment. In this regard, even if a portion of the contained melting point modifier still remains undissolved in the composition, when the still undissolved portion of the melting point modifier is melted, latent heat of fusion of the melting point modifier can contribute to the increase in the amount of heat storage of the latent heat storage material composition according to this embodiment. As a result, a total amount of heat, which is the sum total of latent heat of the latent heat storage material, negative dissolution heat generated upon the dissolution of the melting point modifier in the hydration water, and latent heat of fusion of the melting point modifier, is stored as endothermic heat in the latent heat storage material composition according to this embodiment.

Furthermore, the latent heat storage material composition according to this embodiment can achieve a heat storage amount, for example, as large as more than 250 kJ/kg, and can have such a property that the melting point is adjusted to a temperature lower by up to about 30° C. than the melting point of a latent heat storage material alone for example.

In the latent heat storage material composition according to the above-mentioned embodiment, the "substance having a property to generate negative dissolution heat" corresponds to a "substance belonging to a sugar alcohol", such as erythritol ($C_4H_{10}O_4$), xylitol ($C_5H_{12}O_5$), mannitol ($C_6H_{14}O_6$), sorbitol ($C_6H_{14}O_6$) and lactitol ($C_{12}H_{24}O_{11}$), also corresponds to a "substance belonging to a chloride", such as calcium chloride hexahydrate ($CaCl_2 \cdot 6H_2O$), magnesium chloride hexahydrate ($MgCl_2 \cdot 6H_2O$), potassium chloride (KCl) and sodium chloride (NaCl), and also corresponds to a "substance belonging to a sulfate salt", such as ammonium sulfate (($NH_4$)$_2SO_4$).

The "substance having a property to generate negative dissolution heat" may include at least one type of the "substance belonging to a sugar alcohol", or may include at least one type of the "substance belonging to a chloride", or may include at least one type of the "substance belonging to a sulfate salt". The "substance having a property to generate negative dissolution heat" may also include a mixture of any one of substances corresponding to the "substance belonging to a sugar alcohol" with any one of substances corresponding to the "substance belonging to a chloride". The "substance having a property to generate negative dissolution heat" may also include a mixture of any one of substances corresponding the "substance belonging to a sugar alcohol" with any one of substances corresponding to the "substance belonging to a sulfate salt".

The "substance having a property to generate negative dissolution heat" may also include a mixture of any one of substances corresponding the "substance belonging to a sugar alcohol", any one of substances corresponding to the "substance belonging to a chloride" and any one of substances corresponding to the "substance belonging to a sulfate salt" together (wherein the chloride and the sulfate salt may together form a mixed crystal).

Namely, the latent heat storage material contained in the latent heat storage material composition according to the above-mentioned embodiment comprises an inorganic salt hydrate. In the latent heat storage material composition according to this embodiment, a "substance having a property to generate negative dissolution heat" which can absorb heat from the outside to cause an endothermic heat reaction when dissolved in the inorganic salt hydrate (for example, including the case where the substance is dissolved in hydration water in the inorganic salt hydrate and the case where the inorganic salt hydrate contains, in the structure thereof, a molecule different from hydration water and capable of acting as a solvent and the substance is dissolved in a component other than hydration water) is defined as a "substance having a property to generate negative dissolution heat".

In the above-mentioned embodiment, it is preferred that the substance belonging to a sugar alcohol comprises at least one of erythritol ($C_4H_{10}O_4$), xylitol ($C_5H_{12}O_5$), and mannitol ($C_6H_{14}O_6$).

According to this embodiment, the melting point of the latent heat storage material composition according to this embodiment can be effectively adjusted to a lower temperature compared with the latent heat storage material alone. Furthermore, the substance belonging to a sugar alcohol itself has heat storage-release performance to store heat and release the heat, and the performance is an excellent property for a heat storage material. Therefore, when the melting point modifier is added, even if the mixing amount of the latent heat storage material relative to the whole weight of the latent heat storage material composition according to this embodiment is reduced, it becomes possible to effectively prevent the lowering of the amount of heat storage of the latent heat storage material composition according to this embodiment.

In the above-mentioned embodiment, it is preferred that a sulfate salt is added as a second additive that is different from the first additive, and the sulfate salt has a concentration that satisfies formulae (3) and (4) per 1 mol of the hydration water in the latent heat storage material in the whole amount of the latent heat storage material composition. In the above-mentioned embodiment, it is particularly preferred that the sulfate salt is ammonium sulfate (($NH_4$)$_2SO_4$).

$$x_t = (m_t/M_t)/\Sigma_{k=1}^{N}(n_{wk} \times M_{ak}/M_{ak}) \quad \text{Formula (3)}$$

$$0 \leq x_t \leq 0.1 \quad \text{Formula (4)}$$

wherein:
- $x_i$: the number of moles of the sulfate salt per 1 mol of hydration water [mol/mol];
- $m_i$: the mass of the sulfate salt contained as the second additive in the latent heat storage material composition [g];
- $M_i$: the molecular weight of the sulfate salt that serves as the second additive [g/mol];
- N: the total number of the latent heat storage materials constituting a latent heat storage material composition;
- $n_{wk}$: the hydration number of the latent heat storage material (k=1, 2, ..., N);
- $m_{ak}$: the mass of the latent heat storage material contained in the latent heat storage material composition [g] (k=1, 2, ..., N); and
- $M_{ak}$: the molecular weight of the latent heat storage material [g/mol] (k=1, 2, ..., N).

According to this embodiment, when a sulfate salt such as ammonium sulfate (($NH_4)_2SO_4$) is added as a second additive that serves as a melting point modifier in a relatively small amount as shown in formula (4), a latent heat storage material composition according to this embodiment containing the second additive is increased in the amount of heat storage by about 20% and has such a property that the melting point is lowered by around 15° C. compared with the case where only a first additive that serves as the melting point modifier is added to a latent heat storage material.

In the above-mentioned embodiment, it is preferred that the inorganic salt hydrate is a hydroxymethanesulfinate salt. In the above-mentioned embodiment, the hydroxymethanesulfinate salt is particularly preferably sodium hydroxymethanesulfinate dihydrate ($CH_3NaO_3S.2H_2O$).

According to this embodiment, a latent heat storage material composition according to this embodiment which contains a hydroxymethanesulfinate salt (e.g., sodium hydroxymethanesulfinate dihydrate) as the main component can be used, for example, in the case where the temperature range in which heat is stored and released is, for example, around 50° C. and a heat storage amount of about 150 kJ/kg is enough for use.

In the above-mentioned embodiment, it is preferred that the inorganic salt hydrate is an acetate salt. In the above-mentioned embodiment, it is particularly preferred that the acetate salt is sodium acetate trihydrate ($CH_3COONa.3H_2O$).

According to this embodiment, an acetate salt such as sodium acetate trihydrate can act as a latent heat storage material capable of storing or releasing heat, and negative dissolution heat (endothermic heat) is generated upon the dissolution of the added melting point modifier in hydration water in the acetate salt such as sodium acetate trihydrate. At the same time, latent heat (endothermic heat) in association with the melting of the latent heat storage material may be generated by the addition of an additive such as a first additive. Therefore, in the latent heat storage material composition according to this embodiment, which contains a latent heat storage material such as sodium acetate trihydrate as exemplified above as the main component, the melting point is lowered by, for example, about 20° C. compared with the melting point of the latent heat storage material alone, and this heat absorption enables the very high amount of heat storage that can exceed the amount of heat storage of the latent heat storage material alone. In addition, sodium acetate trihydrate is widely distributed in the market, and is therefore easily commercially available and inexpensive.

In the above-mentioned embodiment, it is preferred that the inorganic salt hydrate is a diphosphate salt (a pyrophosphate salt) or a phosphate salt. In the above-mentioned embodiment, the diphosphate salt is particularly preferably sodium diphosphate decahydrate ($Na_4P_2O_7.10H_2O$).

According to this embodiment, a diphosphate salt such as sodium diphosphate decahydrate or a phosphate salt can act as a latent heat storage material capable of storing or releasing heat, and negative dissolution heat (endothermic heat) is generated upon the dissolution of the added melting point modifier in hydration water in the diphosphate salt such as sodium diphosphate decahydrate or the phosphate salt. At the same time, latent heat (endothermic heat) in association with the melting of the latent heat storage material may be generated by the action of an additive such as a first additive.

Therefore, in the latent heat storage material composition according to this embodiment, which contains, as the main component, a latent heat storage material such as sodium diphosphate decahydrate as exemplified above, the melting point is lowered by, for example, about 15° C. compared with the melting point of the latent heat storage material alone, and this heat absorption enables the very high amount of heat storage that can exceed the amount of heat storage of the latent heat storage material alone. In addition, sodium diphosphate decahydrate is widely distributed in the market, and is therefore easily commercially available and inexpensive.

In the above-mentioned embodiment, it is preferred that the inorganic salt hydrate is alum hydrate.

According to this embodiment, in a latent heat storage material comprising alum hydrate, the latent heat in association with phase change is relatively large, and water capable of dissolving a "substance having a property to generate negative dissolution heat" is contained in the structure constituting alum hydrate. Therefore, in the latent heat storage material composition according to this embodiment which contains the latent heat storage material as the main component, the amount of heat storage that can be stored in the latent heat storage material can also be increased because the amount of heat storage is the sum total of a relatively large amount of latent heat of fusion which is generated in the alum alone, latent heat of fusion in association with an additive such as a first additive and negative dissolution heat. Therefore, the latent heat storage material composition according to this embodiment, which contains a latent heat storage material containing alum hydrate as the main component, is excellent, because the latent heat storage material composition has heat storage-releasing performance to store a large capacity of heat and release the heat.

In the latent heat storage material composition according to the above-mentioned embodiment, the term "alum hydrate" includes, for example, "alum" which is a composite sulfate salt of a monovalent cation sulfate salt $M^I_2(SO_4)$ and a trivalent cation sulfate salt $M^{III}_2(SO_4)_3$, such as ammonia alum dodecahydrate (also called as "ammonium aluminum sulfate dodecahydrate") ($AlNH_4(SO_4)_2.12H_2O$), potassium alum dodecahydrate (also called as "potassium aluminum sulfate dodecahydrate") ($AlK(SO_4)_2.12H_2O$), chromium alum (also called as "chromium potassium sulfate dodecahydrate") ($CrK(SO_4)_2.12H_2O$), and iron alum (also called as "ammonium iron(III) sulfate dodecahydrate") ($FeNH_4(SO_4)_2.12H_2O$).

The term "alum hydrate" also includes a heat storage material which contains, as the main component, a mixture or a mixed crystal of at least two substances belonging to an alum. The metal ion contained in "alum" may be an aluminum ion, a chromium ion or an iron ion, or may be a trivalent metal ion such as a cobalt ion and a manganese ion.

In the above-mentioned embodiment, it is preferred that the alum hydrate is ammonia alum dodecahydrate ($AlNH_4(SO_4)_2 \cdot 12H_2O$) or potassium alum dodecahydrate ($AlK(SO_4)_2 \cdot 12H_2O$).

According to this embodiment, ammonia alum dodecahydrate and potassium alum dodecahydrate are widely distributed in the market, and are therefore easily commercially available and inexpensive.

In the above-mentioned embodiment, it is preferred that the inorganic salt hydrate is a sulfate salt. In the above-mentioned embodiment, it is particularly preferred that the sulfate salt is aluminum sulfate hydrate ($Al_2(SO_4)_3 \cdot nH_2O$) ($2 \leq n$).

According to this embodiment, the sulfate salt such as aluminum sulfate hydrate can act as a latent heat storage material capable of storing or releasing heat, and negative dissolution heat (endothermic heat) is generated upon the dissolution of the added melting point modifier in hydration water in the sulfate salt such as aluminum sulfate hydrate. At the same time, latent heat (endothermic heat) in association with the melting of the latent heat storage material may be generated by the action of an additive such as a first additive. Therefore, in the latent heat storage material composition according to this embodiment which contains the latent heat storage material such as aluminum sulfate hydrate as the main component, the melting point is lowered by, for example, about 15° C. compared with the melting point of the latent heat storage material alone, and this heat absorption enables the very high amount of heat storage that is larger than 200 kJ/kg.

The latent heat storage material composition according to another embodiment of the present invention which is provided for the purpose of solving the above-mentioned problems is characterized in that the latent heat storage material composition prepared by mixture of a latent heat storage material capable of storing or releasing heat and an additive capable of adjusting a property of the latent heat storage material, wherein the latent heat storage material comprises an inorganic salt hydrate containing 12 or more molecules of hydration water, the additive is a melting point modifier configured to adjust a melting point of the latent heat storage material, the melting point modifier being a substance having a property to generate negative dissolution heat upon dissolution in the latent heat storage material, the melting point modifier contains at least a substance belonging to a sugar alcohol, a melt of the latent heat storage material composition is a mixture of the latent heat storage material with the melting point modifier which is produced as the result of the dissolution of the sugar alcohol contained in the melting point modifier in the hydration water contained in the latent heat storage material, and a mixing amount of the substance belonging to a sugar alcohol relative to the whole amount of the latent heat storage material composition falls within a range from 1.59 to 5.57 mol per 1 mol of the latent heat storage material.

According to this embodiment, the latent heat storage material composition according to this embodiment can store waste heat having a temperature falling within in a temperature range from around 60° C. to around 80° C., and the melting point of the latent heat storage material composition according to this embodiment can be lowered by about 30° C. or more than for example the melting point of ammonia alum dodecahydrate alone (93.5° C.). Particularly, even if the mixing amount of the substance belonging to a sugar alcohol contained in the latent heat storage material composition according to this embodiment varies during use, the melting point of the latent heat storage material composition according to this embodiment can be kept at a temperature of about 75° C. as long as the mixing amount of the substance falls within the range from 1.59 to 5.57 mol per 1 mol of the latent heat storage material. When the latent heat storage material according to this embodiment comprises an inorganic salt hydrate containing 12 or more molecules of hydration water, such as alum hydrate, the latent heat storage material according to this embodiment can keep a large amount of heat storage, and therefore the latent heat storage material composition according to this embodiment which contains the latent heat storage material can keep a larger amount of heat storage.

Furthermore, the amount of heat storage of the latent heat storage material composition according to this embodiment never decreases due to the addition of the melting point modifier according to this embodiment. In a combination of a latent heat storage material comprising an inorganic salt hydrate such as alum hydrate and a melting point modifier that is a substance belonging to a sugar alcohol, the sugar alcohol is dissolved in hydration water contained in the inorganic salt hydrate and the viscosity is increased, and therefore it becomes possible to prevent the separation between the latent heat storage material and the melting point modifier due to the difference in density between the latent heat storage material and the melting point modifier. As a result, the inhomogeneous mixing of the latent heat storage material with the melting point modifier can be avoided and, therefore, the latent heat storage material composition according to this embodiment can become a chemically stable heat storage material.

In the latent heat storage material composition according to the above-mentioned embodiment, the "substance having a property to generate negative dissolution heat" corresponds to a "substance belonging to a sugar alcohol" such as erythritol ($C_4H_{10}O_4$), xylitol ($C_5H_{12}O_5$), mannitol ($C_6H_{14}O_6$), sorbitol ($C_6H_{14}O_6$) and lactitol ($C_{12}H_{24}O_{11}$). The "substance having a property to generate negative dissolution heat" also corresponds to a "substance belonging to a chloride" such as calcium chloride hexahydrate ($CaCl_2 \cdot 6H_2O$), magnesium chloride hexahydrate ($MgCl_2 \cdot 6H_2O$), potassium chloride (KCl) and sodium chloride (NaCl).

The "substance having a property to generate negative dissolution heat" may comprise at least one of substances corresponding to the "substance belonging to a sugar alcohol", or may comprise at least one of substances corresponding to the "substance belonging to a chloride". In addition, the "substance having a property to generate negative dissolution heat" may comprise a mixture of any one of substances corresponding to the "substance belonging to a sugar alcohol" with any one of substances corresponding to the "substance belonging to a chloride".

Namely, the latent heat storage material contained in the latent heat storage material composition according to the above-mentioned embodiment comprises an inorganic salt hydrate. In the latent heat storage material composition according to this embodiment, a "substance having a property to generate negative dissolution heat" which can absorb heat from the outside to cause an endothermic heat reaction when dissolved in the inorganic salt hydrate (for example, including the case where the substance is dissolved in hydration water in the inorganic salt hydrate and the case where the inorganic salt hydrate contains, in the structure thereof, a molecule different from hydration water and capable of acting as a solvent and the substance is dissolved in a component other than hydration water) is defined as a "substance having a property to generate negative dissolution heat".

In the latent heat storage material composition according to the above-mentioned embodiment, the "latent heat storage material comprising an inorganic salt hydrate" includes "alum" which is a double sulfate salt of a monovalent cation sulfate salt $M^I_2(SO_4)$ and a trivalent cation sulfate salt $M^{III}_2(SO_4)_3$, such as ammonia alum dodecahydrate (also called as "ammonium aluminum sulfate dodecahydrate") ($AlNH_4(SO_4)_2 \cdot 12H_2O$), potassium alum dodecahydrate (also called as "potassium aluminum sulfate dodecahydrate") ($AlK(SO_4)_2 \cdot 12H_2O$), chromium alum (also called as "chromium potassium sulfate dodecahydrate) ($CrK(SO_4)_2 \cdot 12H_2O$), and iron alum (also called as "ammonium iron(III) sulfate dodecahydrate") ($FeNH_4(SO_4)_2 \cdot 12H_2O$).

The term "alum hydrate" also includes a heat storage material which contains, as the main component, a mixture or a mixed crystal of at least two substances belonging to an alum. The metal ion contained in "alum" may be an aluminum ion, a chromium ion or an iron ion, or may be a trivalent metal ion such as a cobalt ion and a manganese ion.

In the above-mentioned embodiment, it is preferred that the substance belonging to a sugar alcohol is erythritol ($C_4H_{10}O_4$).

According to this embodiment, the melting point of the latent heat storage material composition according to this embodiment can be adjusted to a temperature of, for example, about 75° C. Furthermore, the latent heat storage material composition according to this embodiment can have heat storage-release performance to store heat in a large capacity, i.e., more than about 300 (kJ/kg), and release the heat. This performance is an excellent property for use as a heat storage material.

In the above-mentioned embodiment, it is preferred that the substance belonging to a sugar alcohol is xylitol ($C_5H_{12}O_5$).

According to this embodiment, the melting point of the latent heat storage material composition according to this embodiment can be adjusted to a temperature of, for example, about 60° C. Furthermore, the latent heat storage material composition according to this embodiment can have heat storage-release performance to store heat in a large capacity, i.e., more than about 300 (kJ/kg), and release the heat. This performance is an excellent property for use as a heat storage material.

In the above-mentioned embodiment, it is preferred that the inorganic salt hydrate is alum hydrate.

According to this embodiment, in the latent heat storage material comprising alum hydrate, the latent heat in association with phase change is relatively large, and water in which the "substance having a property to generate negative dissolution heat" is to be dissolved is contained in the structure of alum hydrate. Therefore, in the latent heat storage material composition according to this embodiment, which contains the latent heat storage material of this type as the main component, the amount of heat that can be stored in the latent heat storage material can be increased, because the amount of the heat is the sum total of a relatively large latent heat of fusion and negative dissolution heat. The latent heat storage material composition according to this embodiment, which contains alum hydrate as the main component, is excellent, because the latent heat storage material composition can have heat storage-release performance to store heat in a large capacity, and release the heat.

In the above-mentioned embodiment, it is preferred that the alum hydrate is ammonia alum dodecahydrate ($AlNH_4(SO_4)_2 \cdot 12H_2O$) or potassium alum dodecahydrate ($AlK(SO_4)_2 \cdot 12H_2O$).

According to this embodiment, ammonia alum dodecahydrate and potassium alum dodecahydrate have been distributed widely in the market, and are therefore easily commercially available and inexpensive.

Advantageous Effects of Invention

As mentioned above, the latent heat storage material composition of the present invention has excellent effects such that the melting point of a latent heat storage material can be modified greatly by adding an additive to the latent heat storage material and a larger amount of heat storage can be achieved even though the additive is added.

BRIEF DESCRIPTION OF DRAWINGS

FIG. 4 is a table relating to the latent heat storage material composition of Example 1, in which the experiment conditions employed in Example 1 and Comparative Example 1 and the measurement results of melting points and amounts of heat storage measured by DSC are shown together in Embodiment 1;

FIG. 7 relates to the latent heat storage material composition of Example 2 in Embodiment 1, and is a table showing the experimental conditions to be employed in Example 2 and Comparative Example 2 and the measurement results of the melting point and amount of heat storage as measured by DSC together;

FIG. 12 relates to the latent heat storage material composition of Example 3 in Embodiment 1, and is a table showing the experimental conditions employed in Example 3 and Comparative Example 3 and the measurement results of the melting point and amount of heat storage as measured by DSC together;

FIG. 17 relates to the latent heat storage material composition of Example 4 in Embodiment 1, and is a table showing the experimental conditions employed in Example 4 and Comparative Example 4 and the measurement results of the melting point and amount of heat storage as measured by DSC together;

FIG. 20 relates to the latent heat storage material composition of Example 5 in Embodiment 1, and is a table showing the experimental conditions employed in Experiments 13 to 17 according to Example 5 and Comparative Example 5 and the measurement results of the melting point and amount of heat storage as measured by DSC together;

MODE FOR CARRYING OUT THE INVENTION

Embodiment 1

Figure 1A:
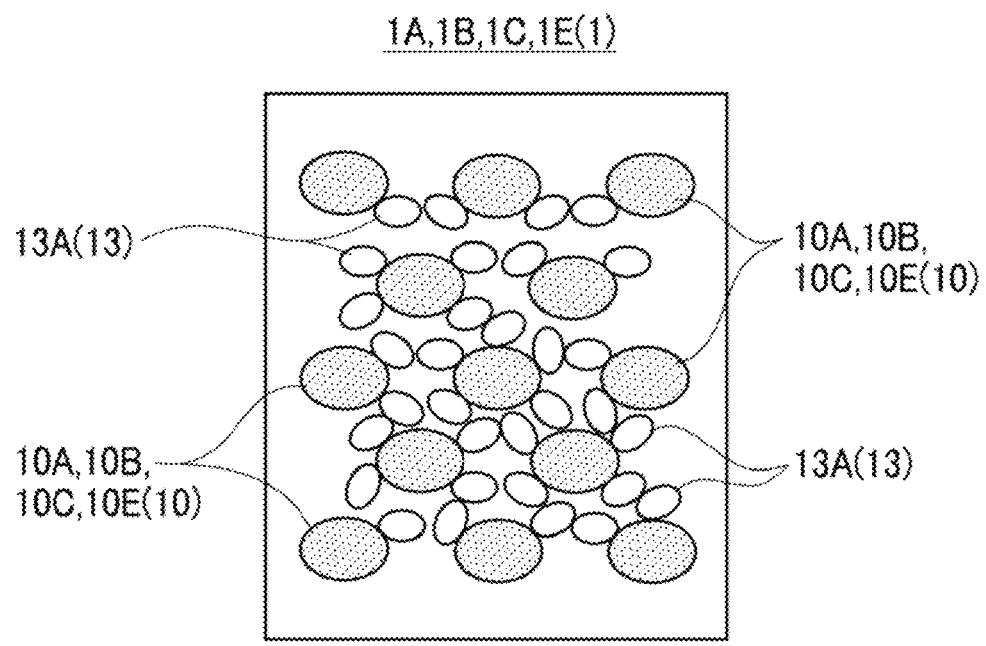
FIG. 1A is a diagram schematically illustrating the components of each of latent heat storage material compositions of Examples 1 to 3 and 5 in Embodiment 1.
Figure 1B:
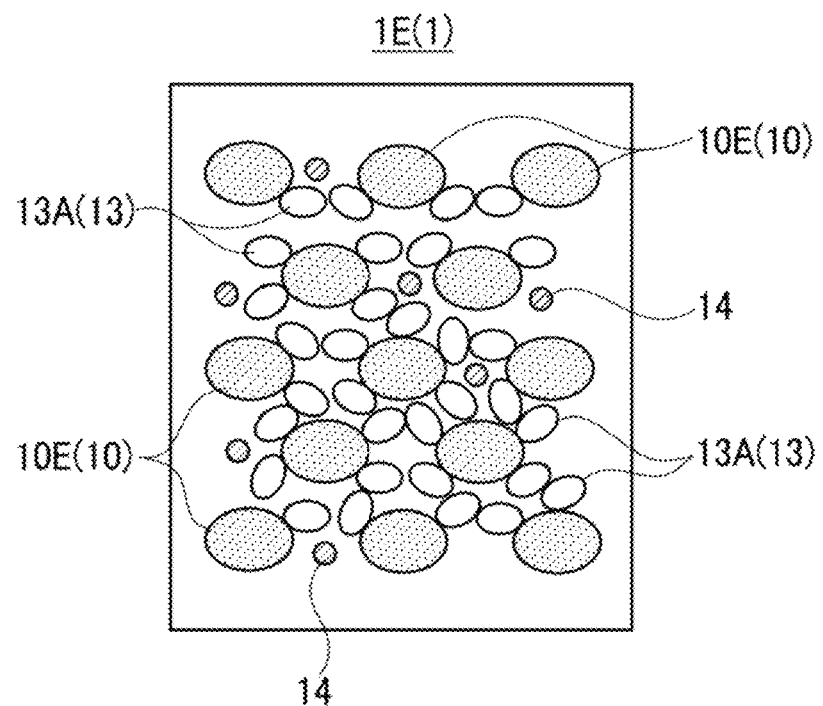
FIG. 1B is a diagram schematically illustrating the components of the latent heat storage material composition of Example 5 in Embodiment 1.
Figure 2:
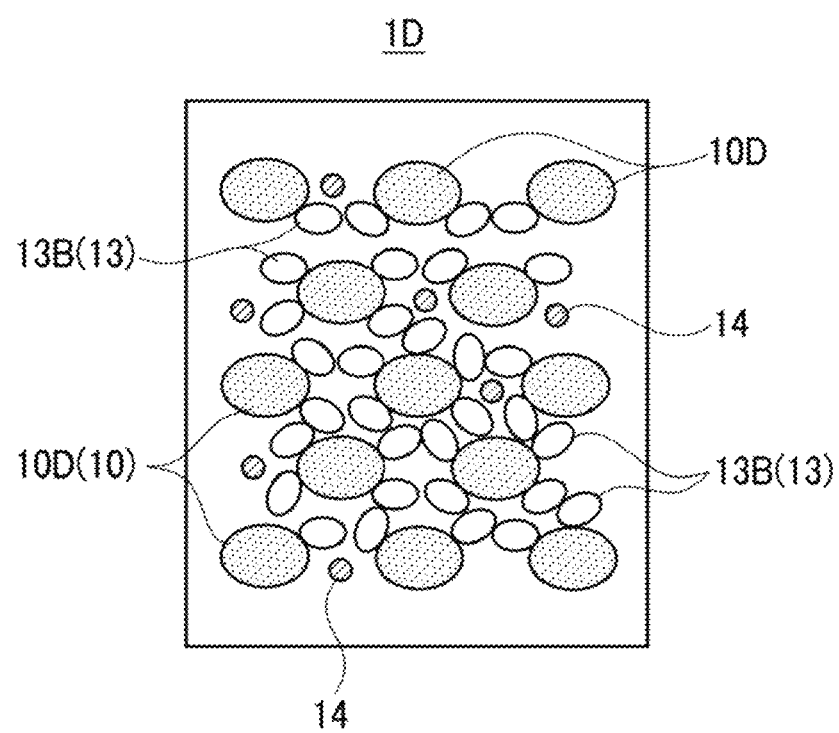
FIG. 2 is a diagram schematically illustrating the components of a latent heat storage material composition of Example 4 in Embodiment 1.

Hereinbelow, a latent heat storage material composition according to one aspect of the present invention will be described in detail based on Embodiment 1 (Examples 1 to 5) with reference to FIG. 1A to FIG. 26. FIG. 1A is a diagram schematically illustrating the components of each of latent heat storage material compositions of Examples 1 to 3 and 5, and FIG. 1B is a diagram schematically illustrating the components of the latent heat storage material composition of Example 5 in Embodiment 1. FIG. 2 is a diagram schematically illustrating the components of a latent heat storage material composition of Example 4.

The latent heat storage material composition 1 according to Embodiment 1 is prepared by mixing a latent heat storage material 10 capable of storing or releasing heat with an additive capable of modifying a property of the latent heat storage material 10, and is packed in a heat storage material packaging container (not shown) in a liquid-tight and air-tight manner while preventing the leakage from the container. The heat storage material packaging container having the latent heat storage material composition 1 packed therein is housed in a space in a given housing means for heat energy utilization purposes, and the latent heat storage material composition 1 is used in the inside or outside of the heat storage material packaging container having the latent heat storage material composition 1 packed therein while repeating a heat storage/release cycle several times by utilizing the absorption or release of latent heat in association with the phase change between a liquid phase and a solid phase.

Namely, the latent heat storage material composition 1 makes it possible to store waste heat, which should ordinarily be disposed, in the latent heat storage material 10 and to release the stored heat as required. More specifically, the latent heat storage material composition 1 can be used for recovering waste heat that is generated in a heat supply source such as heat or exhaust gas generated from a solar power-generating system, a fuel cell system, an automotive engine or the like during the operation of the heat supply source, and utilizing heat energy stored in the latent heat storage material 10 aggressively. In recent years, the latent heat storage material composition 1 is expected to be used in various fields by widely controlling the temperature of the melting point of the latent heat storage material 10 at which phase change occurs. For example, the latent heat storage material composition 1 can be used in a daily dietary life, for example, a period until a meal is served, a case where a packed lunch or a meal is to be kept warm, a period until eating and a case where a packed lunch or a food material is to be kept warm, by releasing the stored latent heat.

In the latent heat storage material composition 1, the latent heat storage material 10 comprises at least one inorganic salt hydrate containing $n_w$ ($2 \leq n_w$) molecules of hydration water. The additive is a melting point modifier 13 (13A, 13B) that is capable of adjusting the melting point of the latent heat storage material 10 and is a substance having a property to generate negative dissolution heat upon the dissolution in hydration water in the latent heat storage material 10. The melting point modifier 13 contains at least a substance belonging to a sugar alcohol as a first additive, and a melt of the latent heat storage material composition 1 is a mixture of the latent heat storage material 10 with the melting point modifier 13, in which the sugar alcohol contained in the melting point modifier 13 is dissolved in the hydration water contained in the latent heat storage material 10 (hydration water 12 in FIG. 3).

The substance belonging to a sugar alcohol (the melting point modifier 13) is contained at a concentration that satisfies formulae (1) and (2) per 1 mol of hydration water in the latent heat storage material 10 relative to the whole amount of the latent heat storage material composition 1:

$$x_s = (m_s/M_s)/\Sigma_{k=1}^{N}(n_{wk} \times m_{ak}/M_{ak}) \quad \text{Formula (1)}$$

$$0.01 \leq x_s \leq 1 \quad \text{Formula (2)}$$

wherein:
- $x_s$: the number of moles of a "substance belonging to a sugar alcohol" per 1 mol of hydration water [mol/mol];
- $m_s$: the mass of a "substance belonging to a sugar alcohol" contained in a latent heat storage material composition [g]; $M_s$: the molecular weight of a "substance belonging to a sugar alcohol" [g/mol]; N: the total number of latent heat storage materials constituting a latent heat storage material composition;
- $n_{wk}$: the hydration number of a latent heat storage material (k=1, 2, . . . , N);
- $m_{ak}$: the mass of a latent heat storage material contained in a latent heat storage material composition [g] (k=1, 2, . . . , N); and
- $M_{ak}$: the molecular weight of a latent heat storage material [g/mol] (k=1, 2, . . . , N).

Example 1

Firstly, the outline of a latent heat storage material composition 1A (1) according to Example 1 will be described. As shown in FIG. 1A, the latent heat storage material composition 1A according to Example 1 is prepared by mixing a latent heat storage material 10A (latent heat storage material 10) capable of storing or releasing heat through the absorption or release of latent heat in association with phase change with a melting point modifier 13A (melting point modifier 13) that serves as a first additive. Example 1 is a case where the temperature range for the storage of heat and the release of the heat by the latent heat storage material composition 1A is adjusted to around 50° C. In the latent heat storage material composition 1A, the latent heat storage material 10A that serves as the main component is an inorganic salt hydrate 10 of a hydroxymethanesulfinate salt having ($n_w$=2) molecules of hydration water.

More specifically, the latent heat storage material 10A used in Example 1 is sodium hydroxymethanesulfinate dihydrate ($CH_3NaO_3S \cdot 2H_2O$), and the property of sodium hydroxymethanesulfinate dihydrate is a solid substance that has a hydration number of 2, a molecular weight [g/mol] of 154.12 and a melting point of about 65° C., and is easily soluble in water in a temperature range lower than the melting point.

In this section, the melting point modifier 13 is described briefly employing specific examples. However, the definition of a "substance having a property to generate negative dissolution heat" will be described in Example 2 in detail. As mentioned above, the melting point modifier 13 is an additive capable of adjusting the melting point of the latent heat storage material 10 (inorganic salt hydrate 10) to an arbitrary temperature as required. The melting point modifier 13 is a substance having a property to generate negative dissolution heat upon the dissolution in the inorganic salt hydrate 10.

More specifically, the melting point modifier 13 comprises a substance belonging to a sugar alcohol that can be used primarily as a food additive, such as erythritol ($C_4H_{10}O_4$), xylitol ($C_5H_{12}O_5$) and mannitol ($C_6H_{14}O_6$). A sugar alcohol is one type of sugar produced by reducing a carbonyl group in an aldose or a ketose, and can be dissolved in water. The melting point modifier 13 is erythritol (melting point modifier 13A) in Examples 1 to 3 and 5, and erythritol has properties such that the molecular weight [g/mol] is 122.12 and the melting point is about 119° C.

Next, for the purpose of confirming the influence of the melting point modifier 13A added in the latent heat storage material composition 1A on heat storage performance, research experiments, i.e., Experiments 1 and 2, were carried out. Experiment 1 is an experiment relating to Example 1, in which a latent heat storage material composition 1A prepared by adding a melting point modifier 13A (erythritol) to a latent heat storage material 10A is used as a sample. Experiment 2 is an experiment relating to Comparative Example 1 for Example 1, in which the latent heat storage material 10A alone without addition of the melting point modifier 13A is used as a sample.

<Method for Experiment>

In the research experiment, the temperature range in which a sample can be melted is confirmed in advance by a heating test in a thermostatic bath or the like, and the sample (10 mg) is placed on a sample table while being air-tightly sealed in an aluminum-made container, and the amount of heat storage of the sample is measured using a well-known differential scanning calorimetric measurement device (DSC: differential scanning calorimetry). The heat storage amount is measured under such temperature conditions that the sample is heated from ambient temperature to a temperature at which the sample can be melted sufficiently at a heating rate of 2° C./min. and the sample is held at a preset temperature for 5 minutes or longer after the temperature of the sample reaches the preset temperature.

<Common Condition Between Experiments 1 and 2>
Latent heat storage material 10A: sodium hydroxymethanesulfinate dihydrate ($CH_3NaO_3S.2H_2O$)
<Conditions for Experiment 1>
Components of a latent heat storage material composition 1A: a latent heat storage material 10A and a melting point modifier 13A
Melting point modifier 13A: erythritol ($C_4H_{10}O_4$)
Mixing amount of erythritol relative to the whole weight of a latent heat storage material composition 1A: 50 wt %
(latent heat storage material 10A: melting point modifier 13A=1:1)
Number of moles $x_s$ of erythritol per 1 mol of hydration water in formula (1)=0.631 [mol/mol]
<Conditions for Experiment 2>
Melting point modifier 13A: not added
Mixing amount of a latent heat storage material 10A: 100 wt %
(latent heat storage material 10A: melting point modifier 13A=100:0)

Figure 5:
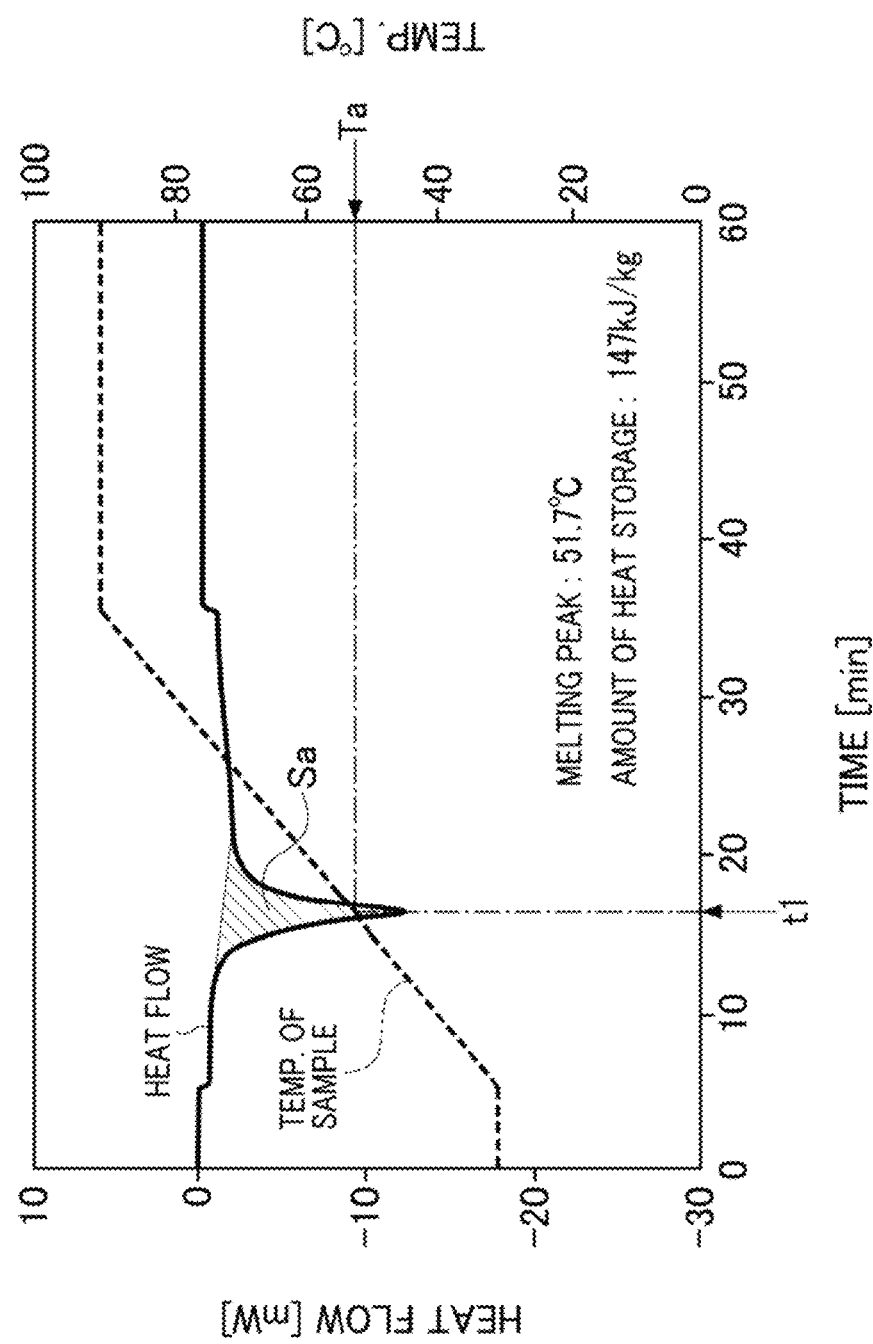
FIG. 5 is a graph showing the melting point and the amount of heat storage of the latent heat storage material composition of Experiment 1 in Example 1 in Embodiment 1.
Figure 6:
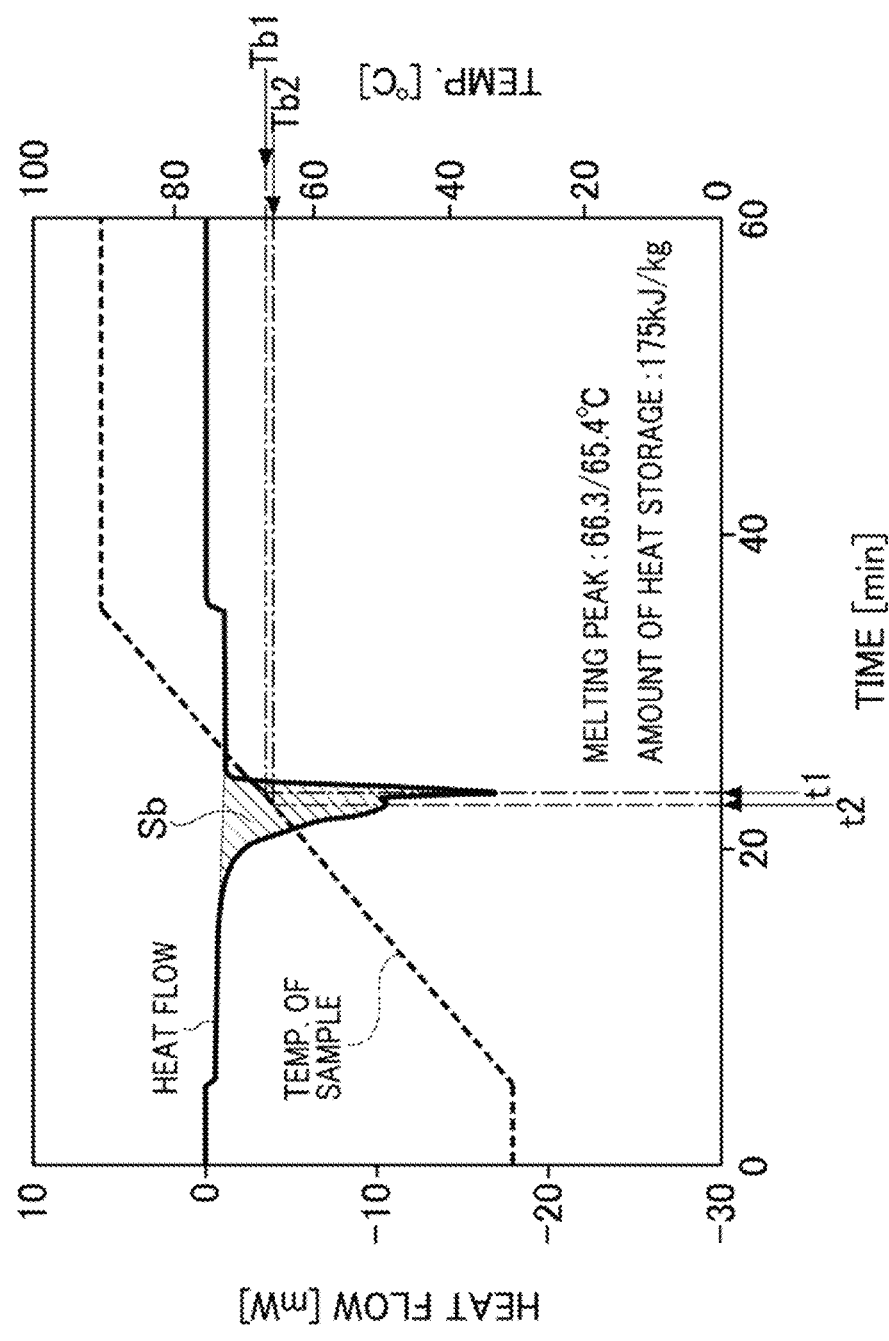
FIG. 6 is a graph showing the melting point and the amount of heat storage of the latent heat storage material composition of Experiment 2 in Comparative Example 1 in Embodiment 1.

FIG. 4 is a table relating to the latent heat storage material composition of Example 1, in which the experiment conditions employed in Example 1 and Comparative Example 1 and the measurement results of the melting points and amount of heat storage measured by DSC are shown together. FIG. 5 is a graph showing the melting point and the amount of heat storage of the latent heat storage material composition of Experiment 1 in Example 1. FIG. 6 is a graph showing the melting point and the heat storage amount of the latent heat storage material composition of Experiment 2 in Comparative Example 1.

In each of the graphs shown in FIG. 5 and FIG. 6, the scale on a left-side vertical axis shows the amount of heat stored in or released from a sample per unit time, wherein a value indicated in the "negative" zone in the scale shows the amount of heat absorbed in a sample and a value indicated in the "positive" zone in the scale shows the amount of heat released from a sample. In a line figure showing a heat flow that varies with the elapse of time, a sample shows the maximum amount of heat storage at a temperature T corresponding to time t at which the absolute value of the heat flow increases transiently and reaches the maximum value (peak top) (wherein the temperature T is defined as a melting point).

In each of the line figures showing heat flows, the latent heat of fusion of a sample is expressed in the size of a peak area S (a shaded area in each of FIGS. 5 and 6) which is determined by integrating heat flow in a time range between a time point at which a peak of the amount of heat storage starts and a time point at which the peak is ended. The unit for the heat flow of a sample is expressed in [mW], and the unit for the mass of a sample is expressed in [mg]. With respect to the unit for the amount of heat storage, the unit for the amount of heat storage is converted and is expressed in [kJ/kg]. The same applies to graphs in examples other than Example 2.

<Results of Experiments>

In the latent heat storage material composition 1A of Example 1 in Experiment 1, as shown in FIG. 5, the temperature Ta corresponding to the endothermic peak time t1 was 51.7° C. and the amount of heat storage Sa was 147 kJ/kg. In the latent heat storage material 10A of Comparative Example 1 in Experiment 2, as shown in FIG. 6, the temperature Tb1 corresponding to the first endothermic peak time t1 was 66.3° C., the temperature Tb2 corresponding to the second endothermic peak time t2 was 65.4° C., and the amount of heat storage Sb was 175 kJ/kg.

<Discussion>

Figure 26:
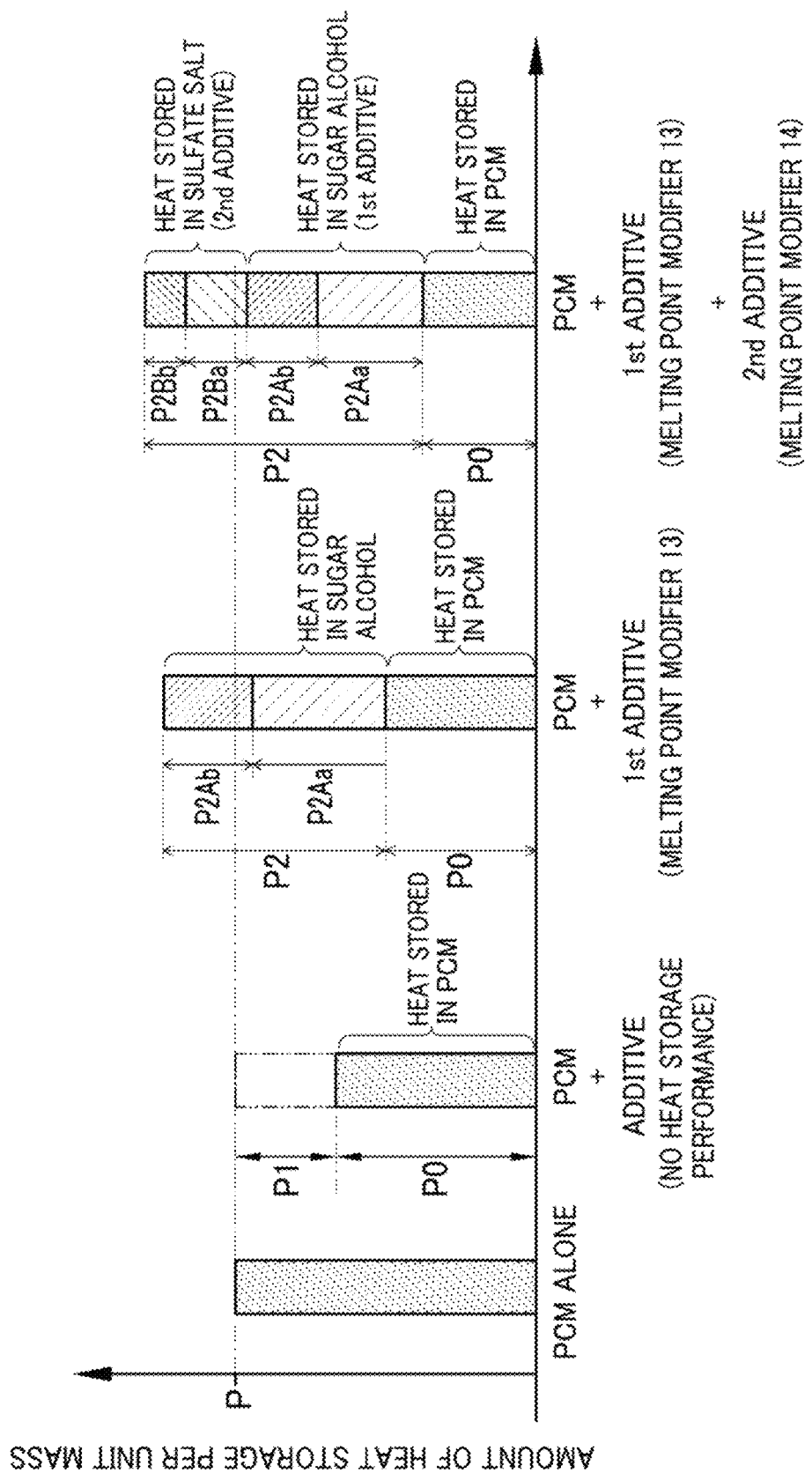
FIG. 26 is an explanatory diagram showing a graph illustrating the significance of the latent heat storage material composition according to Embodiment 1.

FIG. 26 is an explanatory diagram showing a graph illustrating the significance of the latent heat storage material composition according to Embodiment 1. In FIG. 26, a latent heat storage material 10 alone (latent heat storage materials 10A to 10E) is expressed as "PCM". The result of Experiment 2 in Comparative Example 1 generally agrees with the melting point (about 65° C.) of sodium hydroxymethanesulfinate dihydrate (latent heat storage material 10A) that is publicly known. With respect to sodium hydroxymethanesulfinate dihydrate, the amount of heat storage P shown in FIG. 26 is 175 (kJ/kg).

In contrast, in Experiment 1 in Example 1, sodium hydroxymethanesulfinate dihydrate (latent heat storage material 10A) and erythritol (melting point modifier 13A) are mixed at a mixing ratio of 1:1 in the latent heat storage material composition 1A. Therefore, it is considered that the amount of heat storage, i.e., the amount of heat stored in PCM, is P0=87.5 (kJ/kg) which corresponds to 50% of the amount of heat storage P=175 (kJ/kg) of the latent heat storage material 10A alone. However, the actually measured heat storage amount Sa of the latent heat storage material composition 1A was 147 (kJ/kg). It is considered that this is because the amount of heat storage P2≈60 (kJ/kg) derived from erythritol is added to the amount of heat storage P0=87.5 (kJ/kg) resulting from the heat storage by PCM, as shown in FIG. 26.

Namely, it is assumed that the amount of heat storage derived from erythritol is an amount of absorbed heat P2 determined based on negative dissolution heat P2Aa generated upon the dissolution of erythritol (melting point modifier 13A) in hydration water 12 in sodium hydroxymethanesulfinate dihydrate (latent heat storage material 10A) and a latent heat of fusion P2Ab of the melting point modifier 13A, as shown in FIG. 26. It is also assumed that the reason why the melting point of the latent heat storage material composition 1A is lower by around 15° C. than that of the latent heat storage material 10A alone is because erythritol acts as a melting point modifier.

The latent heat storage material composition 1A can be used in the case where it is desired to adjust each of a temperature range in which heat is stored in the latent heat storage material composition 1A and a temperature range in which the stored heat is released to around 50° C. without reducing the amount of heat storage of the latent heat storage material 10A.

Example 2

Next, the outline of a latent heat storage material composition according to Example 2 will be described. As shown in FIG. 1A, the latent heat storage material composition 1B according to Example 2 is prepared by mixing a latent heat storage material 10B (latent heat storage material 10) capable of storing or releasing heat through the absorption or release of latent heat in association with phase change with a melting point modifier 13A (melting point modifier 13) that is a first additive. Example 2 is a case where each of the temperature range in which heat is stored in the latent heat storage material composition 1B and the temperature range in which the heat is released by the latent heat storage material composition 1B is adjusted to around 40° C. In the latent heat storage material composition 1B, the latent heat storage material 10B that is the main component is an acetic acid inorganic salt hydrate 10 containing ($n_w$=3) molecules of hydration water.

More specifically, in Example 2, the latent heat storage material 10B is sodium acetate trihydrate ($CH_3COONa.3H_2O$), and sodium acetate trihydrate is a substance which is easily soluble in water and has such properties that the hydration number is 3, the molecular weight [g/mol] is 136.08 and the melting point is 58° C.

The definition of the above-mentioned term "substance having a property to generate negative dissolution heat" is now described. As mentioned above, the latent heat storage material composition 1 is prepared by mixing the latent heat storage material 10 containing the inorganic salt hydrate containing $n_w$ ($2 \leq n_w$) molecules of hydration water, which is the main component, with the melting point modifier 13. In the latent heat storage material composition 1 according to Embodiment 1, a substance capable of absorbing heat from the outside to cause an endothermic heat reaction in the melting point modifier 13 upon the dissolution of the melting point modifier 13 in the latent heat storage material 10 is defined as a "substance having a property to generate negative dissolution heat".

The "substance having a property to generate negative dissolution heat" also includes, for example, a "substance belonging to a sugar alcohol" such as sorbitol ($C_6H_{14}O_6$) and lactitol ($C_{12}H_{24}O_{11}$), in addition to erythritol, xylitol and mannitol exemplified above. The "substance having a property to generate negative dissolution heat" also includes, a "substance belonging to a chloride" such as calcium chloride hexahydrate ($CaCl_2.6H_2O$), magnesium chloride hexahydrate ($MgCl_2.6H_2O$), potassium chloride (KCl) and sodium chloride (NaCl). In addition, the "substance having a property to generate negative dissolution heat" also includes a "substance belonging to a sulfate salt" such as ammonium sulfate (($NH_4)_2SO_4$) as mentioned below.

The "substance having a property to generate negative dissolution heat" may also include at least one type of the "substance belonging to a sugar alcohol", or at least one type of the "substance belonging to a chloride", or at least one type of the "substance belonging to a sulfate salt", besides the "substance belonging to a sugar alcohol. In addition, a mixture of any one of substances corresponding to the "substance belonging to a sugar alcohol" with any one of substances corresponding to the "substance belonging to a chloride" is also included. In addition, a mixture of any one of substances corresponding to the "substance belonging to a sugar alcohol" with any one of substances corresponding to the "substance belonging to a sulfate salt" is also included.

In addition, a mixture of any one of substances corresponding to the "substance belonging to a sugar alcohol", any one of substances corresponding to the "substance belonging to a chloride" and any one of substances corresponding to the "substance belonging to a sulfate salt" is also included (in which a case where a mixed crystal composed of a chloride and a sulfate salt may also be included).

In addition, ammonium nitrate, potassium chlorate or the like, which is required to be handled carefully and are cannot be used preferably in the latent heat storage material composition of Embodiment 1, also corresponds to the "substance having a property to generate negative dissolution heat", because the substance can cause an endothermic heat reaction upon the dissolution in water.

Figure 3:
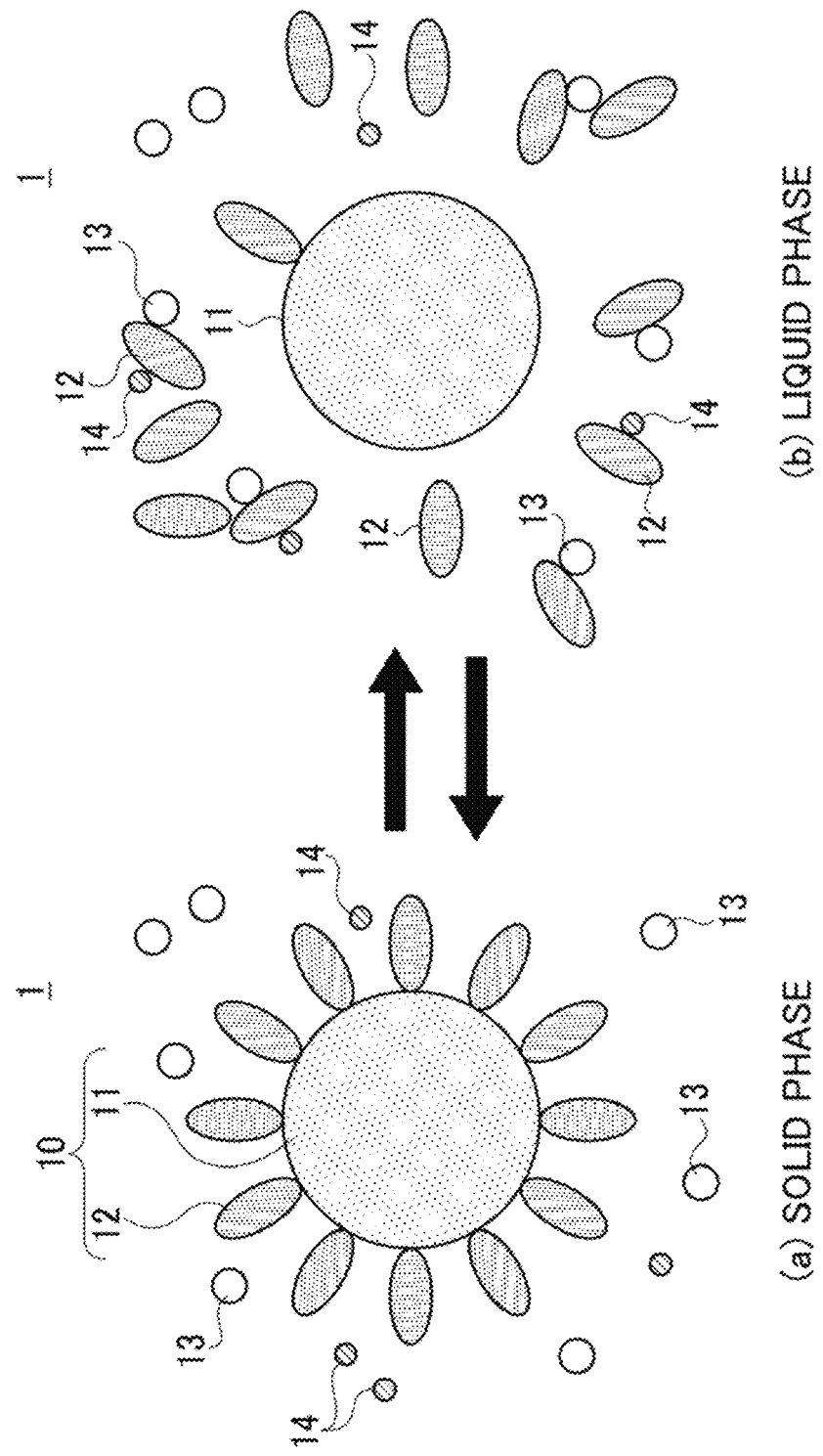
FIG. 3 is a schematic diagram showing the state of a solid phase and the state of a liquid phase which are formed as the result of the phase change of the latent heat storage material composition according to Embodiment 1.

FIG. 3 is a schematic diagram showing the state of a solid phase and the state of a liquid phase which are formed as the result of the phase change of the latent heat storage material composition according to Embodiment 1. In FIG. 3, ammonia alum dodecahydrate is shown as an example of the latent heat storage material 10 (inorganic salt hydrate 10). However, FIG. 3 also schematically illustrates a case of an inorganic salt hydrate 10 containing $n_w$ ($2 \leq n_w$) molecules of hydration water, such as sodium hydroxymethanesulfinate dihydrate (latent heat storage material 10A), sodium acetate trihydrate (latent heat storage material 10B), sodium diphosphate decahydrate (latent heat storage material 10C), and aluminum sulfate hydrate (latent heat storage material 10E), in addition to ammonia alum dodecahydrate (latent heat storage material 10D).

When the temperature of the latent heat storage material composition 1 is lower than the melting point of the latent heat storage material 10 which has been adjusted with the melting point modifier 13 (wherein a melting point modifier 14 may be also contained in addition to the melting point modifier 13), the latent heat storage material composition 1 is in a solid phase and the inorganic salt hydrate 10 (latent heat storage material 10) composed of the inorganic salt anhydride 11 and hydration water 12 cannot dissolve the melting point modifier 13, as shown in FIG. 3(a). In Example 2, the latent heat storage material 10B is sodium acetate trihydrate and therefore the inorganic salt anhydride 11 corresponds to sodium acetate anhydride and the hydration water 12 corresponds to hydration water that forms a trihydrate.

When the temperature of the latent heat storage material composition 1 is higher than the melting point of the latent heat storage material 10 which has been adjusted with the melting point modifier 13, the inorganic salt anhydride 11 in the latent heat storage material 10 is melted and is separated from the hydration water 12, and the melting point modifier 13 is dissolved in the hydration water 12 and, as a result, the whole of the latent heat storage material composition 1 becomes in the state of a liquid phase, as shown in FIG. 3(b). When the inorganic salt anhydride 11 is melted, the latent heat of fusion generated upon the melting in association with the phase change from a solid phase into a liquid phase is stored in the inorganic salt anhydride 11. At the same time, negative dissolution heat (endothermic heat) is generated in the melting point modifier 13 as the result of the dissolution of the melting point modifier 13 in the hydration water 12.

There is a case where latent heat (endothermic heat) in association with melting is generated in the melting point modifier 13. When the latent heat storage material composition 1 is heated at a high temperature that is higher than the melting point thereof, the latent heat storage material composition 1 undergoes the phase change from a solid phase to a liquid phase. Therefore, the latent heat storage material composition 1 can store heat in the amount of the sum total of the amount of the latent heat of fusion (endothermic heat) of the latent heat storage material 10, the amount of negative dissolution heat (endothermic heat) and the amount of latent heat of fusion (endothermic heat) of the melting point modifier 13 as the heat storage amount.

In contrast, when the latent heat storage material composition 1 is cooled to a low temperature that is lower than the freezing point thereof, the hydration water 12 that is homogeneously mixed with the melting point modifier 13 in the liquid phase latent heat storage material composition 1 causes a hydration reaction with the inorganic salt anhydride 11 to produce an inorganic salt hydrate 10 (latent heat storage material 10), and the inorganic salt anhydride 11 and the hydration water 12 release latent heat of fusion in association with the change in phase from a liquid phase to a solid phase, as shown in FIG. 3(a). At the same time, the melting point modifier 13 is also formed in a solid phase, and heat corresponding to the difference in heat energy before and after dissolution or before and after melting is released.

As a result, when the latent heat storage material composition 1 is cooled to a low temperature that is lower than the freezing point thereof, the latent heat storage material composition 1 undergoes the change in phase from a liquid phase to a solid phase, and therefore can release the sum total of the amount of the latent heat of fusion (exothermic heat) and the amount of heat corresponding to the above-mentioned difference in energy as an amount of released heat.

It is critical that the latent heat storage material composition 1 is packed in the heat storage material packaging container in a liquid-tight state, in order to prevent the circumfusion of the hydration water 12 separated from the inorganic salt anhydride 11 from the heat storage material packaging container (not shown) during the use of the latent heat storage material composition 1. This is because the latent heat storage material composition 1 is required to have a property to repeat such a cycle that waste heat derived from the heat supply side is stored and the stored heat is released to the heat demand side upon use several times.

In order to achieve this property, the latent heat storage material composition 1 is needed to undergo the change in phase between a solid phase and a liquid phase reversibly on both sides of the melting point of the latent heat storage material 10 in the latent heat storage material composition 1, as shown in FIG. 3. When the separated hydration water 12 is circumfused to the outside, the inorganic salt anhydride 11 cannot contain hydration water in an amount necessary for the production of the inorganic salt hydrate 10 (latent heat storage material 10) in association with the change in phase from a liquid phase to a solid phase, and consequently a latent heat storage material composition 1 in a solid phase cannot be produced.

Even if the hydration water 12 is circumfused from the heat storage material packaging container, water vapor can flow into the inside of the heat storage material packaging container, and, when the water vapor can be supplemented instead of the circumfused hydration water 12, the production of a latent heat storage material composition 1 in a solid phase may be achieved.

Next, in order to confirm the influence of the melting point modifier 13A added in the latent heat storage material composition 1B on the heat storage performance, Experiments 3 to 6 were carried out as research experiments. Experiments 3 to 5 are experiments to be carried out for Example 2, in each of which a latent heat storage material composition 1B prepared by adding a melting point modifier 13A to a latent heat storage material 10B is used as a sample. Experiment 6 is an experiment to be carried out for Comparative Example 2 in Example 2, in which a sample composed only of a latent heat storage material 10B without a melting point modifier 13A is used. The research experiments are carried out in the same manner as in Example 1.

<Condition Common Among Experiments 3 to 6>
Latent heat storage material 10B: sodium acetate trihydrate ($CH_3COONa \cdot 3H_2O$)

<Conditions Common Among Experiments 3 to 5>
Components of latent heat storage material composition 1B: a latent heat storage material 10B and a melting point modifier 13A
Melting point modifier 13A: erythritol ($C_4H_{10}O_4$)
<Conditions for Experiment 3>
Mixing amount of erythritol relative to the whole weight of a latent heat storage material composition 1B: 70 wt %
(latent heat storage material 10B: melting point modifier 13A=3:7)
Number $x_s$ of moles of erythritol per 1 mol of hydration water in formula (1)=0.867 [mol/mol]
<Conditions for Experiment 4>
Mixing amount of erythritol relative to the whole weight of a latent heat storage material composition 1B: 50 wt %
(latent heat storage material 10B: melting point modifier 13A=1:1)
Number $x_s$ of moles of erythritol per 1 mol of hydration water in formula (1)=0.371 [mol/mol]
<Conditions for Experiment 5>
Mixing amount of erythritol relative to the whole weight of a latent heat storage material composition 1B: 30 wt %
(latent heat storage material 10B: melting point modifier 13A=7:3)
Number $x_s$ of moles of erythritol per 1 mol of hydration water in formula (1)=0.159 [mol/mol]
<Conditions for Experiment 6>
Melting point modifier 13A: not added
Mixing amount of latent heat storage material 10B: 100 wt %
(latent heat storage material 10B: melting point modifier 13A=100:0)

Figure 8:
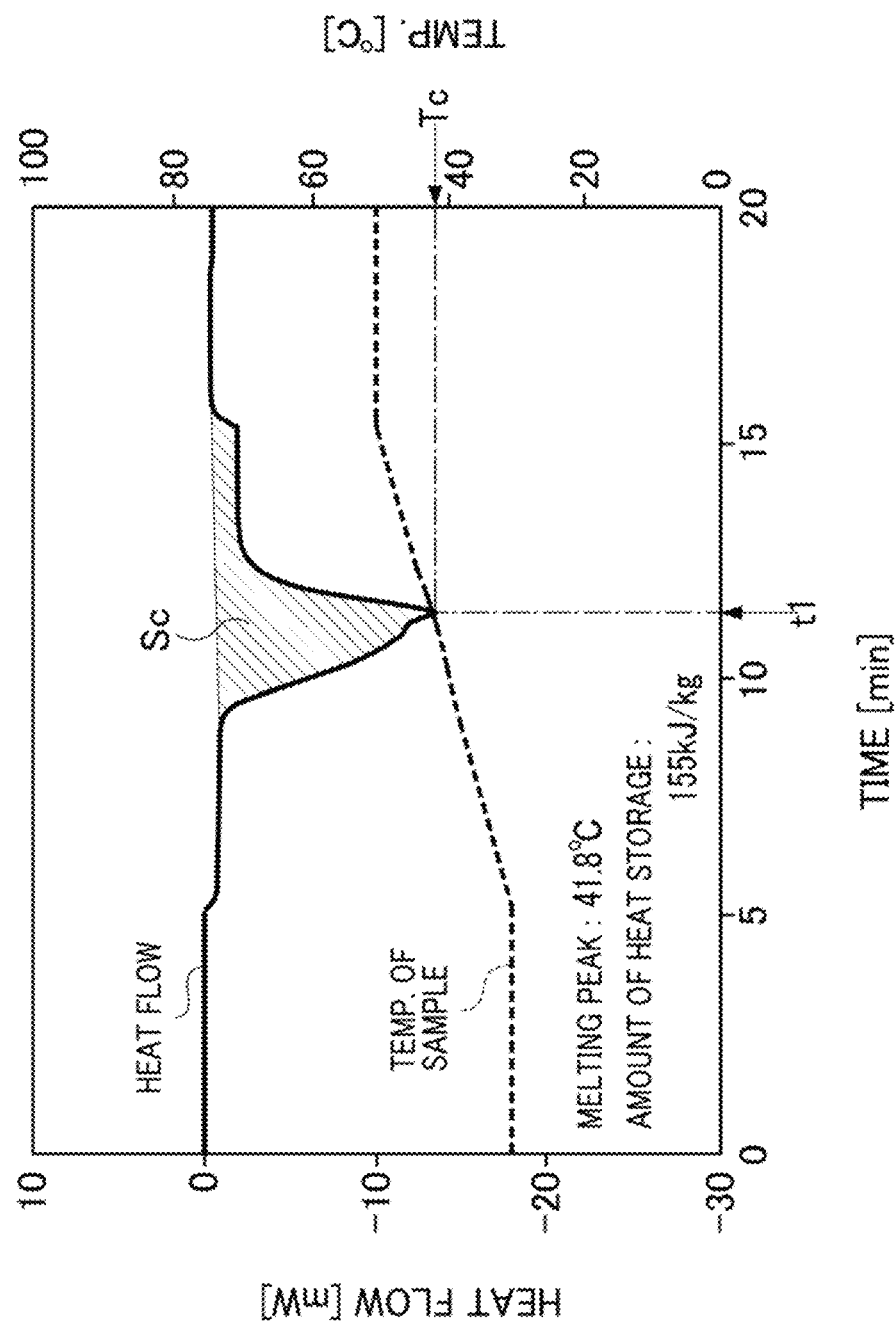
FIG. 8 is a graph showing the melting point and the amount of heat storage of a latent heat storage material composition according to Experiment 3 in Example 2 in Embodiment 1.
Figure 9:
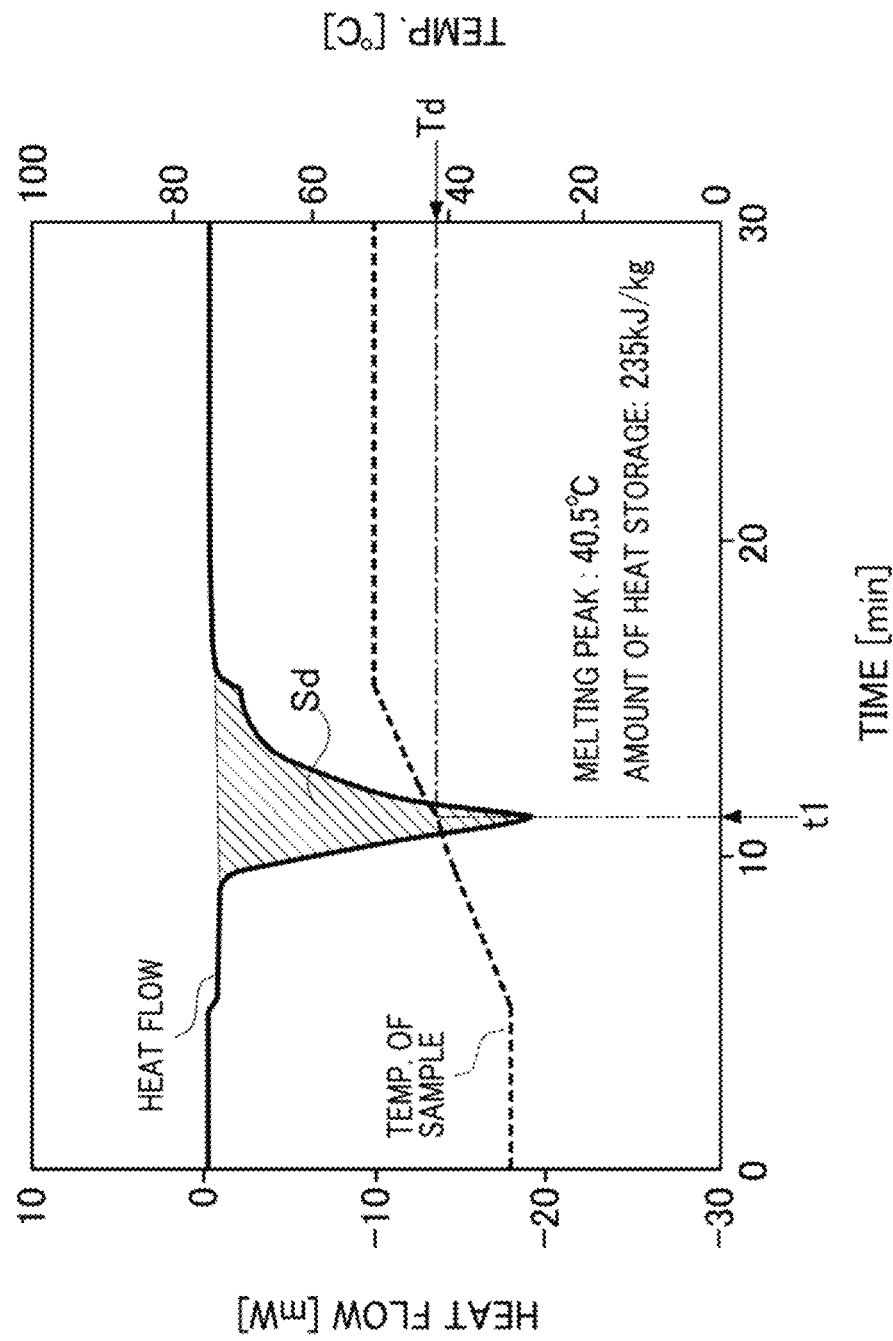
FIG. 9 is a graph showing the melting point and the amount of heat storage of a latent heat storage material composition according to Experiment 4 in Example 2 in Embodiment 1.
Figure 10:
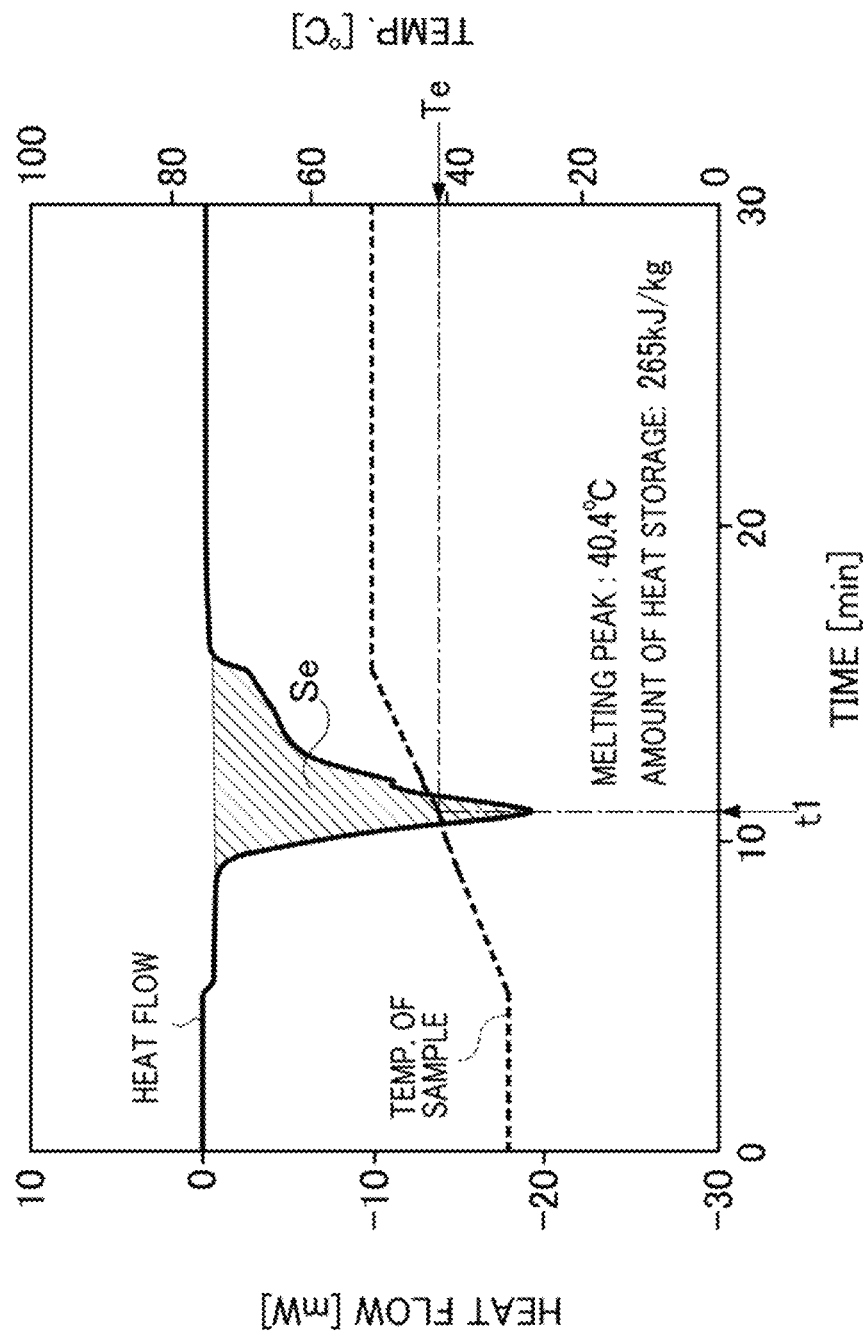
FIG. 10 is a graph showing the melting point and the amount of heat storage of a latent heat storage material composition according to Experiment 5 in Example 2 in Embodiment 1.
Figure 11:
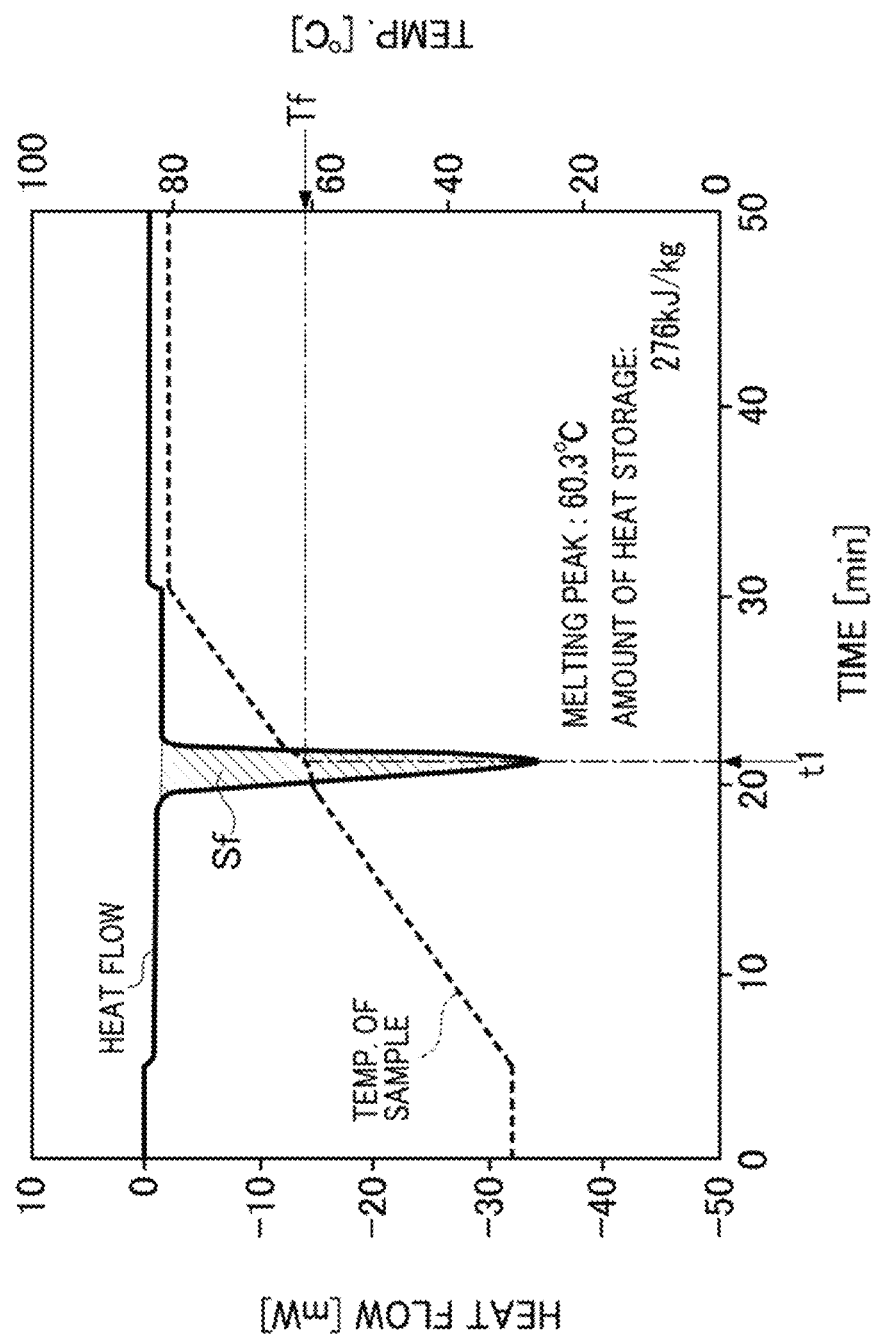
FIG. 11 is a graph showing the melting point and the amount of heat storage of a latent heat storage material composition according to Experiment 6 in Comparative Example 2 in Embodiment 1.

FIG. 7 relates to the latent heat storage material composition of Example 2, and is a graph showing the experimental conditions employed in Example 2 and Comparative Example 2 and the measurement results of the melting point and amount of heat storage as measured by DSC together. FIG. 8 is a graph showing the melting point and the amount of heat storage of a latent heat storage material composition according to Experiment 3 in Example 2. FIG. 9 is a graph showing the melting point and the amount of heat storage of a latent heat storage material composition according to Experiment 4 in Example 2. FIG. 10 is a graph showing the melting point and the amount of heat storage of a latent heat storage material composition according to Experiment 5 in Example 2. FIG. 11 is a graph showing the melting point and the amount of heat storage of a latent heat storage material composition according to Experiment 6 in Comparative Example 2.

<Results of Experiments>
With respect to the latent heat storage material composition 1B according to Experiment 3 in Example 2, the temperature Tc corresponding to endothermic peak time t1 is 41.8° C. and the amount of heat storage Sc is 155 kJ/kg, as shown in FIG. 8. With respect to the latent heat storage material composition 1B according to Experiment 4 in Example 2, the temperature Td corresponding to endothermic peak time t1 is 40.5° C. and the amount of heat storage Sd is 235 kJ/kg, as shown in FIG. 9. With respect to the latent heat storage material composition 1B according to Experiment 5 in Example 2, the temperature Te corresponding to endothermic peak time t1 is 40.4° C. and the amount of heat storage Se is 265 kJ/kg, as shown in FIG. 10. With respect to the latent heat storage material 10C alone according to Experiment 6 in Comparative Example 2, the temperature Tf corresponding to endothermic peak time t1 is 60.3° C. and the amount of heat storage Sf is 276 kJ/kg, as shown in FIG. 11.

<Discussion>

The results of Experiment 6 in Comparative Example 2 almost agree with the amount of heat storage of 264 (kJ/kg) and the melting point of about 58° C. (the measurement value in Experiment 6 is 60.3° C.) of sodium acetate trihydrate (latent heat storage material 10B) which is a publicly known substance. With respect to sodium acetate trihydrate, the amount of heat storage P shown in FIG. 26 is 276 (kJ/kg).

In contrast, in the latent heat storage material composition 1B, sodium acetate trihydrate (latent heat storage material 10B) and erythritol (melting point modifier 13A) are mixed at a mixing ratio of 3:7 in Experiment 3 in Example 2. Therefore, it is considered that the amount of heat storage, i.e., the amount of heat stored in PCM, is P0=82.8 (kJ/kg) which corresponds to 30% of the amount of heat storage P=276 (kJ/kg) of the latent heat storage material 10B alone.

Similarly, in Experiment 4 in Example 2, these components are mixed at a mixing ratio of 1:1, and therefore it is considered that the amount of heat storage, i.e., the amount of heat stored in PCM, is P0=138 (kJ/kg) which corresponds to 50% of the amount of heat storage P of the latent heat storage material 10B alone. Similarly, in Experiment 5 in Example 2, these components are mixed at a mixing ratio of 7:3, and therefore it is considered that the amount of heat storage, i.e., the amount of heat stored in PCM, is P0=193.2 (kJ/kg) which corresponds to 70% of the amount of heat storage P of the latent heat storage material 10B alone.

However, with respect to the actually measured amounts of heat storage of the latent heat storage material composition 1B, the amount of heat storage Sc in Experiment 3 is 155 (kJ/kg), the amount of heat storage Sd in Experiment 4 is 235 (kJ/kg), and the amount of heat storage Se in Experiment 5 is 265 (kJ/kg). It is considered that this is because the amount of heat storage derived from erythritol is added by P2≈70 (kJ/kg) in Experiment 3 and Experiment 5, and is added by P2≈100 (kJ/kg) in Experiment 4 as shown in FIG. 26.

Namely, it is assumed that the amount of heat storage derived from erythritol is an amount of absorbed heat P2 determined based on negative dissolution heat P2Aa generated upon the dissolution of erythritol (melting point modifier 13A) in hydration water 12 in sodium acetate trihydrate (latent heat storage material 10B) and latent heat P2Ab generated upon the dissolution of the melting point modifier 13A, as shown in FIG. 26. It is also assumed that the reason why the melting point of the latent heat storage material composition 1B is lower by about 20° C. than that of the latent heat storage material 10B alone is because erythritol acts as a melting point modifier.

Example 3

Next, the outline of a latent heat storage material composition according to Example 3 is described. As shown in FIG. 1A, the latent heat storage material composition 1C according to Example 3 is prepared by mixing a latent heat storage material 10C (latent heat storage material 10) capable of storing or releasing heat through the absorption or release of latent heat in association with phase change with a melting point modifier 13A (melting point modifier 13) that is a first additive. Example 3 is a case where each of the temperature range in which heat is stored in the latent heat storage material composition 1 and the temperature range in which the heat is released by the latent heat storage material composition 1C is adjusted to about 65 to 75° C. In the latent heat storage material composition 1C, the latent heat storage material 10C that is the main component is an inorganic salt hydrate 10 of a diphosphate salt (pyrophosphate salt) or a phosphate salt which contains ($n_w$=10) molecules of hydration water.

More specifically, in Example 3, the latent heat storage material 10C is sodium diphosphate decahydrate ($Na_4P_2O_7 \cdot 10H_2O$), and the sodium diphosphate decahydrate is a substance which is easily soluble in water and an alcohol and has such properties that the hydration number is 10, the molecular weight [g/mol] is 177.98 and the melting point is 79° C.

Next, in order to confirm the influence of the melting point modifier 13A added in the latent heat storage material composition 1C on the heat storage performance, Experiments 7 to 10 were carried out as research experiments. Experiments 7 to 9 are experiments to be carried out for Example 3, in each of which a latent heat storage material composition 1C prepared by adding a melting point modifier 13A to a latent heat storage material 10C is used as a sample. Experiment 10 is an experiment to be carried out for Comparative Example 3 for Example 3, in which a sample composed only of a latent heat storage material 10C without a melting point modifier 13A is used. The research experiments are carried out in the same manner as in Example 1.

<Common Condition Among Experiments 7 to 10>
Latent heat storage material 10C: sodium diphosphate decahydrate ($Na_4P_2O_7 \cdot 10H_2O$)
<Common Conditions Among Experiments 7 to 9>
Components of latent heat storage material composition 1C: latent heat storage material 10C and melting point modifier 13A
Melting point modifier 13A: erythritol ($C_4H_{10}O_4$)
<Condition for Experiment 7>
Mixing amount of erythritol relative to the whole weight of a latent heat storage material composition 1C: 50 wt %
(latent heat storage material 10C: melting point modifier 13A=1:1)
Number $x_s$ of moles of erythritol per 1 mol of hydration water in formula (1)=0.365 [mol/mol]
<Conditions for Experiment 8>
Mixing amount of erythritol relative to the whole weight of a latent heat storage material composition 1C: 30 wt %
(latent heat storage material 10C: melting point modifier 13A=7:3)
Number $x_s$ of moles of erythritol per 1 mol of hydration water in formula (1)=0.157 [mol/mol]
<Conditions for Experiment 9>
Mixing amount of erythritol relative to the whole weight of a latent heat storage material composition 1C: 10 wt %
(latent heat storage material 10B: melting point modifier 13A=9:1)
Number $x_s$ of moles of erythritol per 1 mol of hydration water in formula (1)=0.041 [mol/mol]
<Conditions for Experiment 10>
Melting point modifier 13A: not added
Mixing amount of latent heat storage material 10C: 100 wt %
(latent heat storage material 10C: melting point modifier 13A=100:0)

Figure 13:
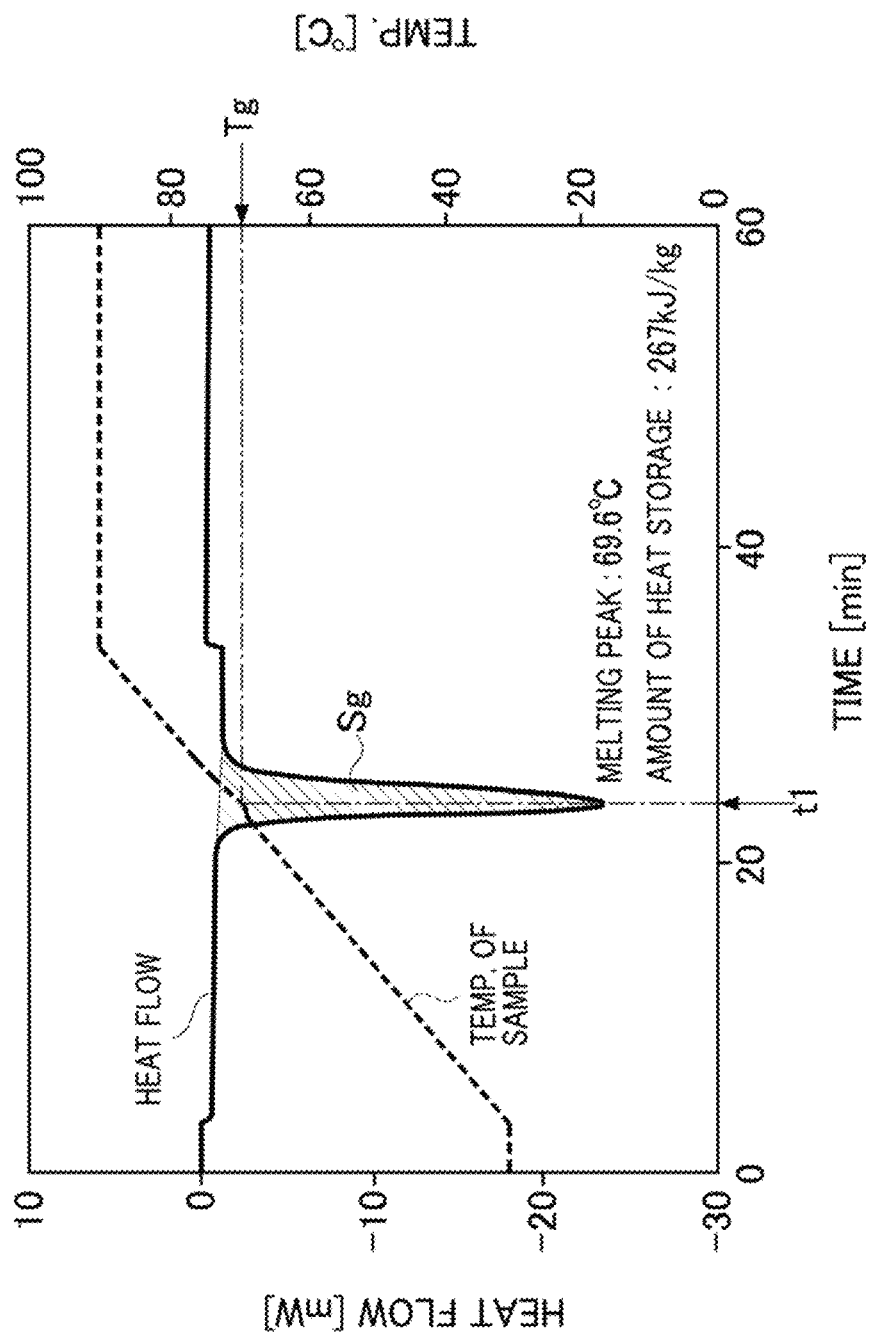
FIG. 13 is a graph showing the melting point and the amount of heat storage of a latent heat storage material composition according to Experiment 7 in Example 3 in Embodiment 1.
Figure 14:
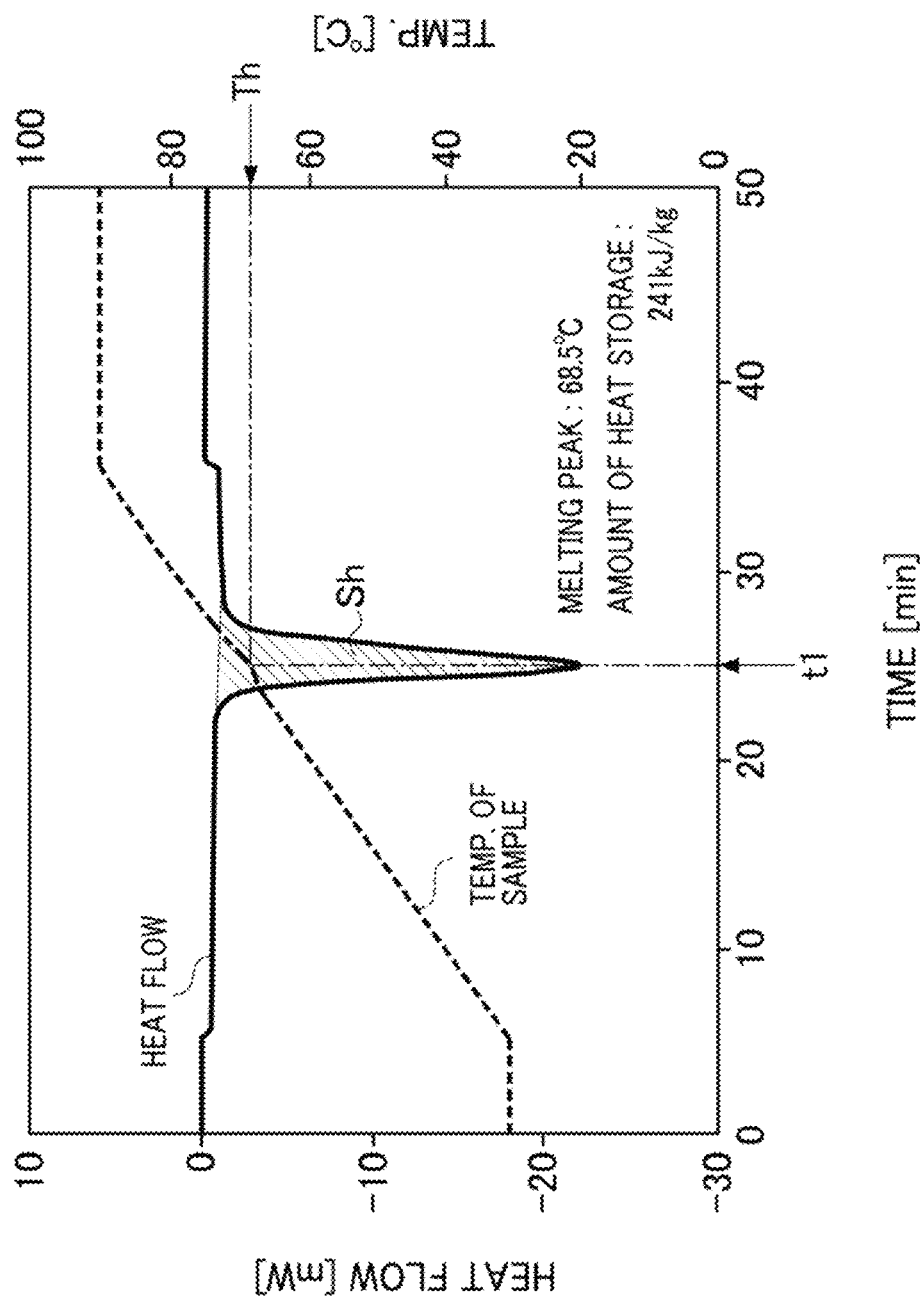
FIG. 14 is a graph showing the melting point and the amount of heat storage of a latent heat storage material composition according to Experiment 8 in Example 3 in Embodiment 1.
Figure 15:
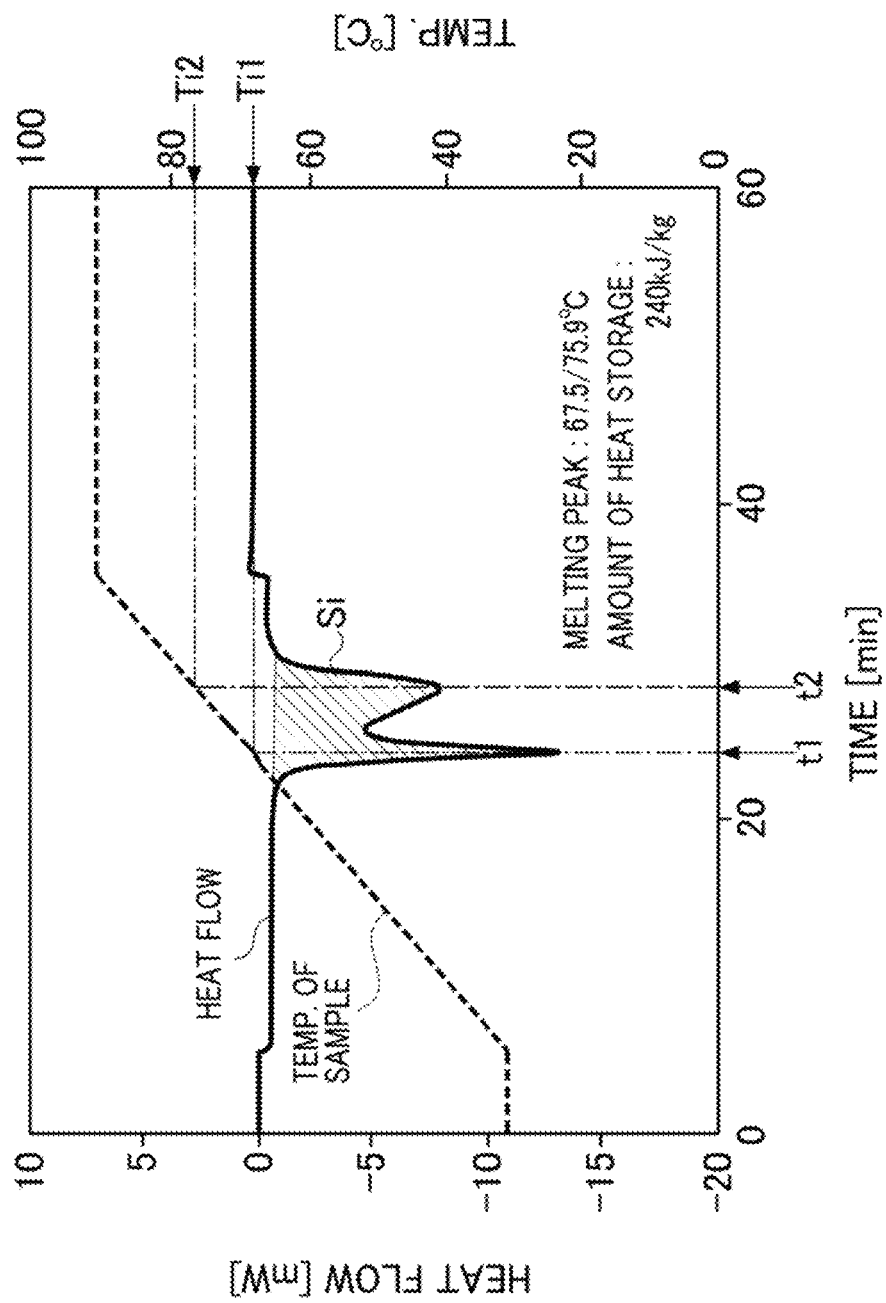
FIG. 15 is a graph showing the melting point and the amount of heat storage of a latent heat storage material composition according to Experiment 9 in Example 3 in Embodiment 1.
Figure 16:
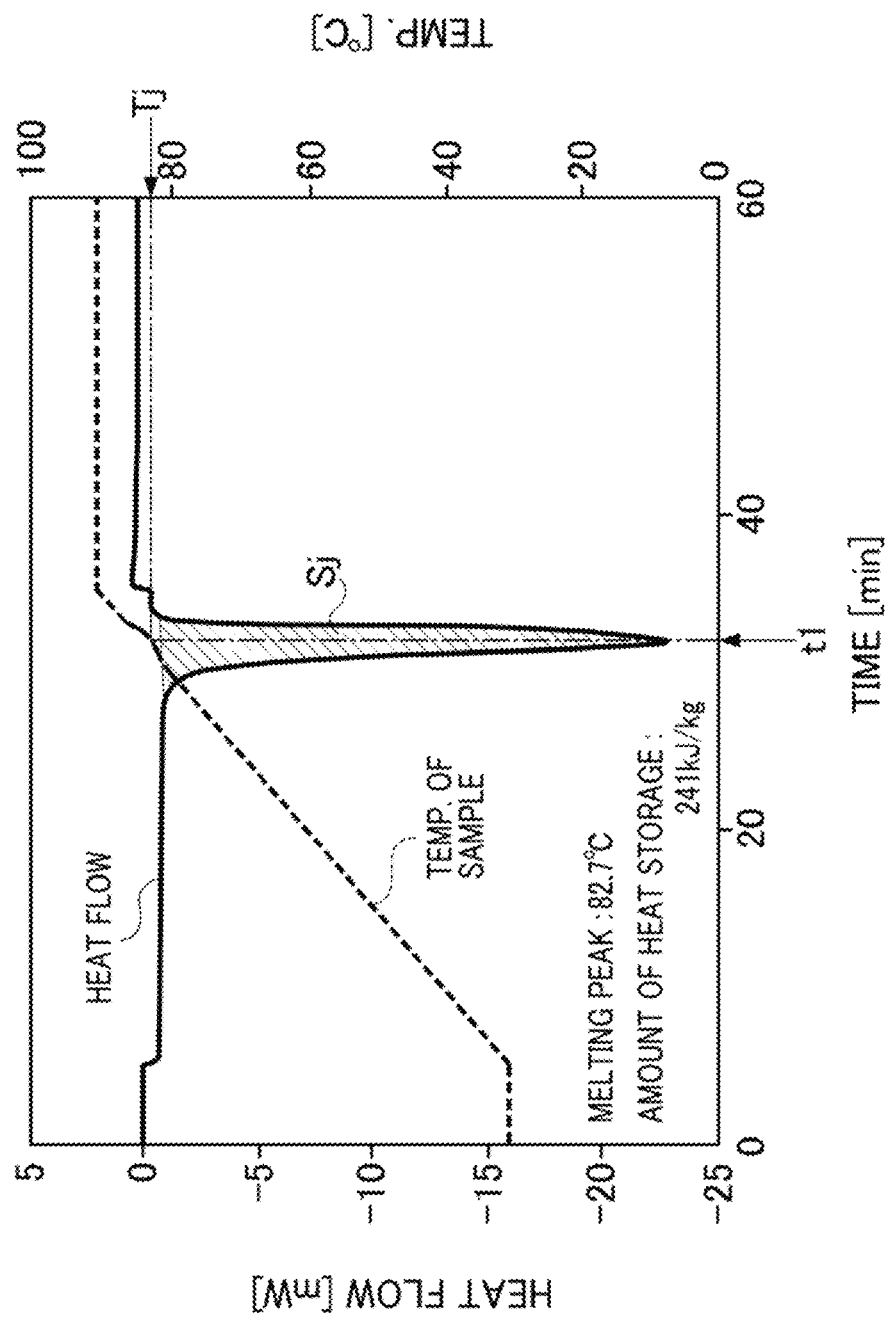
FIG. 16 is a graph showing the melting point and the amount of heat storage of a latent heat storage material composition according to Experiment 10 in Comparative Example 3 in Embodiment 1.

FIG. 12 relates to the latent heat storage material composition of Example 3, and is a table showing the experimental conditions employed in Example 3 and Comparative Example 3 and the measurement results of the melting point and amount of heat storage as measured by DSC together. FIG. 13 is a graph showing the melting point and the amount of heat storage of a latent heat storage material composition according to Experiment 7 in Example 3. FIG. 14 is a graph showing the melting point and the amount of heat storage of a latent heat storage material composition according to Experiment 8 in Example 3. FIG. 15 is a graph showing the melting point and the amount of heat storage of a latent heat storage material composition according to Experiment 9 in Example 3. FIG. 16 is a graph showing the melting point and the amount of heat storage of a latent heat storage material composition according to Experiment 10 in Comparative Example 3.

<Results of Experiments>

With respect to the latent heat storage material composition 1C according to Experiment 7 in Example 3, the temperature Tg corresponding to endothermic peak time t1 is 69.6° C. and the amount of heat storage Sg is 267 kJ/kg, as shown in FIG. 13. With respect to the latent heat storage material composition 1C according to Experiment 8 in Example 3, the temperature Th corresponding to endothermic peak time t1 is 68.5° C. and the amount of heat storage Sh is 241 kJ/kg, as shown in FIG. 14. With respect to the latent heat storage material composition 1C according to Experiment 9 in Example 3, the temperature Ti1 corresponding to first endothermic peak time t1 is 67.5° C., the temperature Ti2 corresponding to second endothermic time t2 is 75.9° C. and the amount of heat storage Si is 240 kJ/kg, as shown in FIG. 15. With respect to the latent heat storage material 10C alone according to Experiment 10 in Comparative Example 3, the temperature Tj corresponding to endothermic peak time t1 is 82.7° C. and the amount of heat storage Sj is 241 kJ/kg, as shown in FIG. 16.

<Discussion>

The result of Experiment 10 in Comparative Example 3 almost agrees with the melting point of about 79° C. (the measurement value in Experiment 10 is 82.7° C.) of sodium diphosphate decahydrate (latent heat storage material 10C) which is a publicly known substance. With respect to sodium diphosphate decahydrate, the amount of heat storage P shown in FIG. 26 is 241 (kJ/kg).

In contrast, in the latent heat storage material composition 1C, sodium diphosphate decahydrate (latent heat storage material 10C) and erythritol (melting point modifier 13A) are mixed at a mixing ratio of 1:1 in Experiment 7 in Example 3. Therefore, it is considered that the amount of heat storage, i.e., the amount of heat stored in PCM, is P0=120.5 (kJ/kg) which corresponds to 50% of the amount of heat storage P=241 (kJ/kg) of the latent heat storage material 10C alone.

Similarly, in Experiment 8 in Example 3, these components are mixed at a mixing ratio of 7:3, and therefore it is considered that the amount of heat storage, i.e., the amount of heat stored in PCM, is P0=168.7 (kJ/kg) which corresponds to 70% of the amount of heat storage P of the latent heat storage material 10C alone. Similarly, in Experiment 9 in Example 3, these components are mixed at a mixing ratio of 9:1, and therefore it is considered that the amount of heat storage, i.e., the amount of heat stored in PCM, is P0=216.9 (kJ/kg) which corresponds to 90% of the amount of heat storage P of the latent heat storage material 10C alone.

However, with respect to the actually measured amounts of heat storage of the latent heat storage material composition 1C, the amount of heat storage Sg in Experiment 7 is 267 (kJ/kg), the amount of heat storage Sh in Experiment 8 is 241 (kJ/kg), and the amount of heat storage Si in Experiment 9 is 240 (kJ/kg). It is considered that this is because the amount of heat storage derived from erythritol is added by P2≈146 (kJ/kg) in Experiment 7, is added by P2≈73 (kJ/kg) in Experiment 8, and is added by P2≈23 kJ/kg) in Experiment 9 as mentioned in order of the content ratio of erythritol, as shown in FIG. 26.

Namely, it is assumed that the heat storage amount derived from erythritol is an amount of absorbed heat P2 determined based on negative dissolution heat P2Aa generated upon the dissolution of erythritol (melting point modifier 13A) in hydration water 12 in sodium diphosphate decahydrate (latent heat storage material 10C) and a latent heat P2Ab of the melting point modifier 13A. Particularly, when the content ratio of erythritol increases, the amount of heat storage derived from erythritol also increases. Therefore, it is found that erythritol greatly contributes to the increase in the amount of heat storage of the latent heat storage material composition 1C. It is also found that the reason why the melting point of the latent heat storage material composition 1C is lower by up to about 15° C. than that of the latent heat storage material 10C alone is because erythritol acts as a melting point modifier.

In Experiment 9, as shown in FIG. 15, a first endothermic peak appears at time t1 and a second endothermic peak appears at time t2. The reason for this phenomenon is not elucidated clearly at present. The present applicant considers as follows. There is such a first effect that the melting point of sodium diphosphate decahydrate (latent heat storage material 10C) can become close to the melting point of the latent heat storage material 10C alone when the amount of erythritol (melting point modifier 13A) added is reduced.

In addition, there is such a second effect that negative dissolution heat (endothermic heat) of erythritol can be generated before the melting of sodium diphosphate decahydrate because a portion of sodium diphosphate decahydrate is released in the course of heating. It is assumed that, a time lug occurs between the time at which an endothermic peak derived from erythritol appears and the time at which an endothermic peak derived from sodium diphosphate decahydrate appears due to the first and second effects.

Example 4

Next, the outline of a latent heat storage material composition according to Example 4 is described. As shown in FIG. 2, the latent heat storage material composition 1D according to Example 4 is prepared by mixing a latent heat storage material 10D (latent heat storage material 10) capable of storing or releasing heat through the absorption or release of latent heat in association with phase change with a melting point modifier 13B (melting point modifier 13) that is a first additive with a melting point modifier 14 that is a second additive. Example 4 is a case where each of the temperature range in which heat is stored in the latent heat storage material composition 1 and the temperature range in which the heat is released by the latent heat storage material composition 1 is adjusted to around 82° C. In the latent heat storage material composition 1D, the latent heat storage material 10D that is the main component is alum hydrate (inorganic salt hydrate 10) containing ($n_w$=12) molecules of hydration water.

More specifically, in Example 4, the latent heat storage material 10D is ammonia alum dodecahydrate ($AlNH_4(SO_4)_2 \cdot 12H_2O$), and ammonia alum dodecahydrate is a substance which is soluble in water and has such properties that the hydration number is 12, the molecular weight [g/mol] is 453.34 and the melting point is 93.5° C.

In addition to ammonia alum, alum hydrate may also be "alum" which is a double sulfate salt of a monovalent cation sulfate salt $M^I_2(SO_4)$ with a trivalent cation sulfate salt $M^{III}_2(SO_4)_3$, such as potassium alum dodecahydrate (AlK$(SO_4)_2 \cdot 12H_2O$), chromium alum (CrK$(SO_4)_2 \cdot 12H_2O$) and iron alum (FeNH$_4(SO_4)_2 \cdot 12H_2O$). The trivalent metal ion contained in the "alum" may be an aluminum ion, a chromium ion, iron ion, or may be a metal ion such as a cobalt ion and a manganese ion. The latent heat storage material 10 may be a heat storage material containing, as the main component, a mixture or a mixed crystal of at least two substances both belonging to an alum.

In Example 4, the melting point modifier 13 is mannitol (melting point modifier 13B). Mannitol has properties of a molecular weight [g/mol] of 181.17 and a melting point of about 166 to 168° C. The melting point modifier 14 is a sulfate salt belonging to the above-mentioned "substance having a property to generate negative dissolution heat", and is ammonium sulfate ((NH$_4$)$_2$SO$_4$) in Example 4. Ammonium sulfate is a substance which can be dissolved in water easily and which has properties of a molecular weight [g/mol] of 132.14 and a melting point of higher than 230° C.

Ammonium sulfate that is added as the melting point modifier 14 is contained at a concentration satisfying the formulae (3) and (4) shown below per 1 mol of hydration water (hydration water 12) in the latent heat storage material 10:

$$x_t = (m_t/M_t)/\Sigma_{k=1}^N (n_{wk} \times m_{ak}/M_{ak}) \quad \text{Formula (3)}$$

$$0 \leq x_t \leq 0.1 \quad \text{Formula (4)}$$

wherein:
- $x_t$: the number of moles of a sulfate salt per 1 mol of hydration water [mol/mol];
- $m_t$: the mass of a sulfate salt contained as a second additive in a latent heat storage material composition [g];
- $M_t$: the molecular weight of a sulfate salt that serves as a second additive [g/mol];
- N: the total number of latent heat storage materials constituting a latent heat storage material composition;
- $n_{wk}$: the hydration number of a latent heat storage material (k=1, 2, ..., N);
- $m_{ak}$: the mass of a latent heat storage material contained in a latent heat storage material composition [g] (k=1, 2, ..., N); and
- $M_{ak}$: the molecular weight of a latent heat storage material [g/mol] (k=1, 2, ..., N).

Next, in order to confirm the influence of the melting point modifier 13B and the melting point modifier 14 added in the latent heat storage material composition 1D on the heat storage performance, Experiments 11 and 12 were carried out as research experiments. Experiment 11 is an experiment to be carried out for Example 4, in which a latent heat storage material composition 1D prepared by adding a melting point modifier 13B (mannitol) that is a first additive and a melting point modifier 14 (ammonium sulfate) that is a second additive to a latent heat storage material 10D is used as a sample. Experiment 12 is an experiment to be carried out for Comparative Example 4 for Example 4, in which a sample composed only of a latent heat storage material 10D without a melting point modifier 13B and a melting point modifier 14 is used. The research experiments are carried out in the same manner as in Example 1.

<Common Condition Between Experiments 11 and 12>
Latent heat storage material 10D: ammonia alum dodecahydrate (AlNH$_4$(SO$_4$)$_2 \cdot 12H_2O$)
<Conditions for Experiment 11>
Components of latent heat storage material composition 1D: a latent heat storage material 10B and a melting point modifier 13B
Melting point modifier 13B: mannitol (C$_6$H$_{14}$O$_6$)
Mixing amount of mannitol relative to the whole weight of a latent heat storage material composition 1D: 8 wt %
Number $x_s$ of moles of mannitol per 1 mol of hydration water in formula (1)=0.018 [mol/mol]
Mixing amount of ammonium sulfate relative to the whole weight of a latent heat storage material composition 1D: 18.4 wt %
(latent heat storage material 10D: melting point modifier 14=4:1)
Melting point modifier 14: ammonium sulfate ((NH$_4$)$_2$SO$_4$)
Number $x_t$ of moles of ammonium sulfate relative to 1 mol of hydration water in formula (3)=0.071 [mol/mol]
<Conditions for Experiment 12>
Melting point modifier 13B: not added
Melting point modifier 14: not added
(latent heat storage material 10C: melting point modifier 13B: melting point modifier 14=100:0:0)

Figure 18:
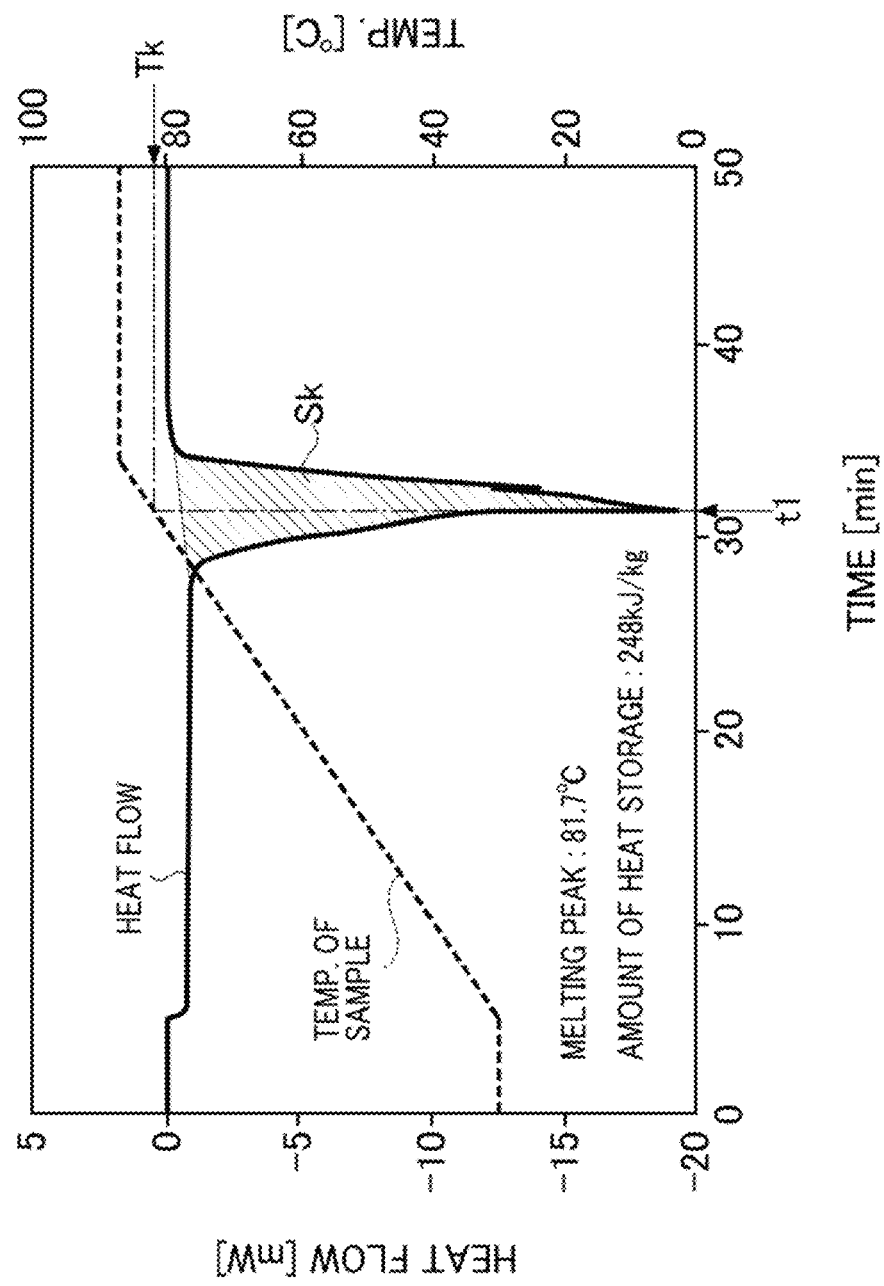
FIG. 18 is a graph showing the melting point and the amount of heat storage of a latent heat storage material composition according to Experiment 11 in Example 4 in Embodiment 1.
Figure 19:
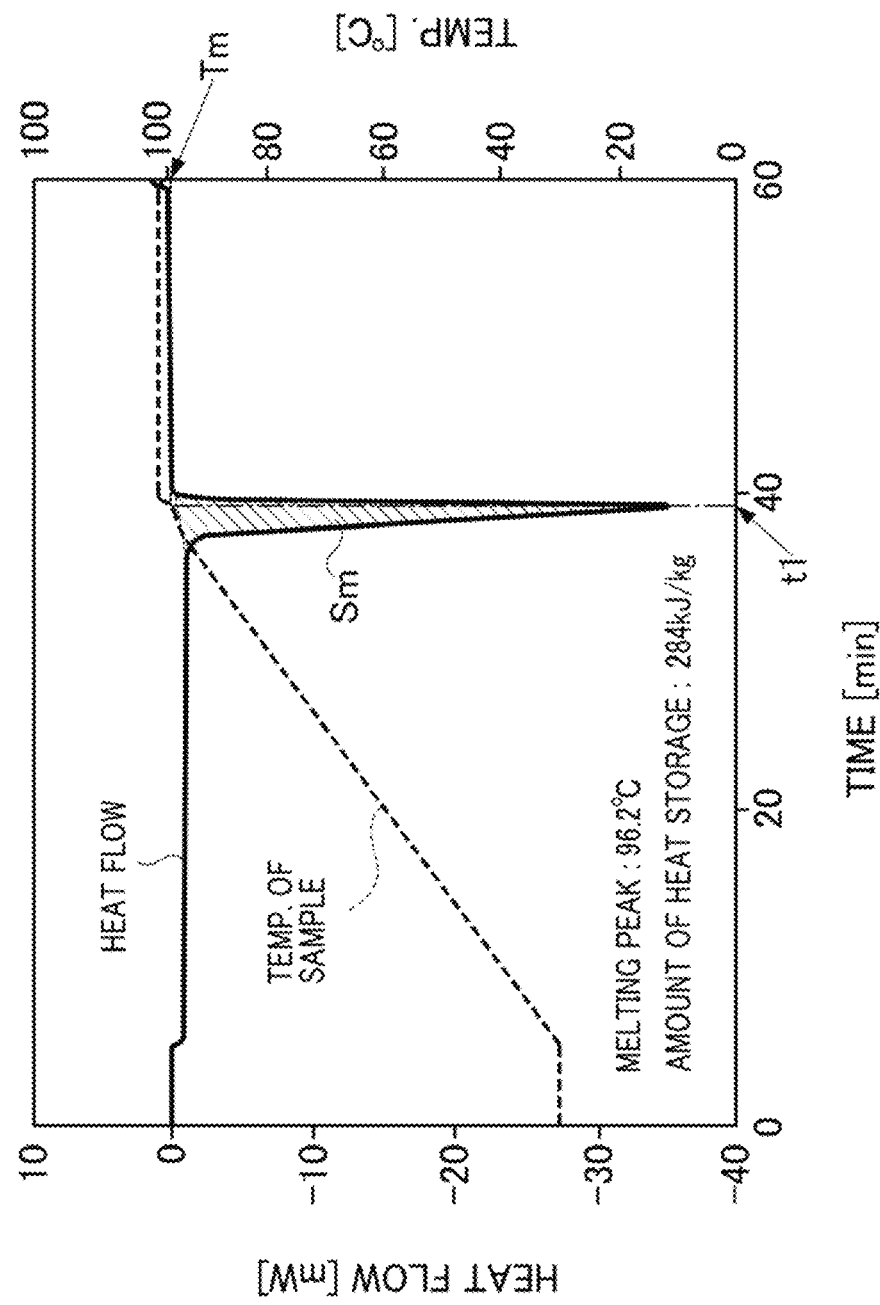
FIG. 19 is a graph showing the melting point and the amount of heat storage of a latent heat storage material composition according to Experiment 12 in Comparative Example 4 in Embodiment 1.

FIG. 17 relates to the latent heat storage material composition of Example 4, and is a table showing the experimental conditions employed in Example 4 and Comparative Example 4 and the measurement results of the melting point and amount of heat storage as measured by DSC together. FIG. 18 is a graph showing the melting point and the amount of heat storage of a latent heat storage material composition according to Experiment 11 in Example 4. FIG. 19 is a graph showing the melting point and the heat storage amount of a latent heat storage material composition according to Experiment 12 in Comparative Example 4.

<Results of Experiments>
With respect to the latent heat storage material composition 1D according to Experiment 11 in Example 4, the temperature Tk corresponding to endothermic peak time t1 is 81.7° C. and the amount of heat storage Sk is 248 kJ/kg, as shown in FIG. 18. With respect to the latent heat storage material composition 1D according to Experiment 12 in Comparative Example 4, the temperature Tm corresponding to endothermic peak time t1 is 96.2° C. and the amount of heat storage Sm is 284 kJ/kg, as shown in FIG. 19.

<Discussion>
The results of Experiment 12 in Comparative Example 4 almost agree with the amount of heat storage of 251 (kJ/kg) and the melting point of about 93.5° C. (the measurement value in Experiment 12 is 96.2° C.) of ammonia alum dodecahydrate (latent heat storage material 10D) which is a publicly known substance. With respect to ammonia alum dodecahydrate, the amount of heat storage P shown in FIG. 26 is 284 (kJ/kg).

In contrast, in the latent heat storage material composition 1D in Experiment 11 in Example 4, ammonia alum dodecahydrate (latent heat storage material 10D), mannitol (melting point modifier 13B) and ammonium sulfate (melting point modifier 14) are mixed at a mixing ratio of 9.2:1:2.3. Therefore, it is considered that the amount of heat storage, i.e., the amount of heat stored in PCM, is P0=209.0 (kJ/kg) which corresponds to 73.6% of the amount of heat storage P=284 (kJ/kg) of the latent heat storage material 10D alone. However, the actually measured amount of heat storage Sk of the latent heat storage material composition 1D was 248 (kJ/kg). It is considered that this is because the amount of heat storage P2≈39 (kJ/kg) derived from mannitol is added to the amount of heat storage P0=209.0 (kJ/kg) resulting from the heat storage by PCM as shown in FIG. 26.

Namely, it is assumed that the amount of heat storage derived from mannitol is an amount of absorbed heat P2 determined based on negative dissolution heat P2Aa and negative dissolution heat P2Ba respectively generated upon the dissolution of mannitol (melting point modifier 13B) and ammonium sulfate (melting point modifier 14) in hydration water 12 in ammonia alum dodecahydrate (latent heat storage material 10D) and latent heat P2Ab and latent heat P2Bb respectively generated upon the melting of the melting point modifier 13B and the melting point modifier 14. It is also found that the reason why the melting point of the latent heat storage material composition 1D is lower by about 15° C. than that of the latent heat storage material 10D alone is because mannitol and ammonium sulfate act as melting point modifiers.

Example 5

Next, the outline of a latent heat storage material composition according to Example 5 is described. Example 5 is a case where the temperature range of the storage and release of heat by a latent heat storage material composition 1 is adjusted to around 75° C. to around 90° C. As shown in FIGS. 1A and 1B, the latent heat storage material composition 1E according to Example 5 is one that is based on a mixture of a latent heat storage material 10E (latent heat storage material 10) capable of storing or releasing heat through the absorption or release of latent heat in association with phase change with a melting point modifier 13A (melting point modifier 13) that is a first additive.

In Example 5, in the case where it is required to further adjust the melting point of the latent heat storage material composition 1E that serves as a base, the above-mentioned melting point modifier 14 (ammonium sulfate) is added in addition to the melting point modifier 13A, as shown in FIG. 1B. The concentration $x_t$ of ammonium sulfate is a molar number that satisfies the formula: $0 \leq x_t \leq 0.1$ per 1 mol of hydration water (hydration water 12) in the latent heat storage material 10E.

In the latent heat storage material composition 1E, the latent heat storage material 10E that serves as the main component is a sulfate containing ($n_w$=14 to 18) molecules of hydration water (inorganic salt hydrate 10). More specifically, in Example 5, the latent heat storage material 10E is aluminum sulfate hydrate ($Al_2(SO_4)_3 \cdot nH_2O$) (n=14 to 18), and is a substance which is soluble in water and has such properties that 14 to 18 molecules of hydration number are contained, the molecular weight [g/mol] is 594.15 when the hydration number is 14 and is 666.15 when the hydration number is 18, and the melting point is 86.5° C. (when the hydration number is 18).

Next, with respect to the latent heat storage material composition 1E, there are prepared two types, i.e., one in which only a melting point modifier 13A is added and one in which both of a melting point modifier 13A and a melting point modifier 14 are added. In order to confirm the influence of the melting point modifier 13A and the melting point modifier 14 added in each type of the latent heat storage material composition 1E on the heat storage performance, Experiments 13 to 17 were carried out as research experiments.

Experiments 13 and 14 are experiments to be carried out for Example 5, in each of which a latent heat storage material composition 1E prepared by adding only a melting point modifier 13A to a latent heat storage material 10E is used as a sample. Experiments 15 and 16 are experiments to be carried out for Example 5, in each of which a latent heat storage material composition 1E prepared by adding both of a melting point modifier 13A and a melting point modifier 14 to a latent heat storage material 10E is used as a sample. Experiment 17 is an experiment to be carried out as Comparative Example 5 for Example 5, in which a sample composed only of a latent heat storage material 10E without a melting point modifier 13A and a melting point modifier 14 is used. The research experiments are carried out in the same manner as in Example 1.

<Common condition among Experiments 13 to 17>
Latent heat storage material 10E: aluminum sulfate hydrate ($Al_2(SO_4)_3 \cdot nH_2O$) (n=14 to 18)
<Common Conditions Among Experiments 13 to 16>
Components of latent heat storage material composition 1E: a latent heat storage material 10E and a melting point modifier 13A
Melting point modifier 13A: erythritol ($C_4H_{10}O_4$)
<Conditions for Experiments 13 and 14>
Melting point modifier 14: not added
<Conditions for Experiments 15 and 16>
Melting point modifier 14: added
Melting point modifier 14: ammonium sulfate (($NH_4)_2SO_4$)
Mixing amount of ammonium sulfate relative to the whole weight of a latent heat storage material composition 1E: 10 wt %
(latent heat storage material 10E: melting point modifier 14=10:1)
<Conditions for Experiment 13>
Mixing amount of erythritol relative to the whole weight of a latent heat storage material composition 1E: 50 wt %
(latent heat storage material 10E: melting point modifier 13A=1:1)
Number $x_s$ of moles of erythritol per 1 mol of hydration water in formula (1) when the hydration number is 14=0.348 [mol/mol]
Number $x_s$ of moles of erythritol per 1 mol of hydration water in formula (1) when the hydration number is 18=0.303 [mol/mol]
<Conditions for Experiment 14>
Mixing amount of erythritol relative to the whole weight of a latent heat storage material composition 1E: 30 wt %
(latent heat storage material 10E: melting point modifier 13A=7:3)
Number $x_s$ of moles of erythritol per 1 mol of hydration water in formula (1) when the hydration number is 14=0.149 [mol/mol]
Number $x_s$ of moles of erythritol per 1 mol of hydration water in formula (1) when the hydration number is 18=0.130 [mol/mol]
<Conditions for Experiment 15>
Mixing amount of erythritol relative to the whole weight of latent heat storage material composition 1E: 45 wt %
(latent heat storage material 10E: melting point modifier 13A=1:1)
Number $x_s$ of moles of erythritol per 1 mol of hydration water in formula (1) when the hydration number is 14=0.348 [mol/mol]

Number $x_s$ of moles of erythritol per 1 mol of hydration water in formula (1) when the hydration number is 18=0.303 [mol/mol]

Number of moles $x_t$ of ammonium sulfate per 1 mol of hydration water in formula (3) when the hydration number is 14=0.083 [mol/mol]

Number of moles $x_t$ of ammonium sulfate per 1 mol of hydration water in formula (3) when the hydration number is 18=0.093 [mol/mol]

<Conditions for Experiment 16>

Mixing amount of erythritol relative to the whole weight of a latent heat storage material composition 1E: 27 wt %

(latent heat storage material 10E: melting point modifier 13A=7:3)

Number $x_s$ of moles of erythritol per 1 mol of hydration water in formula (1) when the hydration number is 14=0.149 [mol/mol]

Number $x_s$ of moles of erythritol per 1 mol of hydration water in formula (1) when the hydration number is 18=0.130 [mol/mol]

Number of moles $x_t$ of ammonium sulfate per 1 mol of hydration water in formula (3) when the hydration number is 14=0.059 [mol/mol]

Number of moles $x_t$ of ammonium sulfate per 1 mol of hydration water in formula (3) when the hydration number is 18=0.067 [mol/mol]

<Conditions for Experiment 17>

Melting point modifier 13A and a melting point modifier 14: not added

Mixing amount of a latent heat storage material 10E: 100 wt %

(latent heat storage material 10E: melting point modifier 13A: melting point modifier 14=100:0:0)

Figure 21:
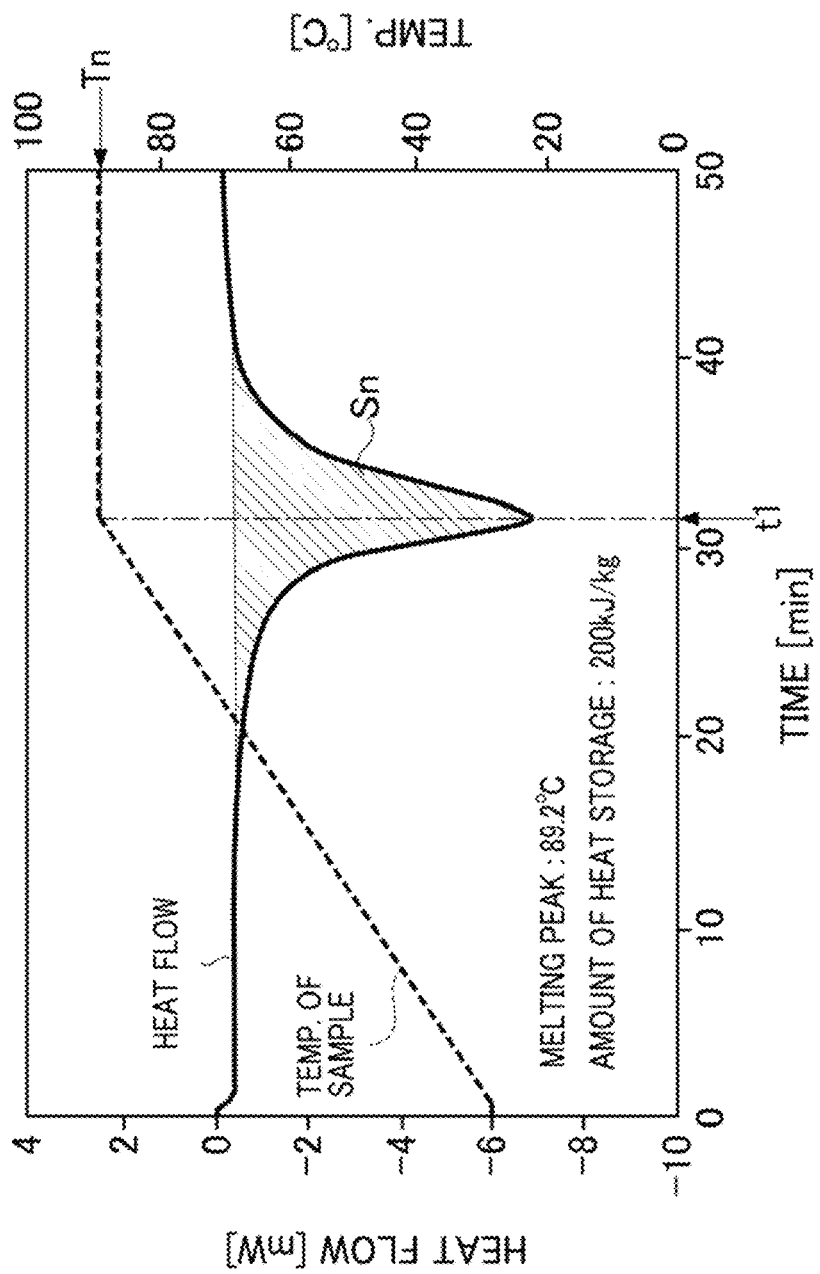
FIG. 21 is a graph showing the melting point and the amount of heat storage of a latent heat storage material composition according to Experiment 13 in Example 5 in Embodiment 1.
Figure 22:
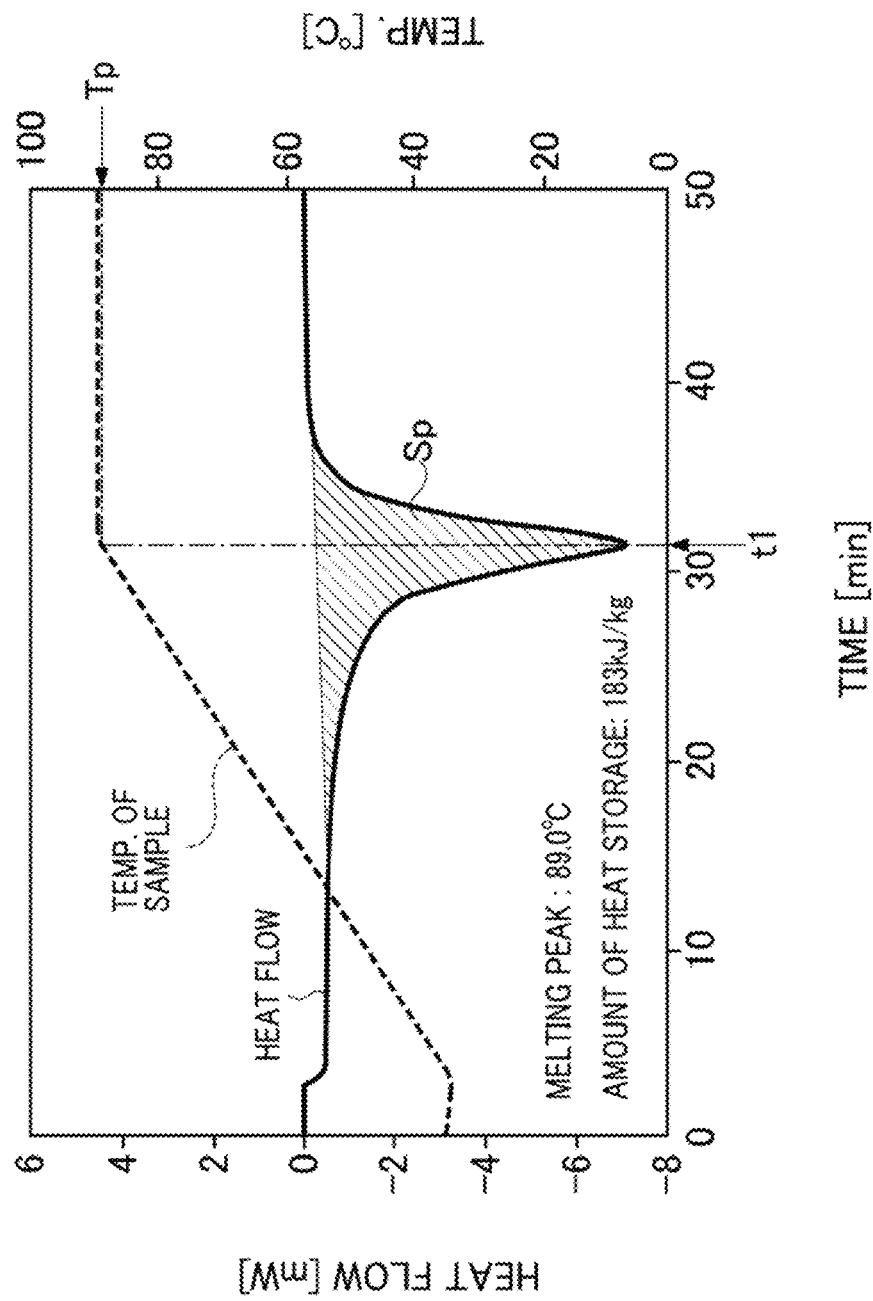
FIG. 22 is a graph showing the melting point and the amount of heat storage of a latent heat storage material composition according to Experiment 14 in Example 5 in Embodiment 1.
Figure 23:
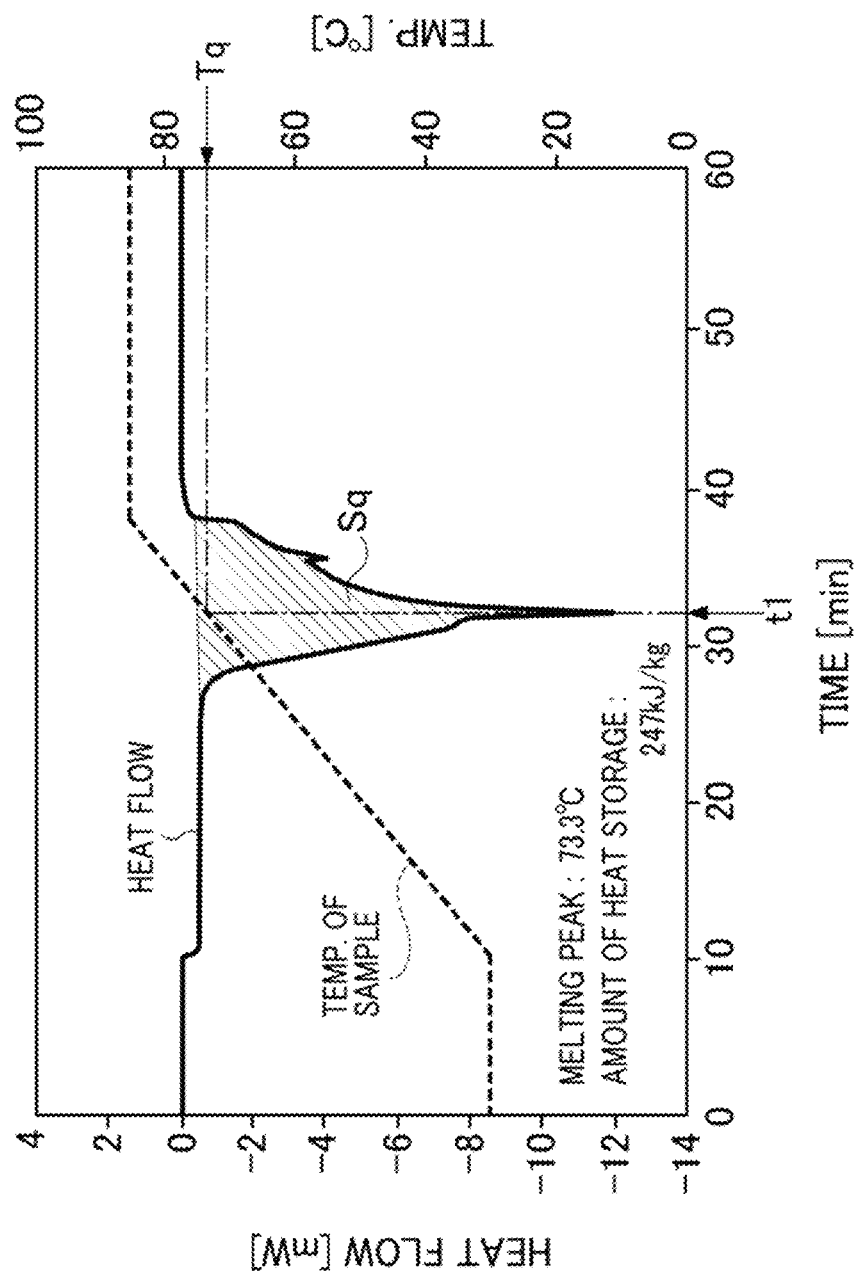
FIG. 23 is a graph showing the melting point and the amount of heat storage of the latent heat storage material composition according to Experiment 15 in Example 5 in Embodiment 1.
Figure 24:
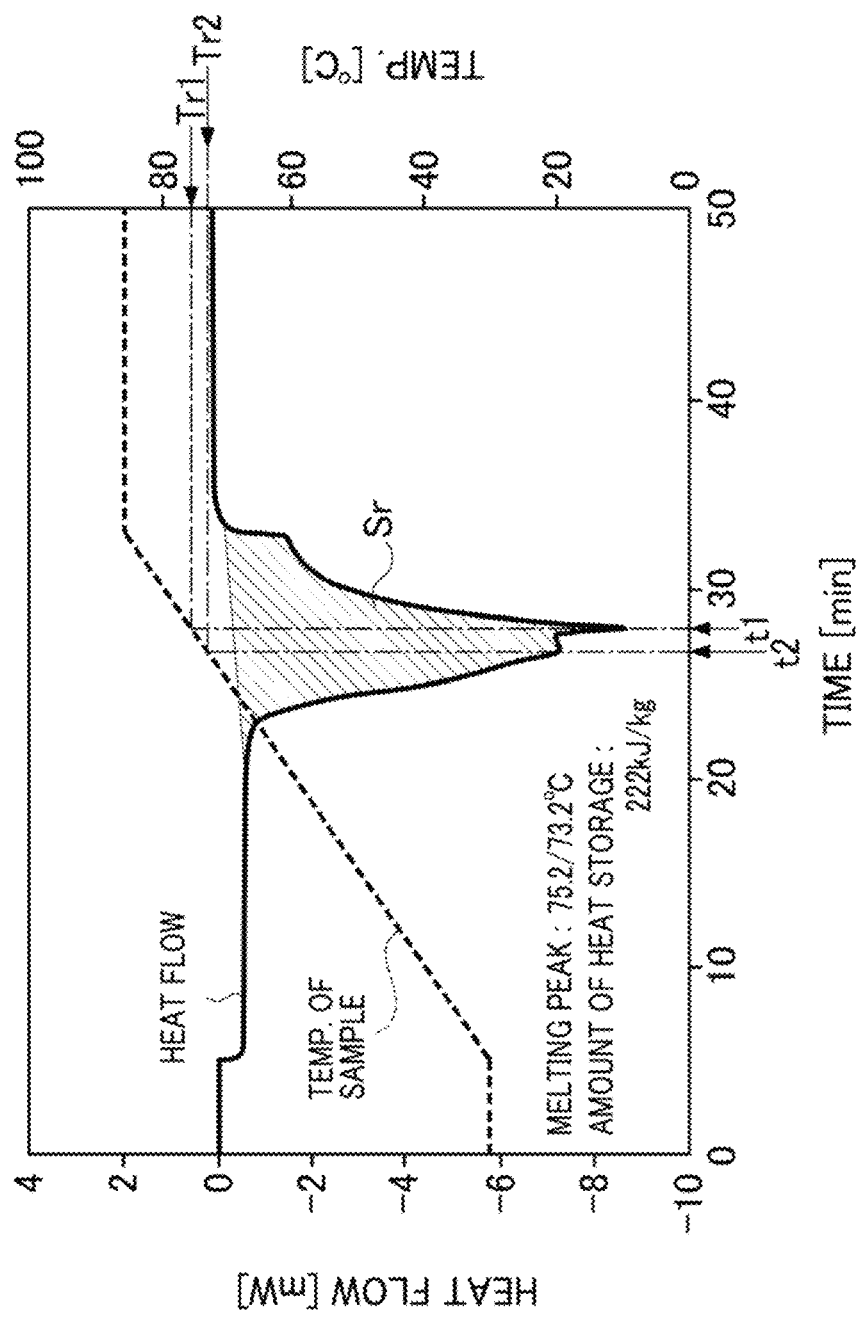
FIG. 24 is a graph showing the melting point and the amount of heat storage of the latent heat storage material composition according to Experiment 16 in Example 5 in Embodiment 1.
Figure 25:
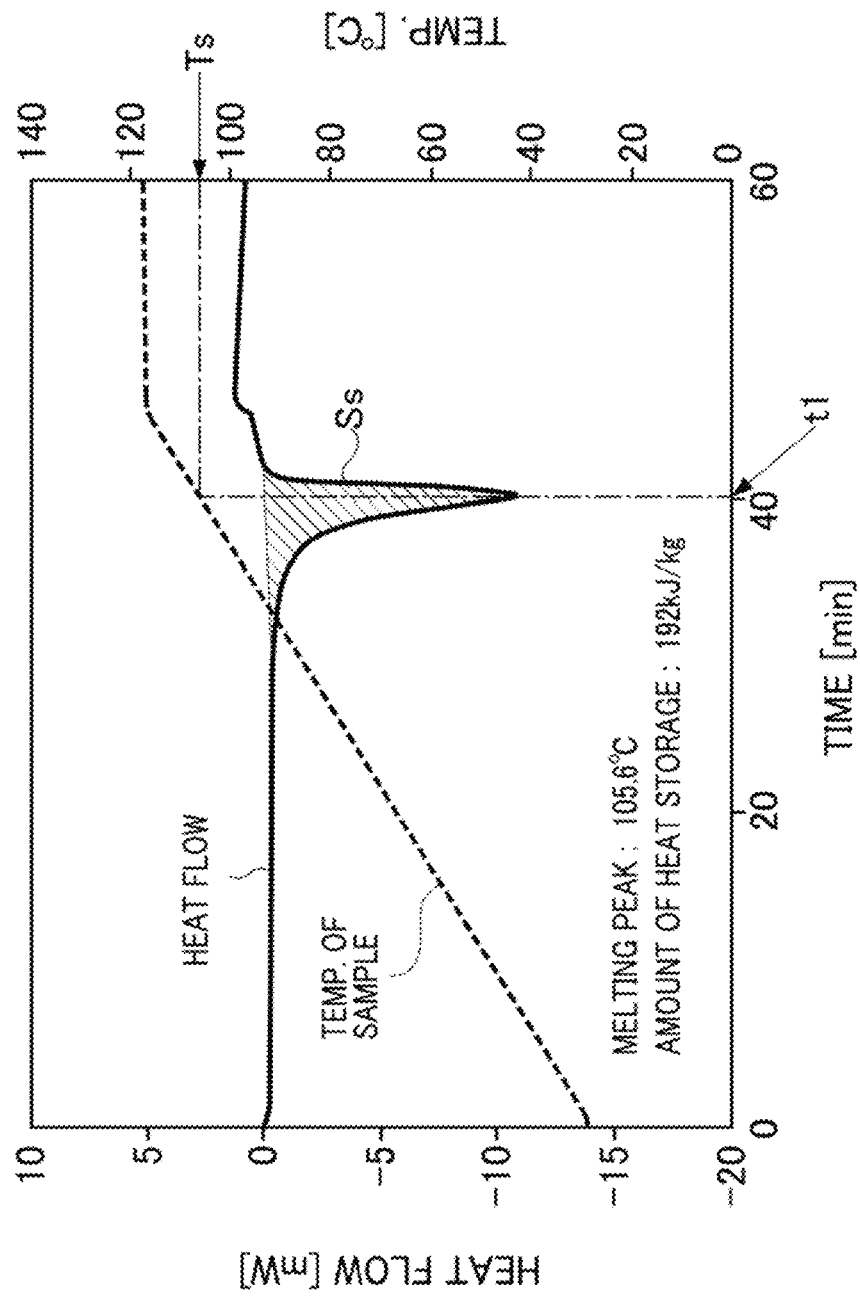
FIG. 25 is a graph showing the melting point and the amount of heat storage of the latent heat storage material composition according to Experiment 17 in Comparative Example 5 in Embodiment 1.

FIG. 20 relates to the latent heat storage material composition according to Example 5, and is a table showing the experimental conditions employed in Embodiments 13 to 17 according to Example 5 and Comparative Example 5 and the measurement results of the melting point and amount of heat storage as measured by DSC together. FIG. 21 is a graph showing the melting point and the amount of heat storage of a latent heat storage material composition according to Experiment 13 in Example 5. FIG. 22 is a graph showing the melting point and the amount of heat storage of a latent heat storage material composition according to Experiment 14 in Example 5. FIG. 23 is a graph showing the melting point and the amount of heat storage of the latent heat storage material composition according to Experiment 15 in Example 5. FIG. 24 is a graph showing the melting point and the amount of heat storage of the latent heat storage material composition according to Experiment 16 in Example 5. FIG. 25 is a graph showing the melting point and the amount of heat storage of the latent heat storage material composition according to Experiment 17 in Comparative Example 5.

<Results of Experiments>

With respect to the latent heat storage material composition 1E according to Experiment 13, the temperature Tn corresponding to endothermic peak time t1 is 89.2° C. and the amount of heat storage Sn is 200 kJ/kg, as shown in FIG. 21. With respect to the latent heat storage material composition 1E according to Experiment 14, the temperature Tp corresponding to endothermic peak time t1 is 89.0° C. and the amount of heat storage Sp is 183 kJ/kg, as shown in FIG. 22. With respect to the latent heat storage material composition 1E according to Experiment 15, the temperature Tq corresponding to endothermic peak time t1 is 73.3° C. and the amount of heat storage Sq is 247 kJ/kg, as shown in FIG. 23. With respect to the latent heat storage material composition 1E according to Experiment 16, the temperature Tr1 corresponding to first endothermic peak time t1 is 75.2° C., the temperature Tr2 corresponding to second endothermic peak time t2 is 73.2° C., and the amount of heat storage Sr is 222 kJ/kg, as shown in FIG. 24. With respect to the latent heat storage material 10E alone according to Experiment 17 in Comparative Example 4, the temperature Ts corresponding to endothermic peak time t1 is 105.6° C. and the amount of heat storage Ss is 192 kJ/kg.

<Discussion>

As shown in FIG. 25, according to the results of Experiment 17 in Comparative Example 5, the temperature Tp (105.6° C.) corresponding to endothermic peak time t1 is higher than the melting point 86.5° C. of aluminum sulfate 18-hydrate. It is considered that this is because the hydration number of aluminum sulfate hydrate used in Experiments 13 to 17 is 14 to 18 and the melting points of aluminum sulfate 14- to 17-hydrate are higher than the melting point of aluminum sulfate 18-hydrate.

In contrast, in Experiment 13 in Example 5, aluminum sulfate hydrate (latent heat storage material 10E) and erythritol (melting point modifier 13A) are mixed at a mixing ratio of 1:1 in the latent heat storage material composition 1E, and therefore it is considered that the amount of heat storage derived from aluminum sulfate hydrate is P0=96 (kJ/kg) that corresponds to 50% of the amount of heat storage P=192 (kJ/kg) of the latent heat storage material 10E alone. Similarly, in Experiment 14 in Example 5, these components are mixed at a mixing ratio of 7:3, and it is considered that the amount of heat storage derived from aluminum sulfate hydrate is P0=134.4 (kJ/kg) that corresponds to 70% of the amount of heat storage P of the latent heat storage material 10E alone.

In the latent heat storage material composition 1E, aluminum sulfate hydrate (latent heat storage material 10E) and erythritol (melting point modifier 13A) and ammonium sulfate (melting point modifier 14) are mixed at a mixing ratio of 9:9:2 in Experiment 15 in Example 5, and therefore it is considered that the amount of heat storage derived from aluminum sulfate hydrate is P0=86.4 (kJ/kg) that corresponds to 45% of the amount of heat storage P=192 (kJ/kg) of the latent heat storage material 10E alone.

Similarly, in Experiment 16 in Example 5, these components are mixed at a mixing ratio of 63:27:10, and therefore it is considered that the amount of heat storage derived from aluminum sulfate hydrate is P0=120.9 (kJ/kg) that corresponds to 63% of the amount of heat storage P=192 (kJ/kg) of the latent heat storage material 10E alone.

However, with respect to the actually measured amount of heat storage of the latent heat storage material composition 1E, the amount of heat storage Sn in the Experiment 13 is 200 (kJ/kg), the amount of heat storage Sp in Experiment 14 is 183 (kJ/kg), the amount of heat storage Sq in Experiment 15 is 247 (kJ/kg), and the amount of heat storage Sr in Experiment 16 is 222 (kJ/kg). It is considered that this is because the amount of heat storage derived from erythritol is added by P2≈48.6 (kJ/kg) in Experiment 14 and the amount of heat storage derived from erythritol is added by P2≈104 (kJ/kg), which is more than 100 (kJ/kg), in Experiment 13, as shown in FIG. 26. It is also considered that this is because the amount of heat storage derived from both of erythritol and ammonium sulfate is added by P2≈101 (kJ/kg) in Experiment 16, and is added by P2≈161 (kJ/kg) in Experiment 15.

Namely, it is assumed that the amount of heat storage derived from erythritol is an absorbed heat amount P2 determined based on negative dissolution heat P2Aa generated upon the dissolution of erythritol (melting point modifier 13A) in hydration water 12 in aluminum sulfate hydrate (latent heat storage material 10E) and a latent heat P2Ab of the melting point modifier 13A.

Similarly, it is also assumed that the amount of heat storage derived from both of erythritol and aluminum sulfate is an amount of absorbed heat P2 determined based on negative dissolution heat P2Aa and negative dissolution heat P2Ba respectively generated upon the dissolution of erythritol (melting point modifier 13A) and ammonium sulfate (melting point modifier 14) in hydration water 12 in aluminum sulfate hydrate (latent heat storage material 10E) and a latent heat P2Ab and a latent heat P2Bb respectively generated upon the melting of the melting point modifier 13A and the melting point modifier 14.

The reason why the melting point of the latent heat storage material composition 1E to which only erythritol is added in each of Experiments 13 and 14 is lower by about 17° C. than the melting point of the latent heat storage material 10E alone is because erythritol acts as a melting point modifier. The reason why the melting point of the latent heat storage material composition 1E to which both of erythritol and ammonium sulfate are added in each of Experiments 15 and 16 is lower by about 32° C. than the melting point of the latent heat storage material 10E alone is because ammonium sulfate that is added together with a sugar alcohol such as erythritol acts as a melting point modifier which can further decrease and fine-adjust the temperature range for the melting point which can be adjusted with erythritol.

Next, the action/effect of the latent heat storage material composition 1 according to Embodiment 1 will be described. The latent heat storage material composition 1 according to Embodiment 1 is characterized in that the latent heat storage material composition 1 is a latent heat storage material composition prepared by mixing a latent heat storage material 10 capable of storing or releasing heat with an additive capable of adjusting a property of the latent heat storage material 10, wherein the latent heat storage material 10 comprises at least one inorganic salt hydrate containing $n_w$ ($2 \leq n_w$) molecules of hydration water, the additive is a melting point modifier 13 (13A,13B) capable of adjusting the melting point of the latent heat storage material 10 and is a substance having a property to generate negative dissolution heat upon the dissolution in the latent heat storage material 10, the melting point modifier 13 contains at least a substance belonging to a sugar alcohol as a first additive, a melt of the latent heat storage material composition 1 is a mixture of the latent heat storage material 10 with the melting point modifier 13 which is formed as the result of the dissolution of the sugar alcohol contained in the melting point modifier 13 in hydration water 12 contained in the latent heat storage material 10, and the substance belonging to a sugar alcohol has the concentration that satisfies formulae (1) and (2) per 1 mol of hydration water (hydration water 12) in the latent heat storage material 10 in the whole amount of the latent heat storage material composition 1:

$$x_s = (m_s/M_s)/\Sigma_{k=1}^{N}(n_{wk} \times m_{ak}/M_{ak}) \quad \text{Formula (1)}$$

$$0.01 \leq x_s \leq 1 \quad \text{Formula (2)}$$

wherein:
$x_s$: the number of moles of a "substance belonging to a sugar alcohol" per 1 mol of hydration water [mol/mol];

$m_s$: the mass of a "substance belonging to a sugar alcohol" contained in a latent heat storage material composition [g];

$M_s$: the molecular weight of a "substance belonging to a sugar alcohol" [g/mol];

N: the total number of latent heat storage materials constituting a latent heat storage material composition;

$n_{wk}$: the hydration number of a latent heat storage material (k=1, 2, . . . , N);

$m_{ak}$: the mass of a latent heat storage material contained in a latent heat storage material composition [g] (k=1, 2, . . . , N); and $M_{ak}$: the molecular weight of a latent heat storage material [g/mol] (k=1, 2, . . . , N).

Due to this characteristic feature, a sufficient amount of hydration water (hydration water 12) of the latent heat storage material 10 is present for the melting point modifier 13 that is a substance belonging to a sugar alcohol. Therefore, negative dissolution heat generated upon the dissolution of the melting point modifier 13 in hydration water in the latent heat storage material 10 contributes to the increase in the amount of heat storage of the latent heat storage material composition 1. In this regard, even if a portion of the melting point modifier 13 contained still remains undissolved in the composition, when the still undissolved portion of the melting point modifier 13 is melted, latent heat in the melting point modifier 13 can contribute to the increase in the amount of heat storage of the latent heat storage material composition 1. As a result, a total amount of heat, which is the sum total of latent heat in the latent heat storage material 10, negative dissolution heat generated upon the dissolution of the melting point modifier 13 in the hydration water (hydration water 12) and heat of fusion of the melting point modifier 13, is stored as endothermic heat in the latent heat storage material composition 1.

Furthermore, the latent heat storage material composition 1 can achieve a large amount of heat storage of, for example, more than 250 kJ/kg, and can have such a property that the melting point thereof can be adjusted to a lower level such as up to about 30° C. compared with the case where a latent heat storage material 10 alone is used.

Therefore, the latent heat storage material composition 1 according to Embodiment 1 has excellent effects such that the melting point of a latent heat storage material 10 can be modified greatly by adding an additive (melting point modifier 13) to the latent heat storage material 10 and a larger amount of heat storage can be achieved even though the melting point modifier 13 is added.

The latent heat storage material composition 1 according to Embodiment 1 is characterized in that the substance belonging to a sugar alcohol (melting point modifier 13) comprises at least one of erythritol ($C_4H_{10}O_4$), xylitol ($C_5H_{12}O_5$) and mannitol ($C_6H_{14}O_6$). Due to this characteristic feature, the melting point of the latent heat storage material composition 1 can be effectively adjusted to a lower temperature compared with the case where the latent heat storage material 10 alone is used. Furthermore, the melting point modifier 13 itself has heat storage-release performance to store heat and release the heat, and therefore has an excellent heat storage material property. Therefore, when the melting point modifier 13 is added, even if the mixing amount of the latent heat storage material 10 relative to the whole weight of the latent heat storage material composition 1 is reduced, the reduction in the amount of heat storage of the latent heat storage material composition 1 can be prevented effectively.

The latent heat storage material composition 1 according to Embodiment 1 is characterized in that ammonium sulfate ($(NH_4)_2SO_4$) (melting point modifier 14) which is a sulfate salt and is a second additive different from the first additive is contained, wherein the concentration of ammonium sulfate 1 per 1 mol of hydration water (hydration water 12) contained in the latent heat storage material 10 in the whole amount of the latent heat storage material composition satisfies the above-mentioned formulae (3) and (4). Due to this characteristic feature, when the melting point modifier 14 is added in a relatively small amount as shown in formula (4), the latent heat storage material composition 1E containing the melting point modifier 14 can be increased in amount of the heat storage by about 20% and can have such a property that the melting point is reduced by around 15° C. compared with the case where only the melting point modifier 13 that serves as a first additive is added to the latent heat storage material 10E.

The latent heat storage material composition 1 according to Embodiment 1 is also characterized in that the inorganic salt hydrate 10 (latent heat storage material 10) is a hydroxymethanesulfinate salt, wherein the hydroxymethanesulfinate salt is sodium hydroxymethanesulfinate dihydrate ($CH_3NaO_3S.2H_2O$) (latent heat storage material 10A). Due to this characteristic feature, the latent heat storage material composition 1A which contains the latent heat storage material 10A as the main component can be used in the case where, for example, the temperature range in which heat is stored and is released is, for example, around 50° C. and an amount of heat storage of about 150 kJ/kg is enough for use.

The latent heat storage material composition 1 according to Embodiment 1 is also characterized in that the inorganic salt hydrate 10 is an acetate salt, wherein the acetate salt is sodium acetate trihydrate ($CH_3COONa.3H_2O$) (latent heat storage material 10B). Due to this characteristic feature, sodium acetate trihydrate can act as a latent heat storage material 10B capable of storing or releasing heat, and negative dissolution heat (endothermic heat) is generated upon the dissolution of the added melting point modifier 13 in hydration water 12 in the latent heat storage material 10B. At the same time, latent heat (endothermic heat) in association with the melting of the latent heat storage material by the addition of the melting point modifier 13 may be generated.

Therefore, in the latent heat storage material composition 1B which contains the latent heat storage material 10B as the main component, the melting point is lowered by, for example, about 20° C. compared with the melting point of the latent heat storage material 10B alone, and this heat absorption enables the storage of heat in a very high heat amount that can exceed the amount of heat storage 276 kJ/kg of the latent heat storage material 10B alone. In addition, sodium acetate trihydrate is widely distributed in the market, and is therefore easily commercially available and inexpensive.

The latent heat storage material composition 1 according to Embodiment 1 is also characterized in that the inorganic salt hydrate 10 is a diphosphate salt (a pyrophosphate salt) or a phosphate salt, wherein the diphosphate salt is sodium diphosphate decahydrate ($Na_4P_2O_7.10H_2O$) (latent heat storage material 10C). Due to this characteristic feature, sodium diphosphate decahydrate can act as a latent heat storage material 10C capable of storing or releasing heat, and negative dissolution heat (endothermic heat) is generated upon the dissolution of the added melting point modifier 13 in hydration water 12 in the diphosphate salt 10C. At the same time, latent heat (endothermic heat) in association with the melting of the latent heat storage material may be generated by the addition of the melting point modifier 13.

Therefore, in the latent heat storage material composition 1C which contains a latent heat storage material 10C as the main component, the melting point is lowered by, for example, about 15° C. compared with the melting point of the latent heat storage material 10C alone, and this heat absorption enables the storage of heat in a very high heat amount that can exceed the heat storage amount 241 kJ/kg of the latent heat storage material 10C alone. In addition, sodium diphosphate decahydrate is widely distributed in the market, and is therefore easily commercially available and inexpensive.

The latent heat storage material composition 1 according to Embodiment 1 is also characterized in that the inorganic salt hydrate 10 is alum hydrate. Due to this characteristic feature, in a latent heat storage material 10D comprising alum hydrate, the latent heat in association with phase change is relatively large, and water capable of dissolving a "substance having a property to generate negative dissolution heat" is contained in the structure constituting alum hydrate. Therefore, in the latent heat storage material composition 1D which contains the latent heat storage material 10D as the main component, the amount of heat storage that can be stored in the latent heat storage material composition 1D can also be increased because the amount of heat storage is the sum total of a relatively large amount of melting latent heat which is generated in the alum alone, melting latent heat in association with the melting point modifier 13 and negative dissolution heat. Therefore, the latent heat storage material composition 1D which contains a latent heat storage material 10D containing alum hydrate as the main component, is excellent, because the latent heat storage material composition 1D has heat storage-release performance to store a large capacity of heat and release the heat.

The latent heat storage material composition 1 according to Embodiment 1 is characterized in that alum hydrate is ammonia alum dodecahydrate ($AlNH_4(SO_4)_2.12H_2O$) or potassium alum dodecahydrate ($AlK(SO_4)_2.12H_2O$) (latent heat storage material 10D). Due to this characteristic feature, ammonia alum dodecahydrate and potassium alum dodecahydrate are widely distributed in the market, and are therefore easily commercially available and inexpensive.

The latent heat storage material composition 1 according to Embodiment 1 is also characterized in that the inorganic salt hydrate 10 is a sulfate salt, wherein the sulfate salt is aluminum sulfate hydrate ($Al_2(SO_4)_3.11H_2O$) ($2 \leq n$) (latent heat storage material 10E). Due to this characteristic feature, aluminum sulfate hydrate can act as a latent heat storage material 10E capable of storing or releasing heat, and negative dissolution heat (endothermic heat) is generated upon the dissolution of the added melting point modifier 13 (or an additive composed of both of the melting point modifier 13 and a melting point modifier 14) in hydration water in the latent heat storage material 10E. At the same time, latent heat (endothermic heat) in association with the melting of the latent heat storage material may be generated by the addition of the melting point modifier 13 and the melting point modifier 14.

Therefore, in the latent heat storage material composition 1E which contains the latent heat storage material 10E as the main component, the melting point is lowered by about 15 to 30° C. compared with the melting point of the latent heat storage material 10E alone, and this heat absorption enables the storage of heat in a high heat amount more than 200 kJ/kg. Particularly, the latent heat storage material composition 1E does not contain water other than hydration water (hydration water 12) in the latent heat storage material 10E that is the main component, and therefore the latent heat storage material composition 1E is free from such concerns that a portion of aluminum sulfate is dissolved in added water to cause the change in properties or quality of the latent heat storage material composition 1E.

Embodiment 2

Next, with respect to a latent heat storage material composition according to another aspect of the present invention, Embodiment 2 (Examples 6 and 7) will be described in detail with reference to FIG. 27 to FIG. 36. The latent heat storage material composition according to Embodiment 2 can be used for the purpose of recovering waste heat generated during the operation of a heat supply source such as a solar power-generating system, a fuel cell system and an automotive engine and utilizing the stored heat energy aggressively.

The waste heat generated in the heat supply source is heat generally having a temperature range from around 60° C. to around 80° C., and is heat generated from a so-called low-temperature-range heat source having a temperature range lower than the heat discharge temperature of a high-temperature range heat source such as a cogeneration gas engine system and a boiler system. The storage and release of heat are carried out by a latent heat storage material composition according to the present invention. In Embodiment 2, the latent heat storage material composition is packed in a heat storage material packaging container, and the heat storage material packaging container is included in a space in a given housing means for heat energy utilization purposes.

Figure 27:
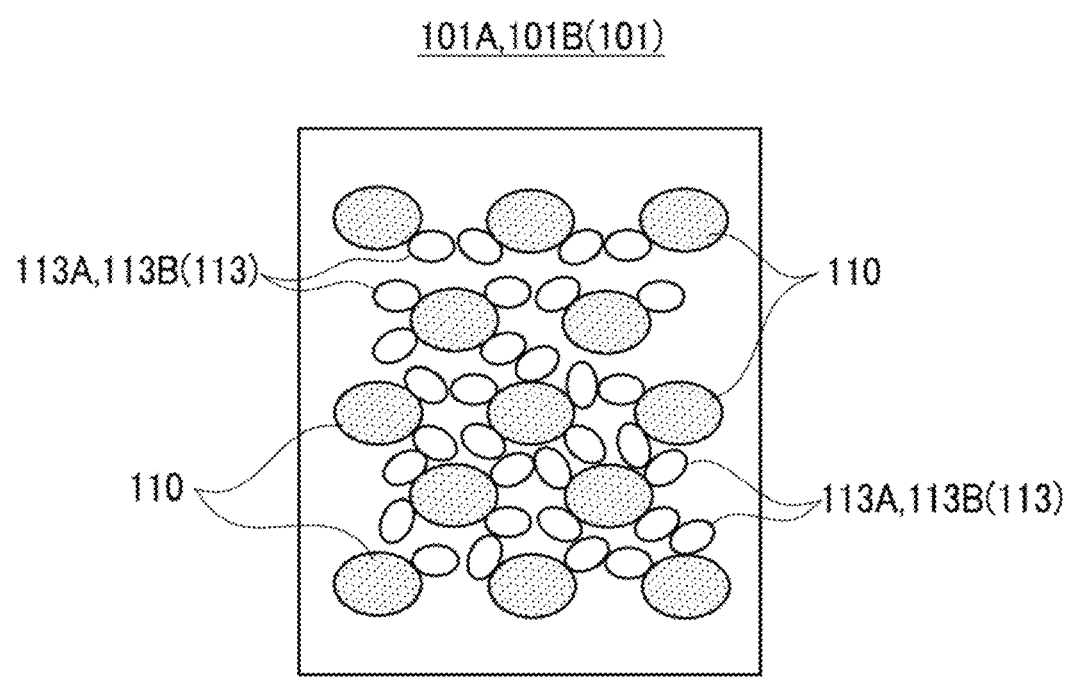
FIG. 27 is a diagram schematically illustrating the components of the latent heat storage material composition according to Embodiment 2.

Firstly, the latent heat storage material composition will be described. FIG. 27 is a diagram schematically illustrating the components of the latent heat storage material composition according to Embodiment 2. As shown in FIG. 27, a latent heat storage material composition 101 comprises a latent heat storage material 110 capable of storing or releasing heat through the absorption or release of latent heat in association with phase change and a melting point modifier 113 that is an additive. In Embodiment 2, the latent heat storage material 110 is an inorganic salt hydrate which contains alum as the main component.

More specifically, the latent heat storage material 110 is ammonia alum (ammonium aluminum sulfate dodecahydrate) ($AlNH_4(SO_4)_2 \cdot 12H_2O$). Ammonia alum is a substance having such properties that the substance has in a solid state at ambient temperature and has a melting point of 93.5° C. Even when ammonia alum alone is heated to about 90° C. that is lower than the melting point thereof, ammonia alum is hardly melted and cannot store latent heat.

Besides ammonia alum, the latent heat storage material 110 comprising the inorganic salt hydrate may be "alum" which is a double sulfate salt of a monovalent cation sulfate salt $M^I_2(SO_4)$ with a trivalent cation sulfate salt $M^{III}_2(SO_4)_3$, such as potassium alum dodecahydrate ($AlK(SO_4)_2 \cdot 12H_2O$), chromium alum ($CrK(SO_4)_2 \cdot 12H_2O$) and iron alum ($FeNH_4(SO_4)_2 \cdot 12H_2O$). The trivalent metal ion contained in this "alum" may be an aluminum ion, a chromium ion or an iron ion or may be a metal ion such as a cobalt ion and manganese ion. The latent heat storage material 110 may be a heat storage material which contains, as the main component, a mixture or a mixed crystal which contains at least two substances each belonging to this "alum".

The melting point modifier 113 is an additive capable of adjusting the melting point (93.5° C.) of the latent heat storage material 110 to an arbitrary temperature as required. In Embodiment 2, the melting point modifier 113 has a property to adjust the melting point to a temperature ranging from around 60° C. to around 80° C. The melting point modifier 113 is a substance having a property to generate negative dissolution heat upon the dissolution in the latent heat storage material 110.

More specifically, the melting point modifier 113 comprises a substance belonging to a sugar alcohol which has been primarily used as a food additive, such as erythritol ($C_4H_{10}O_4$) (Example 6 in Embodiment 2) and xylitol ($C_5H_{12}O_5$) (Example 7 in Embodiment 2). The sugar alcohol is one type of sugar produced by reducing a carbonyl group in an aldose or a ketose and can be dissolved in water. The mixing amount of the melting point modifier 113 in the whole amount of the latent heat storage material composition 101 is 1.59 to 5.57 mol per 1 mol of the latent heat storage material 110. The reason for this will be described below.

The definition of the "substance having a property to generate negative dissolution heat" will be described. As mentioned above, the latent heat storage material composition 101 is prepared by mixing a latent heat storage material 110 comprising ammonia alum (ammonium aluminum sulfate dodecahydrate) which is the main component, with a melting point modifier 113. When the melting point modifier 113 is dissolved in the latent heat storage material 110, if an endothermic heat reaction occurs in the melting point modifier 113 as the result of the absorption of heat from the outside, then the melting point modifier 113 is defined as a "substance having a property to generate negative dissolution heat" in the latent heat storage material composition 101 according to Embodiment 2.

In addition to erythritol and xylitol, the "substance having a property to generate negative dissolution heat" also includes a "substance belonging to a sugar alcohol" such as mannitol ($C_6H_{14}O_6$), sorbitol ($C_6H_{14}O_6$) and lactitol ($C_{12}H_{24}O_{11}$). The "substance having a property to generate negative dissolution heat" also includes a "substance belonging to a chloride" such as calcium chloride hexahydrate ($CaCl_2 \cdot 6H_2O$), magnesium chloride hexahydrate ($MgCl_2 \cdot 6H_2O$), potassium chloride (KCl) and sodium chloride (NaCl).

The "substance having a property to generate negative dissolution heat" may include at least one type of the "substance belonging to a sugar alcohol", or may include at least one type of the "substance belonging to a chloride". The "substance having a property to generate negative dissolution heat" may also include a mixture of any one of substances corresponding to the "substance belonging to a sugar alcohol" with any one of substances corresponding to the "substance belonging to a chloride".

In addition, ammonium nitrate, potassium chlorate or the like, which is needed to be handled carefully and cannot be used preferably in the latent heat storage material composition of Embodiment 2, also corresponds to the "substance having a property to generate negative dissolution heat", because the substance can cause an endothermic heat reaction upon the dissolution in water.

Figure 28:
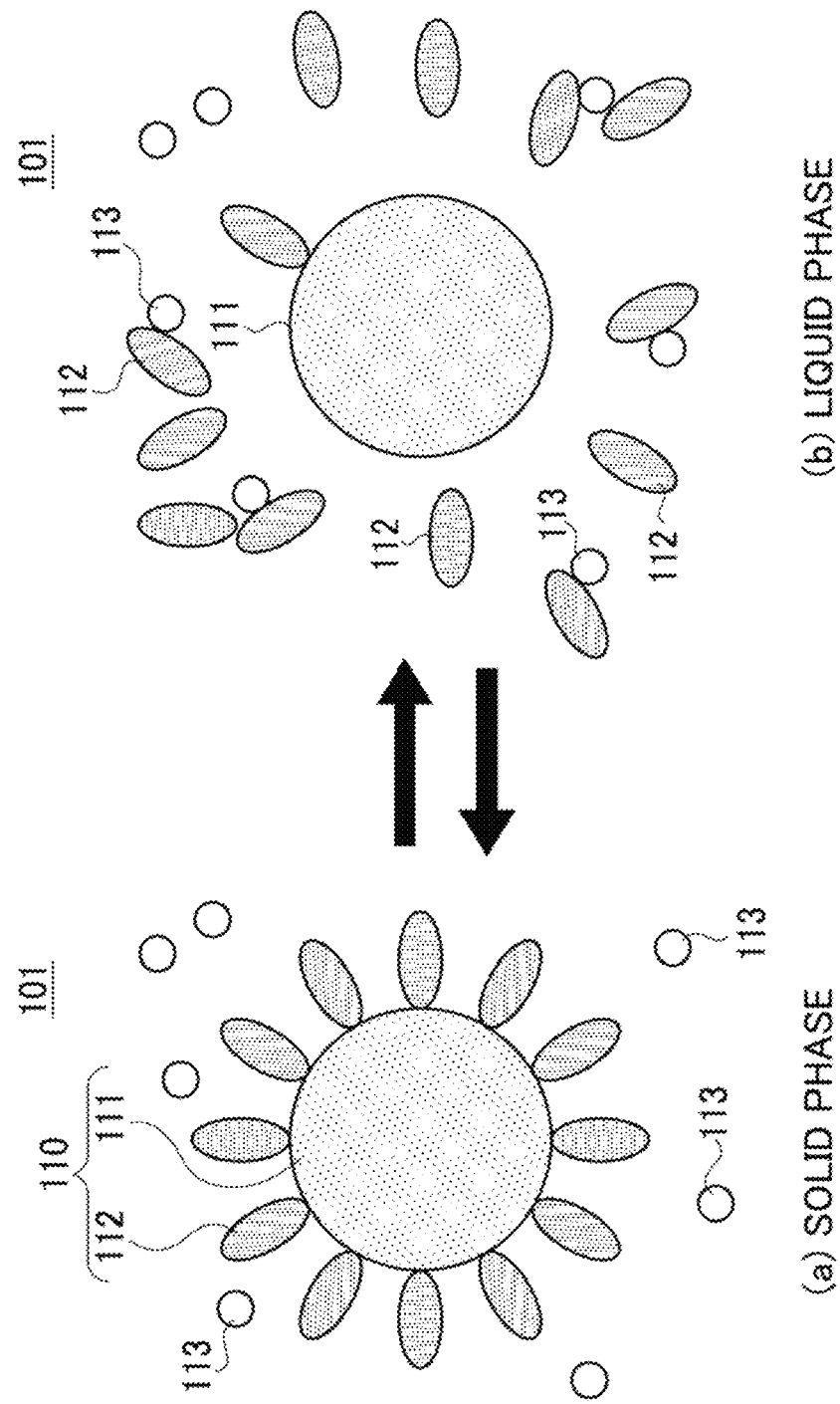
FIG. 28 is a schematic diagram showing the state of a solid phase and the state of a liquid phase which are formed as the result of the phase change of the latent heat storage material composition according to Embodiment 2.

FIG. 28 is a schematic diagram showing the state of a solid phase and the state of a liquid phase which are formed as the result of the phase change of the latent heat storage material composition according to Embodiment 2. When the temperature of the latent heat storage material composition 101 is lower than the melting point of the latent heat storage material 110 which is adjusted with the melting point modifier 113, the latent heat storage material composition 101 is in a solid phase, and the latent heat storage material 110 composed of alum 111 and hydration water 112 cannot dissolve the melting point modifier 113 as shown in FIG. 28 (a).

In Embodiment 2, the latent heat storage material 110 is ammonia alum (ammonium aluminum sulfate dodecahydrate), and therefore alum 111 corresponds to ammonium aluminum sulfate and hydration water 112 corresponds to hydration water that constitutes dodecahydrate. Under this relationship, alum 111 and hydration water 112 are general terms corresponding to all of alum hydrate compounds each containing ammonia alum.

When the temperature of the latent heat storage material composition 101 is higher than the melting point of the latent heat storage material 110 after the adjustment with the melting point modifier 113, alum 111 in the latent heat storage material 110 is melted and is separated from the hydration water 112, and the melting point modifier 113 is dissolved in the hydration water 112 and, as a result, the whole of the latent heat storage material composition 101 becomes in the state of a liquid phase, as shown in FIG. 28 (b). When alum 111 is melted, latent heat of fusion upon the melting in association with the phase change from a solid phase into a liquid phase is stored in alum 111. At the same time, negative dissolution heat is generated in the melting point modifier 113 as the result of the dissolution of the melting point modifier 113 in the hydration water 112.

Therefore, when the latent heat storage material composition 101 is heated at a high temperature that is higher than the melting point thereof, the latent heat storage material composition 101 changes in phase from a solid phase to a liquid phase. As a result, the latent heat storage material composition 101 can store, as the amount of heat storage, the sum total of the amount of heat of the above-mentioned melting heat (endothermic heat) and the amount of heat of negative dissolution heat (endothermic heat).

In contrast, when the latent heat storage material composition 101 is cooled to a low temperature that is lower than the freezing point thereof, the hydration water 112 that is homogeneously mixed with the melting point modifier 113 in the liquid phase latent heat storage material composition 101 is separated from the melting point modifier 113, as shown in FIG. 28 (a). The separated hydration water 112 causes a hydration reaction with alum 111 to produce a latent heat storage material 110, and alum 111 releases latent heat of fusion in association with the change in phase from a liquid phase to a solid phase. At the same time, in hydration water 112 and the melting point modifier 113, heat corresponding to the different in heat energy before and after the dissolution is released.

As a result, when the latent heat storage material composition 101 is cooled to a temperature lower than the freezing point thereof, the latent heat storage material composition 101 undergoes the change in phase from a liquid phase to a solid phase, and therefore can release the sum total of the amount of the latent heat of fusion (released heat) and the amount of heat corresponding to the above-mentioned difference in energy as an amount of released heat.

It is critical that the latent heat storage material composition 101 is filled in a leak-proof inner bag 140 as mentioned below in a liquid-tight state, in order to prevent the circumfusion of the hydration water 112 separated from alum 111 from the leak-proof inner bag 140 during the use of the latent heat storage material composition 101. This is because the latent heat storage material composition 101 is required to have a property to repeat, several times, such a cycle that waste heat coming from the heat supply side is stored and the stored heat is released to the heat demand side upon use.

In order to achieve this property, the latent heat storage material composition 101 is needed to undergo the change in phase between a solid phase and a liquid phase reversibly on both sides of the melting point of the latent heat storage material 110 in the latent heat storage material composition 101, as shown in FIG. 28. When the separated hydration water 112 is circumfused to the outside, alum 111 cannot contain hydration water in an amount necessary for the production of the latent heat storage material 110 (ammonia alum) in association with the change in phase from a liquid phase to a solid phase, and consequently a latent heat storage material composition 101 in a solid state cannot be produced.

Even if the hydration water 112 is circumfused from the leak-proof inner bag 140, when water vapor can flow into the inside of the leak-proof inner bag 140 and the water vapor can be supplemented in place of the circumfused hydration water 112, it becomes possible to produce a latent heat storage material composition 101 in a solid phase.

Next, in order to confirm the influence of the substance constituting the melting point modifier 113 added in the latent heat storage material composition on the heat storage performance, Experiments 18 to 21 were carried out as research experiments. Experiment 18 according to Example 6 in Embodiment 2 is an experiment in which a latent heat storage material composition 101A (101) containing erythritol ($C_4H_{10}O_4$) as the melting point modifier 113 is used as a sample. Experiment 19 according to Example 7 in Embodiment 2 is an experiment in which a latent heat storage material composition 101B (101) containing xylitol ($C_5H_{12}O_5$) as the melting point modifier 113 is used as a sample.

Experiment 20 is an experiment carried out for Comparative Example 6 for Examples 6 and 7, in which a latent heat storage material composition 101C containing anhydrous sodium sulfate ($Na_2SO_4$) as the melting point modifier 113C is used as a sample. Experiment 21 is an experiment carried out for Comparative Example 7 for Examples 6 and 7, in which a latent heat storage material 110 alone without a melting point modifier is used as a sample.

Figure 29:
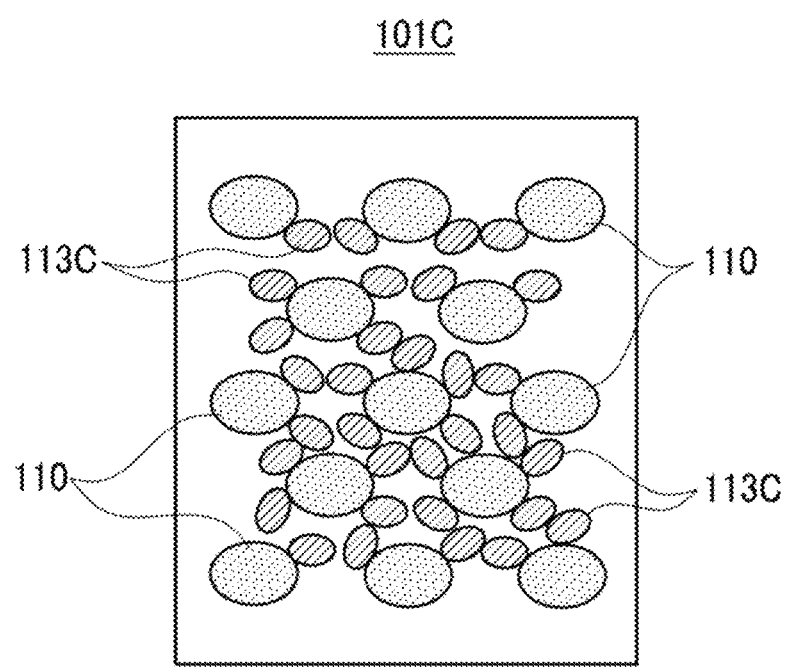
FIG. 29 is a diagram schematically illustrating the components of the latent heat storage material composition according to Comparative Example 6 in Embodiment 2.

The present applicant confirmed the significance of the latent heat storage material composition 101 through Experiment 18 to Experiment 21 by comparing latent heat storage material compositions 101 (101A,101B) according to Examples 6 and 7 in Embodiment 2 with a latent heat storage material composition 101C according to Comparative Example 6 and a latent heat storage material 110 according to Comparative Example 7. FIG. 29 is a diagram schematically illustrating the components of the latent heat storage material composition according to Comparative Example 6.

<Experimental Method>

In the research experiment, the amount of heat storage of a sample (10 mg) placed on a sample table in a publicly known differential scanning calorimetric measurement device (DSC: differential scanning calorimetry) is measured using the differential scanning calorimetric measurement device while air-tightly sealing the sample and exposing the sample to an atmospheric gas composed of air at its flow rate of 30 ml/min. In Experiment 18 to Experiment 20, the amount of heat storage is measured after heating the sample from ambient temperature to 90° C. at a heating rate of 2° C./min. and then holding the sample at a temperature of 90°

C. for 20 minutes. In Experiment 21, the heat storage amount is measured after heating the sample from ambient temperature to 98° C. at a heating rate of 2° C./min. and then holding the sample at a temperature of 98° C. for 5 minutes.

<Common Condition Among Experiments 18 to 21>

Latent heat storage material 110: ammonia alum (ammonium aluminum sulfate dodecahydrate: $AlNH_4(SO_4)_2 \cdot 12H_2O$)

<Conditions for Experiment 18>

Components of a latent heat storage material composition 101A: a latent heat storage material 110 and a melting point modifier 113 (see FIG. 27)

Melting point modifier 113: erythritol ($C_4H_{10}O_4$) (=a melting point modifier 113A)

Properties of erythritol: molecular weight [g/mol] 122.12, melting point about 119° C.

Mixing amount of erythritol relative to the whole weight of a latent heat storage material composition 101: 50 wt %

(latent heat storage material 110: melting point modifier 113A=1:1)

Number of moles of erythritol per 1 mol of a latent heat storage material 110=3.71 [mol/mol]

<Conditions for Experiment 19>

Components of a latent heat storage material composition 101B: a latent heat storage material 110 and a melting point modifier 113 (see FIG. 27)

Melting point modifier 113: xylitol ($C_5H_{12}O_5$) (=melting point modifier 113B)

Properties of xylitol: molecular weight [g/mol] 152.15, melting point about 92 to 96° C.

Mixing amount of xylitol relative to the whole weight of a latent heat storage material composition 101: 50 wt %

(latent heat storage material 110: melting point modifier 113B=1:1)

Number of moles of xylitol per 1 mol of a latent heat storage material 110=2.98 [mol/mol]

<Conditions for Experiment 20>

Components of a latent heat storage material composition 101C: a latent heat storage material 110 and a melting point modifier 113C (see FIG. 29)

Melting point modifier 113C: anhydrous sodium sulfate ($Na_2SO_4$)

Mixing amount of anhydrous sodium sulfate in the whole of a latent heat storage material composition 101: 50 wt %

(latent heat storage material 110: melting point modifier 113C=1:1)

<Conditions for Experiment 21>

Melting point modifier: not added

Mixing amount of a latent heat storage material 110: 100 wt %

(latent heat storage material 110: melting point modifier=100:0)

Figure 30:
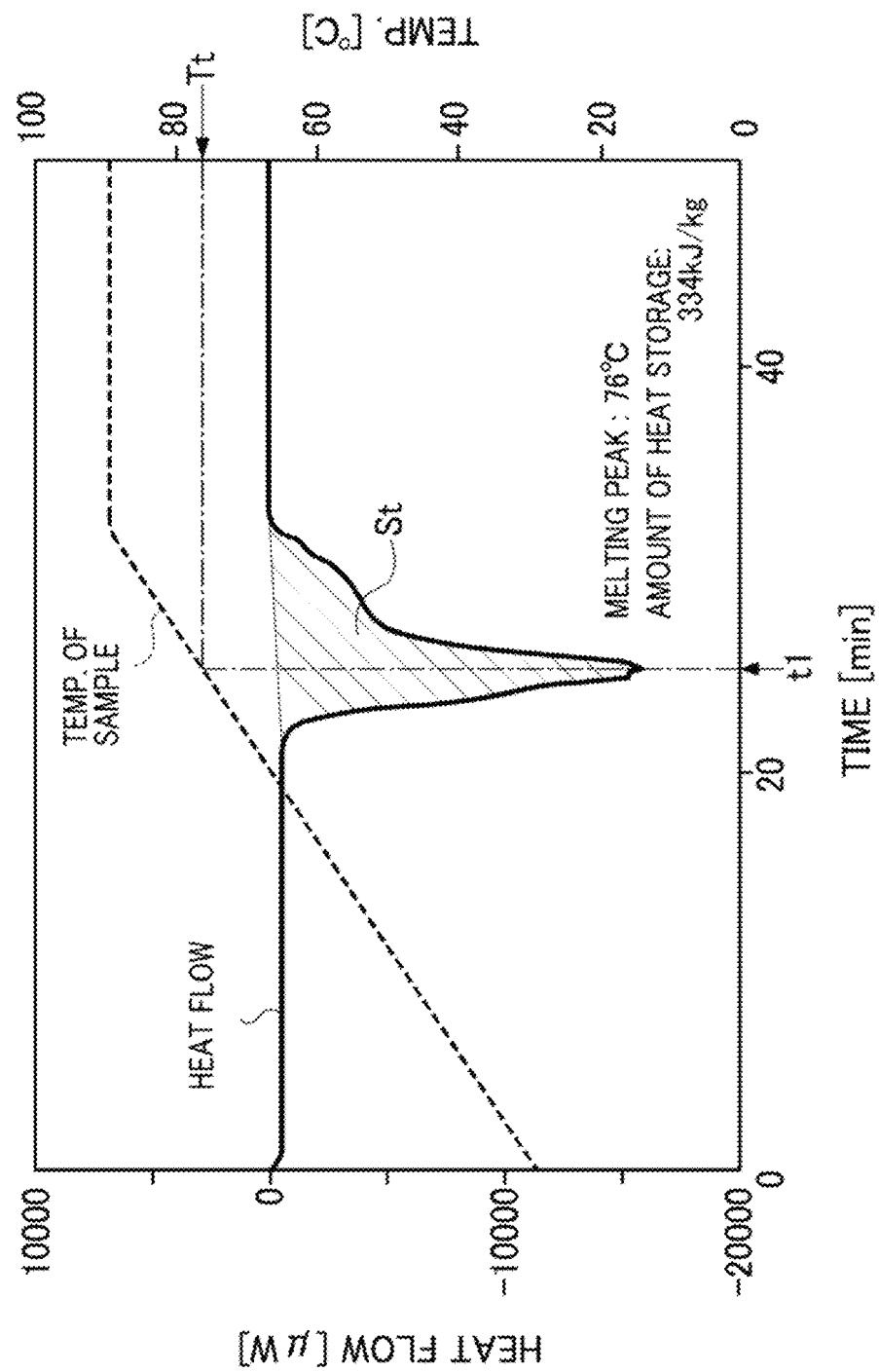
FIG. 30 is a graph showing the time course of the change in temperature and amount of heat storage of the latent heat storage material composition according to Example 6 in Embodiment 2, and shows an experimental result of the case where the melting point modifier is erythritol.
Figure 31:
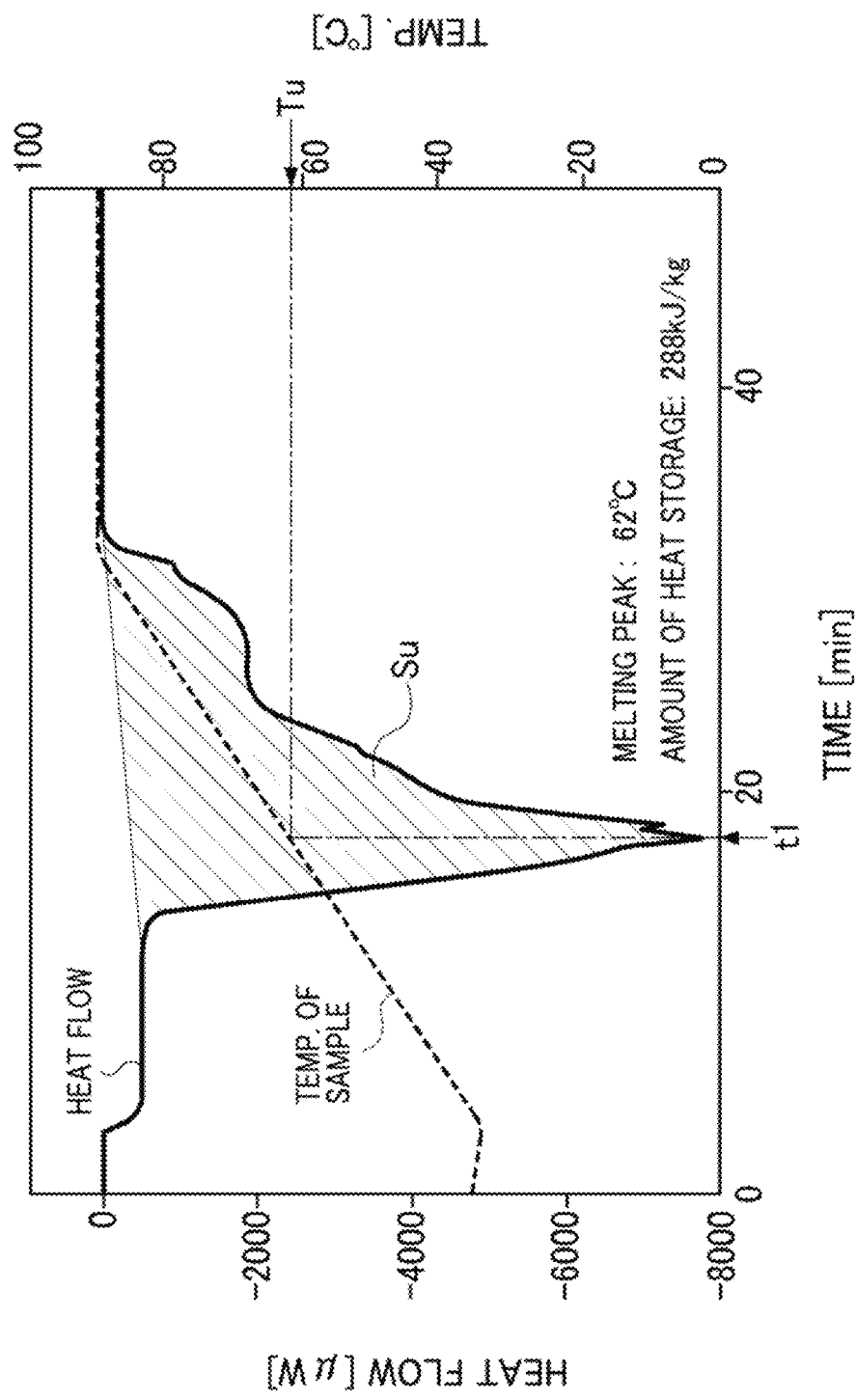
FIG. 31 is a graph showing the time course of the change in temperature and amount of heat storage of the latent heat storage material composition according to Example 7 in Embodiment 2, and shows an experimental result of the case where the melting point modifier is xylitol.
Figure 32:
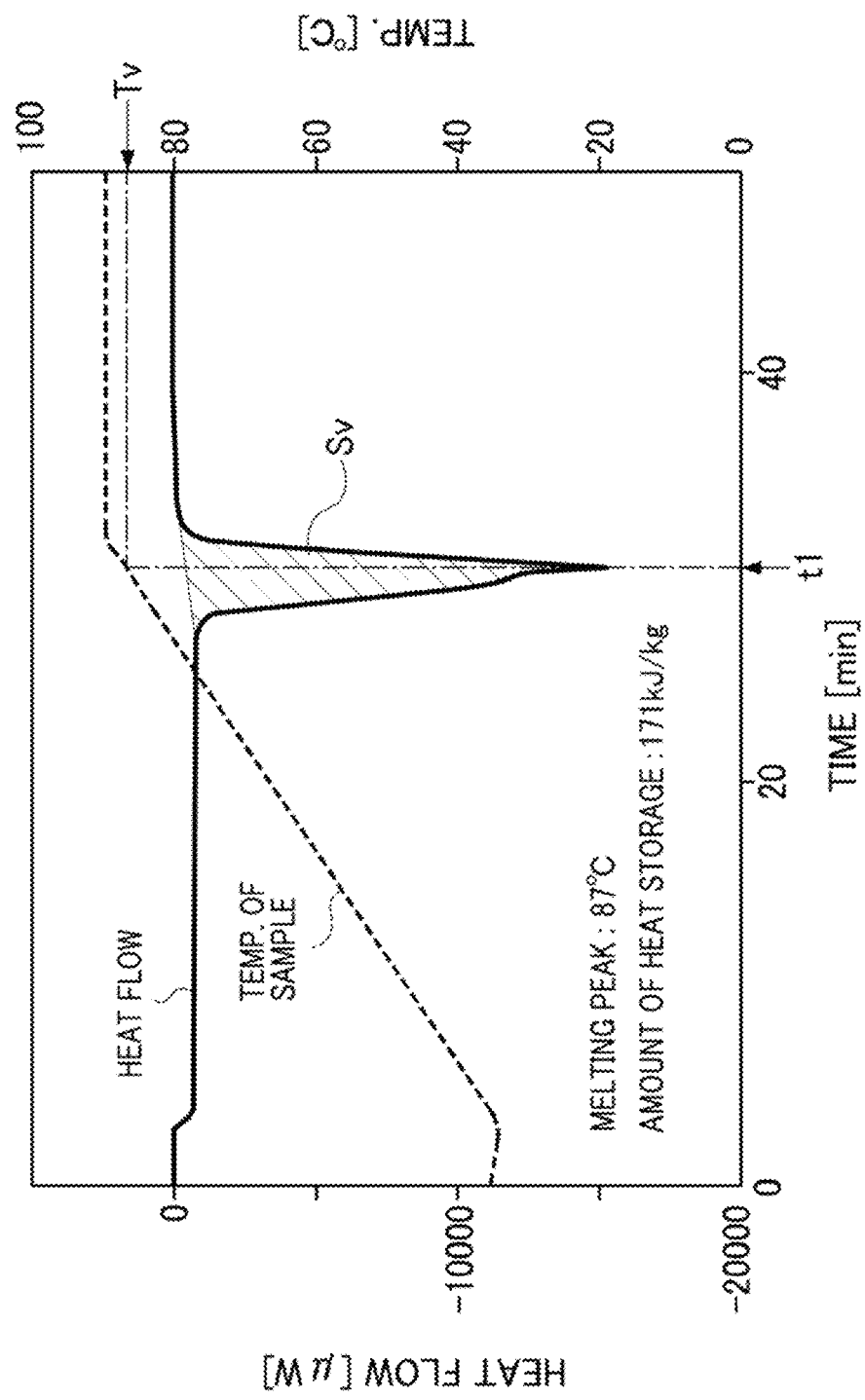
FIG. 32 is a graph showing the time course of the change in temperature and amount of heat storage of the latent heat storage material composition according to Comparative Example 6 in Embodiment 2, and shows an experimental result of the case where the melting point modifier is anhydrous sodium sulfate.
Figure 33:
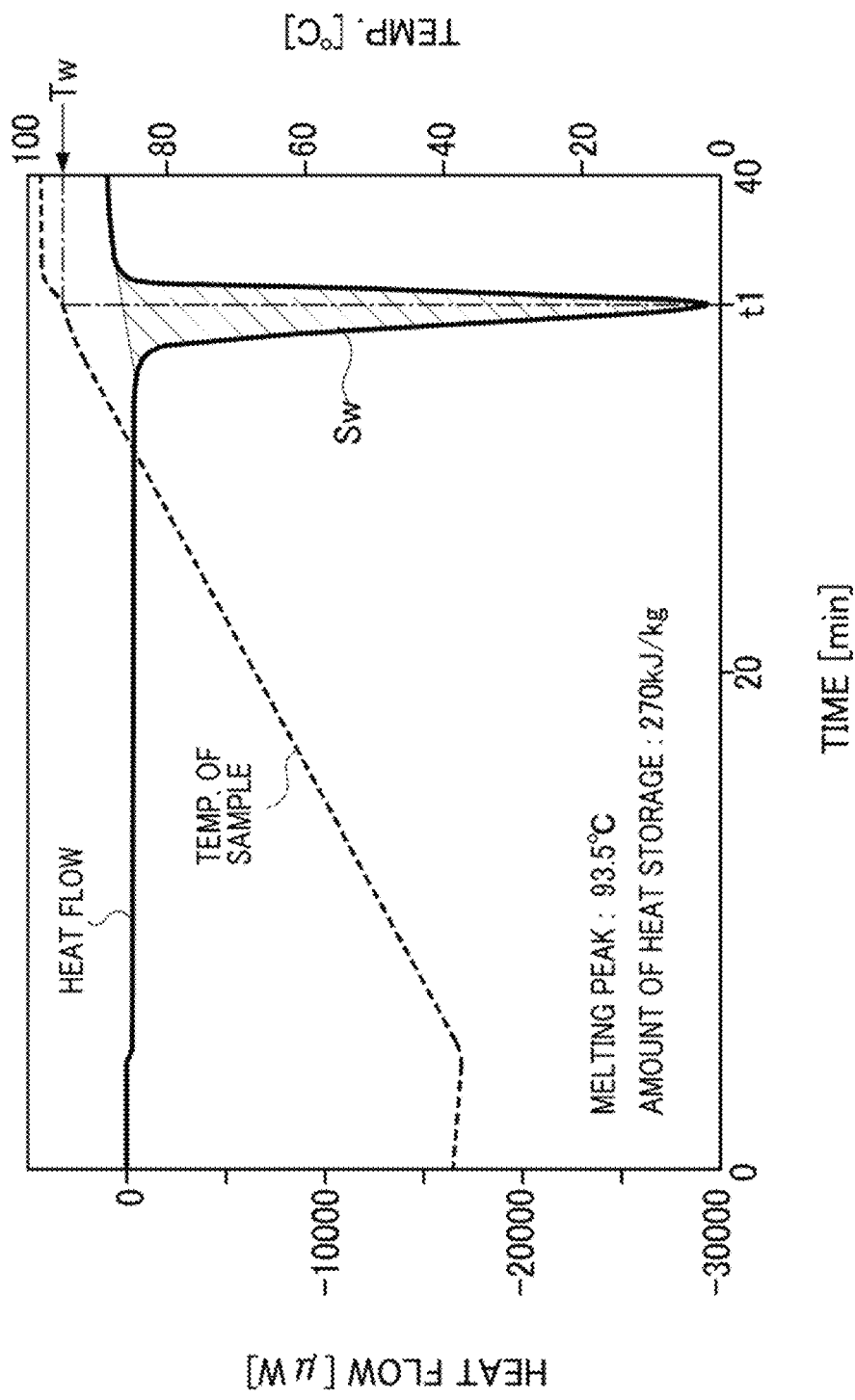
FIG. 33 is a graph showing the time course of the change in temperature and amount of heat storage of the latent heat storage material alone according to Comparative Example 7 in Embodiment 2 in which the result is expressed in experimental measurement values.

FIG. 30 is a graph showing the time course of the change in temperature and amount of heat storage of the latent heat storage material composition according to Example 6 in Embodiment 2, and shows an experimental result of the case where the melting point modifier is erythritol. FIG. 31 is a graph showing the time course of the change in temperature and amount of heat storage of the latent heat storage material composition according to Example 7 in Embodiment 2, and shows an experimental result of the case where the melting point modifier is xylitol. FIG. 32 is a graph showing the time course of the change in temperature and amount of heat storage of the latent heat storage material composition according to Comparative Example 6 in Embodiment 2, and shows an experimental result of the case where the melting point modifier is anhydrous sodium sulfate. FIG. 33 is a graph showing the time course of the change in temperature and amount of heat storage of the latent heat storage material alone according to Comparative Example 7 in Embodiment 2 in which the result is expressed in experimental measurement values.

In each of the graphs shown in FIGS. 30 to 33, the scale on a left-side vertical axis shows the amount of heat stored in or released from a sample per unit time, wherein a value located in the "negative" zone in the scale shows the amount of heat absorbed in a sample and a value located in the "positive" zone in the scale shows the amount of heat released from a sample. In a line figure showing a heat amount that varies with the elapse of time, a sample shows the maximum amount of heat storage at a temperature T corresponding to time t at which the absolute value of the heat flow increases transiently and reaches the maximum value (peak top) (wherein the temperature T is defined as a melting point).

In each of the line figures showing heat amounts, the melting latent heat of a sample is expressed in the size of a peak area S (a shaded area in FIGS. 30 to 33) which is determined by integrating heat amounts in a time range between a time point at which a peak of the heat storage amount starts and a time point at which the peak is ended. The unit for the heat flow of a sample is expressed in [μW], and the unit for the mass of a sample is expressed in [mg]. With respect to the unit for the amount of heat storage, the unit for the amount of heat storage is converted and is expressed in [kJ/kg].

<Results of Experiments>

In the latent heat storage material composition 101A according to Example 6, as shown in FIG. 30, the temperature Tt corresponding to endothermic peak time t1 was 76° C. and the amount of heat storage St was 334 kJ/kg (Experiment 18). In the latent heat storage material composition 101B according to Example 7, as shown in FIG. 31, the temperature Tu corresponding to an endothermic peak time t1 was 62° C. and the amount of heat storage Su was 288 kJ/kg (Experiment 19). In the latent heat storage material composition 101C according to Comparative Example 6, as shown in FIG. 32, the temperature Tv corresponding to endothermic peak time t1 was 87° C. and the amount of heat storage Sv was 171 kJ/kg (Experiment 20).

In Comparative Example 6, although the reason is not found yet, the melting point of the latent heat storage material 110 in the latent heat storage material composition 101C was decreased to 87° C. even when anhydrous sodium sulfate was added in an amount of 50 wt % to ammonia alum in the latent heat storage material composition 101C. In the latent heat storage material 110 alone according to Comparative Example 7, as shown in FIG. 33, the temperature Tw corresponding to the endothermic peak time t1 was 93.5° C. and the amount of heat storage Sw was 270 kJ/kg (Experiment 21).

<Discussion>

Figure 34:
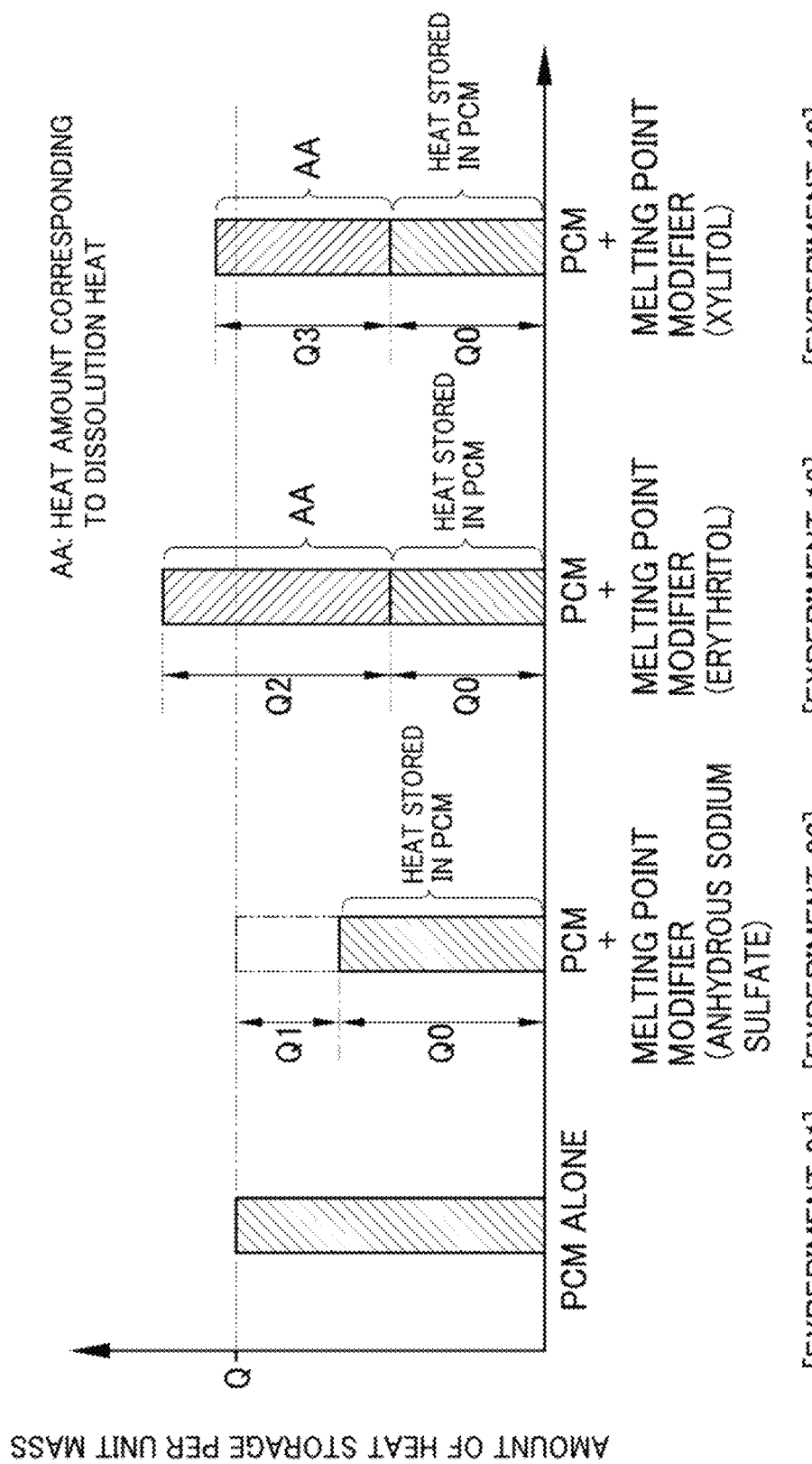
FIG. 34 is an explanatory diagram showing the significance of the latent heat storage material composition according to Embodiment 2.

FIG. 34 is an explanatory diagram showing the significance of the latent heat storage material composition according to Embodiment 2. According to Comparative Example 7, it is found that the amount of heat that can be stored in ammonia alum alone (which is indicated as "PCM" in FIG. 34) which does not contain any additive other than the latent heat storage material 110 is 270 kJ/kg (which corresponds to "amount of heat storage Q" in FIG. 34). The result of Experiment 21 in Comparative Example 7 almost agrees with the value of the amount of heat storage of ammonia alum that is a publicly known substance, and the result of the melting point (93.5° C.) also agrees with that of ammonia alum.

In Comparative Example 6, in a latent heat storage material composition 101C comprising ammonia alum (latent heat storage material 110) and anhydrous sodium sulfate (melting point modifier 113C), anhydrous sodium sulfate that does not have heat storage properties is contained. Therefore, it is considered that the amount of heat storage Q0 (Q0<Q) of the latent heat storage material 110 capable of storing heat per unit mass of the latent heat storage material composition 101C is smaller by Q1 (Q1<Q) than Q.

Actually, the amount of heat Q1 that is a reduced amount of heat storage is calculated based on Comparative Examples 6 and 7:

$Q1=(Q-Q0)$, $Q1=270$ (kJ/kg)$-171$ (kJ/kg)$\approx100$ (kJ/kg).

The Q1 that is a reduced amount of heat storage becomes about 100 (kJ/kg), and is a loss corresponding to about 37% of the amount of heat storage 270 (kJ/kg) of ammonia alum alone.

In contrast, in Example 6, in the latent heat storage material composition 101A, the melting point modifier 113A (erythritol) generates negative dissolution heat upon the dissolution of erythritol in hydration water contained in ammonia alum (latent heat storage material 110), while ammonia alum stores melting latent heat in association with the phase change from a solid phase to a liquid phase.

The latent heat storage material composition 101A has the above-mentioned properties. Therefore, it is considered that the total amount of heat storage that can be stored per unit mass of the latent heat storage material composition 101A is a value corresponding to the sum total of the amount of heat storage Q0 of the latent heat storage material 110 (Q0=0.5Q, because Q0 is considered to be 50% of the amount of heat storage (270 (kJ/kg)) of ammonia alum alone) which is the amount of heat stored by PCM and the amount of heat Q2 generated by erythritol which corresponds to dissolution heat.

Actually, the heat amount Q2 is calculated based on Example 6 and Comparative Example 7:

assuming that $Q0=135$ (kJ/kg), then $Q2=$(amount of heat storage $St-Q0$), $Q2=334$ (kJ/kg)$-135$ (kJ/kg)$\approx200$ (kJ/kg).

The amount of heat Q2 corresponding to the dissolution heat by erythritol is about 200 (kJ/kg), which is a value added with a value corresponding to about 1.5 times the amount of heat stored by PCM (135 (kJ/kg)).

In the latent heat storage material composition 101A containing erythritol (melting point modifier 113A), the melting point is 76° C., and is lower by 11° C. than the melting point (87° C.) of the latent heat storage material composition 101C according to Comparative Example 6. However, the reason for this phenomenon does not become obvious yet at the present time.

The reason why the mixing amount of the melting point modifier 113 to be added in the latent heat storage material composition 101 is 1.59 to 5.57 mol per 1 mol of the latent heat storage material 110 will be explained with taking erythritol (melting point modifier 113A) as an example of the melting point modifier 113. When the lower limit of the concentration of the melting point modifier 113A is 1.59 mol, the mixing amount of the melting point modifier 113A relative to the whole weight of the latent heat storage material composition 101, which is determined by unit conversion, is 30 wt %. When the upper limit of the concentration of the melting point modifier 113A is 5.57 mol, the mixing amount of the melting point modifier 113A relative to the whole weight of the latent heat storage material composition 101, which is determined by unit conversion, is 60 wt %.

Example 6 was Experiment 18 in which the mixing amount of erythritol was 50 wt %. In regard to Experiment 18, the present applicant carried out multiple experiments in which the mixing amount of erythritol was varied. The results of the experiments are omitted. It was confirmed from the multiple experiments that, when the amount of erythritol added falls within the range from 30 to 60 wt % relative to the amount of the latent heat storage material composition 101A, there is not a critical difference between the experimental results of Experiment 18 which relate to the behavior of the graph showing the amount of heat storage at a peak of the latent heat storage material composition 101A, the peak top of the heat flow and the amount of heat storage- and the experimental results of Experiment 18, as shown in FIG. 30.

Namely, when the amount of erythritol added falls within the range from 30 to 60 wt %, even if the amount of erythritol added increases, the melting point of the latent heat storage material composition 101A does not vary in the range from 75 to 76° C. and the heat storage amount of the latent heat storage material composition 101A is about 330 (kJ/kg). However, it is confirmed that, when the amount of erythritol added falls outside the range from 30 to 60 wt %, a new phenomenon such that the peak top of the heat flow is split into two peaks occurs and therefore this is not desirable for a latent heat storage material composition.

Discussion with respect to Example 7 will be made again. In Example 7, as in the case of Example 6, in the latent heat storage material composition 101B, the melting point modifier 113B (xylitol) generates negative dissolution heat upon the dissolution of xylitol in hydration water in the latent heat storage material 110 (ammonia alum), while ammonia alum stores latent heat of fusion in association with the phase change from a solid phase to a liquid phase.

The latent heat storage material composition 101B has the above-mentioned properties. Therefore, it is considered that the total amount of heat storage that can be stored per unit mass of the latent heat storage material composition 101B is a value corresponding to the sum total of the amount of heat storage Q0 of the latent heat storage material 110 (Q0=0.5Q, because Q0 is considered to be 50% of the amount of heat storage (270 (kJ/kg)) of ammonia alum alone) which is the amount of heat stored by PCM and the heat amount Q3 generated by xylitol which corresponds to dissolution heat.

Actually, the amount of increased heat Q3 is calculated based on Example 7 and Comparative Example 7:

assuming that $Q0=135$ (kJ/kg), then $Q2=$(amount of heat storage $Su-Q0$), $Q2=288$ (kJ/kg)$-135$ (kJ/kg)$\approx150$ (kJ/kg).

The amount of increased heat Q3 corresponding to the dissolution heat by xylitol is about 150 (kJ/kg), which is a value added with a value corresponding to about 1.1 times the amount of heat stored by PCM (135 (kJ/kg)).

In the latent heat storage material composition 101B containing xylitol (melting point modifier 113B), the melting point is 62° C., and is lower by 14° C. than the melting point (76° C.) of the latent heat storage material composition 101A containing erythritol (melting point modifier 113A). The melting point (62° C.) of the latent heat storage material composition 101B is lower by 25° C. than the melting point (87° C.) of the latent heat storage material composition 101C according to Comparative Example 7. However, the reason for this phenomenon does not become obvious yet at the present time.

Figure 35:
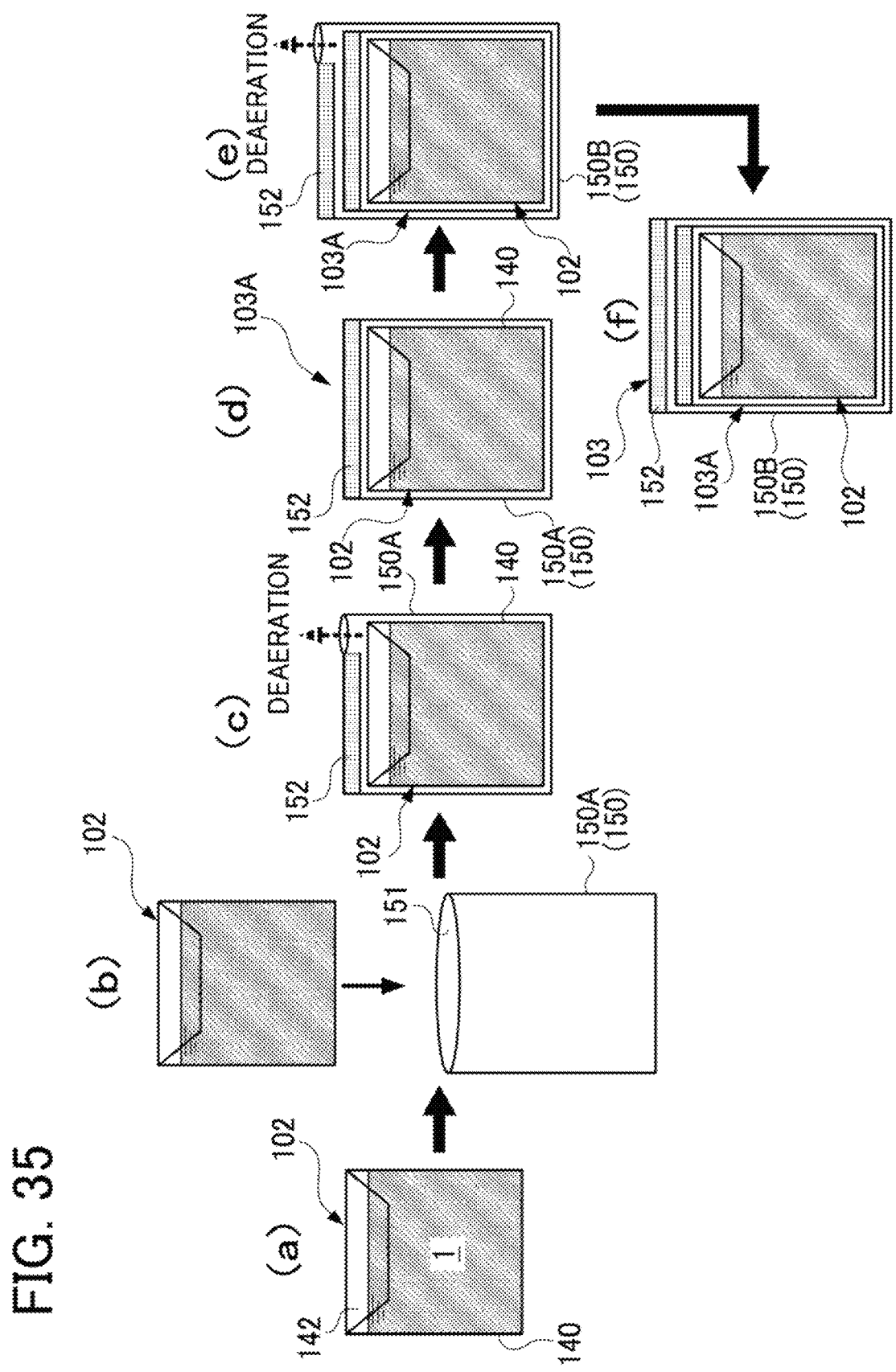
FIG. 35 is a process drawing showing a series of process until the latent heat storage material composition according to Embodiment 2 is packed in a sealing bag.

Next, one example of a means for including the latent heat storage material composition 101 according to Embodiment 2 in a container will be described with reference to FIG. 35. FIG. 35 is a process drawing showing a series of process until the latent heat storage material composition according to Embodiment 2 is packed in a sealing bag.

The latent heat storage material composition 101 is packed using, as packaging containers, two types of bags, i.e., a leak-proof inner bag 140 and a sealing bag 150, as shown in FIG. 35. The leak-proof inner bag 140 is, for example, a packaging bag made from polyethylene (PE) and having a thickness of about 0.02 mm.

The sealing bag 150 is, for example, a laminate bag having a structure composed of at least two layers, in which an aluminum foil is deposited on the outside of a film-like resin made from, for example, polyethylene (PE), polypropylene (PP) or poly(ethylene terephthalate) (PET) and having a thickness of about 0.05 to 0.15 mm, and has flexibility. The sealing bag 150 is used in such a manner that two bags having different sizes are used in a set and in a double-layered structure and the two bags (i.e., a first sealing bag 150A and a second sealing bag 150B) are overlaid on each other so as to form a nested structure.

More specifically, the latent heat storage material composition 101 is packed in the leak-proof inner bag 140, and is then sealed along a folded part 142 of the leak-proof inner bag 140 (see (a) in FIG. 35). A heat storage material enclosed product 102 in which the latent heat storage material composition 101 is packed in a first sealing bag 150A through an opening 151 (see (b) in FIG. 35). Subsequently, as shown in FIG. 35 (c), the inside of the first sealing bag 150A is decreased by sucking with a well-known vacuum deaeration sealer, and a sealing part 152 to which the opening 151 of the first sealing bag 150A is fused in the first sealing bag 150A is completely sealed ((d) in FIG. 35).

The sucking is carried out until the leak-proof inner bag 140 having the heat storage material enclosed product 102 packed therein can be closely adhered to the shrunk first sealing bag 150A, thereby sealing the opening 151 of the first sealing bag 150A. In this manner, a heat storage material enclosed prepack 103A in which the heat storage material enclosed product 102 is enclosed in the first sealing bag 150A is produced.

Subsequently, the heat storage material enclosed prepack 103A thus produced is packed in the outside second sealing bag 150B (sealing bag 150) through the opening 151. Subsequently, as shown in FIG. 35 (e), the inside of the second sealing bag 150B is deaerated again by sucking with a vacuum deaeration sealer and, at the same time, the second sealing bag 150B is completely sealed along a sealing part 152 at which the opening 151 (see (b) in FIG. 35) of the second sealing bag 150B is fusion-bonded ((f) in FIG. 35).

In this regard, the opening 151 of the second sealing bag 150B is sealed by sucking until the heat storage material enclosed prepack 103A is closely adhered to the shrunk second sealing bag 150B. In this manner, the latent heat storage material composition 101 is enclosed in the space in a given housing means for utilizing heat energy, and a heat storage material enclosed pack 103 is produced, in which the leak-proof inner bag 140 having the heat storage material enclosed product 102 enclosed therein is covered with a sealing bag 150 having a double-layered structure (a first sealing bag 150A, a second sealing bag 150B).

When the latent heat storage material composition 101 is included in the packaging container in this manner, it becomes possible to effectively prevent the adhesion of foreign matters, which result from the leak/scattering of the latent heat storage material composition 101 during the enclosure of the latent heat storage material composition 101 in the sealing bag 150, onto the sealing part 152 of the sealing bag 150 or the like. As a result, the sealing bag 150 having a double-layered structure can be sealed tightly without being affected by the foreign matters, and the latent heat storage material composition 101 packed in the leak-proof inner bag 140 can be included in the sealing bag 150 more reliably without being leaked into the outside of the sealing bag 150.

Figure 36:
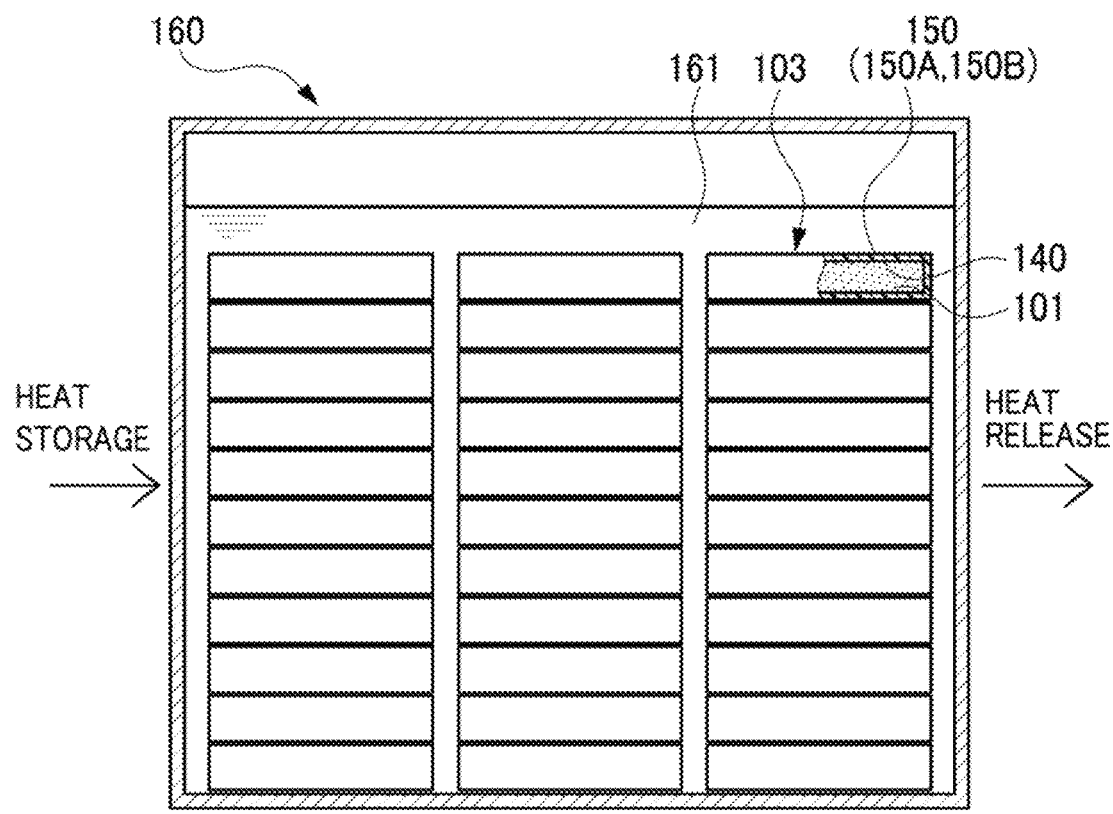
FIG. 36 is an explanatory diagram exemplifying the case where the latent heat storage material composition according to Embodiment 2 is included in a heat storage tank.

Next, the case where the latent heat storage material composition 101 is used in a heat storage tank will be described briefly with reference to FIG. 36. FIG. 36 is an explanatory diagram exemplifying the case where the latent heat storage material composition according to Embodiment 2 is included in a heat storage tank. The latent heat storage material composition 101 is included in a packaging container as exemplified in FIG. 35, and the packaging container having the latent heat storage material composition 101 included therein is included in a space in a given housing means for heat energy utilization purposes. One example of the housing means is a heat storage tank 160 as exemplified in FIG. 36. The heat storage tank 160 is set up for the purpose of, for example, recovering waste heat generated from various facilities used in factories, offices, houses and the like and aggressively utilizing heat energy stored in the latent heat storage material composition 101 by the waste heat.

In the heat storage tank 160, a heat medium 161 such as water stored in the tank is heated by the waste heat, and the latent heat storage material composition 101 stores heat having a temperature falling within in a temperature range ranging from around 60° C. to around 80° C. through the heat medium 161. The heat stored in the latent heat storage material composition 101 is released in this temperature range and is utilized as heat energy for a demand destination facility. As mentioned above, the latent heat storage material composition 101 is packed in a leak-proof inner bag 140 and a sealing bag 150 having a double-layered structure which constitute a heat storage material enclosed pack 103. As shown in FIG. 36, the multiple heat storage material enclosed packs 103 are stored in the heat storage tank 160.

Next, the action/effect of a latent heat storage material composition 101 according to Embodiment 2 will be described. The latent heat storage material composition 101 according to Embodiment 2 is a latent heat storage material composition 101 (101A,101B) prepared by mixing a latent heat storage material 110 capable of storing or releasing heat with an additive capable of modifying a property of the latent heat storage material 110, and is characterized in that the latent heat storage material 110 comprises an inorganic salt hydrate, and the additive is a melting point modifier 113 (113A,113B) capable of adjusting the melting point of the latent heat storage material 110 and is a substance having a property to generate negative dissolution heat upon the dissolution in hydration water contained in the latent heat storage material 110.

Due to this characteristic feature, even in the latent heat storage material composition 101 having the melting point modifier 113 added thereto, the decrease in the amount of heat storage of the latent heat storage material composition 101 due to the addition of the melting point modifier 113 does not occur. Furthermore, when the latent heat storage material 110 comprises alum hydrate as in the case of Embodiment 2, the latent heat storage material 110 can keep a large amount of heat storage. Therefore, the latent heat storage material composition 101 containing the latent heat storage material 110 can also keep a larger amount of heat storage. It also becomes possible to lower the melting point of the latent heat storage material composition 101 by 30° C. or more than the melting point of the latent heat storage material 110 alone (93.5° C.), and therefore the latent heat storage material composition 101 can store waste heat having a temperature ranging from around 60° C. to around 80° C.

Therefore, the latent heat storage material composition 101 according to Embodiment 2 has excellent effects such that the melting point of a latent heat storage material 110 can be modified greatly by adding an additive 113 to the latent heat storage material 110, and a larger amount of heat storage can be achieved even though the additive 113 is added.

The latent heat storage material composition 101 according to Embodiment 2 is characterized in that each of the melting point modifiers 113A and 113B (113) contains at least a substance belonging to a sugar alcohol. Due to this characteristic feature, the melting point modifier 113 that is a sugar alcohol is dissolved in hydration water contained in the latent heat storage material 110 that is alum hydrate to increase the viscosity. Therefore, it becomes possible to prevent the occurrence of separation between the latent heat storage material 110 and the melting point modifier 113 due to the difference in density between the latent heat storage material 110 and the melting point modifier 113. As a result, the inhomogeneous mixing of the latent heat storage material 110 with the melting point modifier 113 can be avoided and, therefore, the latent heat storage material composition 101 can become a chemically stable heat storage material. Furthermore, alum hydrate and a food additive such as a sugar alcohol are nontoxic and non-dangerous materials, and are easy to handle and inexpensive.

The latent heat storage material composition 101A according to Embodiment 2 is characterized in that the melting point modifier 113 (113A) is erythritol ($C_4H_{10}O_4$). Due to this characteristic feature, the melting point of the latent heat storage material composition 101A can be adjusted to 75 to 76° C. Furthermore, the latent heat storage material composition 101A can have heat storage-release performance to store heat in a large capacity, i.e., more than about 330 (kJ/kg), and release the heat. This performance is an excellent property for use as a heat storage material.

The latent heat storage material composition 101A according to Embodiment 2 is characterized in that the mixing amount of erythritol ($C_4H_{10}O_4$) (melting point modifier 113A) relative to the whole weight of the latent heat storage material composition 101A is 30 to 60 wt %. Due to this characteristic feature, even if the mixing amount of erythritol to be contained in the latent heat storage material composition 101A is varied during use, the melting point of the latent heat storage material composition 101A can be kept at a temperature of about 75 to 76° C., as long as the mixing amount of erythritol falls within the range from 30 to 60 wt %.

The latent heat storage material composition 101B according to Embodiment 2 is characterized in that the melting point modifier 113 (113B) is xylitol ($C_5H_{12}O_5$). Due to this characteristic feature, the melting point of the latent heat storage material composition 101B can be adjusted to 62° C. Furthermore, the latent heat storage material composition 101B can have heat storage-release performance to store heat in a large capacity, i.e., more than about 280 (kJ/kg), and release the heat. This performance is an excellent property for use as a heat storage material.

The latent heat storage material composition 101 according to Embodiment 2 is also characterized in that the inorganic salt hydrate is alum hydrate. Due to this characteristic feature, in the latent heat storage material 110 comprising alum hydrate, the latent heat in association with phase change is relatively large, and water in which the melting point modifier 113, i.e., the "substance having a property to generate negative dissolution heat", is to be dissolved (in FIG. 28, hydration water 112) is contained in the structure of alum hydrate. Therefore, in the latent heat storage material composition 101 which contains the latent heat storage material 110 as the main component, the amount of heat that can be stored in the latent heat storage material 110 can be increased, because the amount of the heat is the sum total of a relatively large melting latent heat and negative dissolution heat. The latent heat storage material composition 101 which contains the latent heat storage material 110 containing alum hydrate as the main component can have heat storage-release performance to store heat in a large capacity and release the heat. This performance is an excellent property for use as a heat storage material.

The latent heat storage material composition 101 according to Embodiment 2 is also characterized in that the alum hydrate is ammonia alum dodecahydrate ($AlNH_4(SO_4)_2 \cdot 12H_2O$) or potassium alum dodecahydrate ($AlK(SO_4)_2 \cdot 12H_2O$). Due to this characteristic feature, ammonia alum dodecahydrate and potassium alum dodecahydrate have been distributed widely in the market, and are therefore easily commercially available and inexpensive.

As mentioned above, the present invention is described with reference to Examples 1 to 5 and Comparative Examples 1 to 5 in Embodiment 1 and Examples 6 and 7 and Comparative Examples 6 and 7 in Embodiment 2. However, the invention is not limited to Examples 1 to 5 and Comparative Examples 1 to 5 in Embodiment 1 and Examples 6 and 7 and Comparative Examples 6 and 7 in Embodiment 2, and can be modified and applied without departing from the scope of the invention.

(1) For example, in Examples 1 to 5 and Comparative Examples 1 to 5 in Embodiment 1, a melting point modifier 13 (a melting point modifier 13A or a melting point modifier 13B) is added in a mixing amount shown in each of FIGS. 4, 7, 12, 17 and 20 to a latent heat storage material composition 1. However, the mixing amounts of the melting point modifier 13 are for illustrative purpose only, the mixing amount of the melting point modifier (with respect to a first additive and a second additive) relative to the amount of a latent heat storage material composition according to one embodiment of the present invention may vary appropriately, as long as no trouble occurs during the use of the latent heat storage material composition according to one embodiment of the present invention.

(2) In Embodiment 1, the melting point of a latent heat storage material composition 1 is adjusted to a desired temperature range, for example around 50° C. in Example 1, around 40° C. in Example 2, about 65 to 75° C. in Example 3, around 82° C. in Example 4, and about 75 to 90° C. in Example 5, by adding a melting point modifier 13. However, the melting point of a latent heat storage material composition according to one embodiment of the present invention, which can be adjusted with a melting point modifier, is not limited to these temperature ranges, and may be adjusted to a temperature corresponding to the temperature of a heat source needed in a heat supply destination at which heat released from a latent heat storage material composition according to one embodiment of the present invention is used.

(3) In Embodiment 1, the latent heat storage material is sodium hydroxymethanesulfinate dihydrate (2 molecules of hydration water) in Example 1, sodium acetate trihydrate (3 molecules of hydration water) in Example 2, sodium diphosphate decahydrate (10 molecules of hydration water) in Example 3, ammonia alum dodecahydrate (12 molecules of hydration water) in Example 4, and aluminum sulfate hydrate (14 to 18 molecules of hydration water) in Example 5.

Besides the latent heat storage material according to Embodiment 1, the latent heat storage material contained in the latent heat storage material composition according to one embodiment of the present invention may be an inorganic salt hydrate containing $n_w$ ($2 \leq n_w$) molecules of hydration water, including: a carbonate salt that cannot be effloresced, such as sodium carbonate decahydrate ($Na_2CO_3 \cdot 10H_2O$) that contains 10 molecules of hydration water; a nitrate salt that can be easily dissolved in water, such as magnesium nitrate ($Mg(NO_3)_2 \cdot 6H_2O$); a tartrate salt, such as sodium tartrate dihydrate ($Na_2C_4H_4O_6 \cdot 2H_2O$) and potassium sodium tartrate 4-hydrate ($KNaC_4H_4O_6 \cdot 4H_2O$); and a borate salt, such as sodium borate 8-hydrate ($Na_2B_4O_5(OH)_4 \cdot 8H_2O$) and sodium tetraborate decahydrate ($Na_2B_4O_7 \cdot 10H_2O$).

In addition, a hydroxymethanesulfonate salt such as sodium hydroxymethanesulfonate ($CH_3NaO_4S$) (½ molecule of hydration water) can also be used as the latent heat storage material, although this substance is not an inorganic salt hydrate containing $n_w$ ($2 \leq n_w$) molecules of hydration water unlike the latent heat storage material contained in the latent heat storage material composition according to one embodiment of the present invention. Namely, an inorganic salt hydrate containing less than 2 molecules of hydration water can also be used as the latent heat storage material, as long as the mixing amount $x_s$ of a substance-belonging to a sugar alcohol per 1 mol of the hydration water in the latent heat storage material satisfies the requirement: $0 < x_s \leq 1$ in the above-mentioned formula (2).

(4) For example, in each of Experiments 18 and 19 in Examples 6 and 7 in Embodiment 2, a melting point modifier 113 (113A, 113B) was added in a mixing amount of 50 wt % to a latent heat storage material composition 101 (101A, 101B). However, this mixing amount of the melting point modifier 113 is for illustrative purpose only, and the mixing amount of the melting point modifier relative to the amount of the latent heat storage material composition may be varied appropriately, as long as no trouble occurs during the use of the latent heat storage material composition.

(5) In Embodiment 2, the melting point of a latent heat storage material composition 101 is adjusted to around 60° C. to around 80° C. by adding a melting point modifier 113. However, the melting point temperature of the latent heat storage material composition which is adjusted with a melting point modifier is not limited to a temperature falling within these temperature range, and may be adjusted to any temperature corresponding to the temperature of a heat source needed in a heat supply destination at which heat released from the latent heat storage material composition is used.

(6) In Embodiment 2, a latent heat storage material composition 101 was packed using, for example, two types of bags including a leak-proof inner bag 140 and a sealing bag 150 as packaging containers, as shown in FIG. 35. However, the latent heat storage material composition may also be packed in a packaging container such as a capsule or the like, as long as the latent heat storage material composition 101 can be enclosed in a packaging container in such a manner that heat can transfer between the inside of the container and the outside of the container without leaking to the outside of the container.

INDUSTRIAL APPLICABILITY

As is clearly from the aforementioned description, according to the latent heat storage material composition of the present invention, waste heat that should be disposed ordinarily can be stored in a latent heat storage material and the stored heat can be extracted as required, so that energy can be utilized effectively without waste. In addition, it is possible to greatly adjust a melting point of the latent heat storage material by addition of an additive thereto a destination at which this energy is demanded and also it is possible to obtain a larger amount of heat storage even when the additive is added.

REFERENCE SIGNS LIST 1, 1A, 1B, 1C, 1D, 1E, 101, 101A, 101B Latent heat storage material composition
10, 10A, 10B, 10C, 10D, 10E, 110 Latent heat storage material (inorganic salt hydrate)
13, 13A, 13B Melting point modifier (Substance belonging to sugar alcohol, First additive)
113, 113A, 113B Melting point modifier (Substance belonging to sugar alcohol)
14 Melting point modifier (Second additive)

The invention claimed is:
1. A latent heat storage material composition prepared by a mixture of a latent heat storage material capable of storing or releasing heat and an additive capable of adjusting a property of the latent heat storage material, wherein
the latent heat storage material comprises at least one inorganic salt hydrate containing $n_w$ molecules of hydration water, wherein $2 \leq n_w$,
the additive is a melting point modifier configured to adjust a melting point of the latent heat storage material, the melting point modifier being a substance having a property to generate negative dissolution heat upon dissolution in the latent heat storage material,
the melting point modifier contains at least a substance belonging to a sugar alcohol as a first additive and a sulfate salt as a second additive that is different from the first additive,
a melt of the latent heat storage material composition is a mixture of the latent heat storage material with the melting point modifier which is produced as a result of dissolution of the sugar alcohol and the sulfate salt contained in the melting point modifier in the hydration water contained in the latent heat storage material, and
the substance belonging to a sugar alcohol has a concentration that satisfies formulae (1) and (2) per 1 mol of the hydration water in the latent heat storage material in a whole amount of the latent heat storage material composition:

$$x_s = (m_s/M_s)/\Sigma_{k=1}^{N}(n_{wk} \times m_{ak}/M_{ak})$$ Formula (1)

$$0.01 \leq x_s \leq 1$$ Formula (2)

wherein:
- $x_s$: the number of moles of the "substance belonging to a sugar alcohol" per 1 mol of hydration water [mol/mol];
- $m_s$: the mass of the "substance belonging to a sugar alcohol" contained in the latent heat storage material composition [g];
- $M_s$: the molecular weight of the "substance belonging to a sugar alcohol" [g/mol];
- N: the total number of the latent heat storage materials constituting the latent heat storage material composition;
- $n_{wk}$: the hydration number of the latent heat storage material (k=1, 2, . . . , N);
- $m_{ak}$: the mass of the latent heat storage material contained in the latent heat storage material composition [g] (k=1, 2, . . . , N); and
- $M_{ak}$: the molecular weight of the latent heat storage material [g/mol] (k=1, 2, . . . , N), and the sulfate salt has a concentration that satisfies formulae (3) and (4) per 1 mol of the hydration water in the latent heat storage material in a whole amount of the latent heat storage material composition, the substance belonging to a sugar alcohol comprises at least one of erythritol ($C_4H_{10}O_4$), xylitol ($C_5H_{12}O_5$), and mannitol ($C_6H_{14}O_6$):

$$x_t(m_t/M_t)/\Sigma_{k=1}^{N}(n_{wk} \times m_{ak}/M_{ak})$$ Formula (3)

$$0 < x_t \leq 0.1$$ Formula (4)

wherein:
- $x_t$: the number of moles of the sulfate salt per 1 mol of hydration water [mol/mol];
- $m_t$: the mass of the sulfate salt contained as the second additive in the latent heat storage material composition [g];
- $M_t$: the molecular weight of the sulfate salt that serves as the second additive [g/mol];
- N: the total number of the latent heat storage materials constituting the latent heat storage material composition;
- $n_{wk}$: the hydration number of the latent heat storage material (k=1, 2, . . . , N);
- $m_{ak}$: the mass of the latent heat storage material contained in the latent heat storage material composition [g] (k=1, 2, . . . , N); and
- $M_{ak}$: the molecular weight of the latent heat storage material [g/mol] (k=1, 2, . . . , N).

2. The latent heat storage material composition according to claim 1, wherein the sulfate salt is ammonium sulfate (($NH_4)_2SO_4$).

3. The latent heat storage material composition according to claim 1, wherein the inorganic salt hydrate is a hydroxymethanesulfinate salt.

4. The latent heat storage material composition according to claim 3, wherein the hydroxymethanesulfinate salt is sodium hydroxymethanesulfinate dihydrate ($CH_3NaO_3S \cdot 2H_2O$).

5. The latent heat storage material composition according to claim 1, wherein the inorganic salt hydrate is an acetate salt.

6. The latent heat storage material composition according to claim 5, wherein the acetate salt is sodium acetate trihydrate ($CH_3COONa \cdot 3H_2O$).

7. The latent heat storage material composition according to claim 1, wherein the inorganic salt hydrate is a diphosphate salt or a phosphate salt.

8. The latent heat storage material composition according to claim 7, wherein the diphosphate salt is sodium diphosphate decahydrate ($Na_4P_2O_7 \cdot 10H_2O$).

9. The latent heat storage material composition according to claim 1, wherein the inorganic salt hydrate is alum hydrate.

10. The latent heat storage material composition according to claim 9, wherein the alum hydrate is ammonia alum dodecahydrate ($AlNH_4(SO_4)_2 \cdot 12H_2O$) or potassium alum dodecahydrate ($AlK(SO_4)_2 \cdot 12H_2O$).

11. The latent heat storage material composition according to claim 1, wherein the inorganic salt hydrate is a sulfate hydrate.

12. The latent heat storage material composition according to claim 11, wherein the sulfate hydrate is aluminum sulfate hydrate ($Al_2(SO_4)_3 \cdot nH_2O$), wherein 2 n.

\* \* \* \* \*